United States Patent [19]
Khatchadourian et al.

[11] Patent Number: 6,086,934
[45] Date of Patent: Jul. 11, 2000

[54] APPARATUS AND METHOD FOR MAKING PIZZA

[75] Inventors: Puzant Khatchadourian, 29 Clinton St., Sea Cliff, N.Y. 11579; Krikor Kouyoumdjian; Bernardo Brini, both of Quebec, Canada

[73] Assignee: Puzant Khatchadourian, Sea Cliff, N.Y.

[21] Appl. No.: 09/248,078

[22] Filed: Feb. 10, 1999

Related U.S. Application Data

[62] Division of application No. 08/900,031, Jul. 24, 1997, Pat. No. 5,921,170.

[60] Provisional application No. 60/022,603, Jul. 25, 1996.

[51] Int. Cl.[7] .......................................... A21D 6/00
[52] U.S. Cl. ........................... 426/289; 426/496; 426/503; 426/518; 426/523; 222/1
[58] Field of Search .................................... 426/289, 549, 426/496, 503, 296, 518, 520, 523; 222/1

[56] References Cited

U.S. PATENT DOCUMENTS

| | | | |
|---|---|---|---|
| 2,190,483 | 2/1940 | Pacilio | 107/1 |
| 3,358,618 | 12/1967 | Vetta | 107/1 |
| 3,602,154 | 8/1971 | Schimkat et al. | 107/1 R |
| 3,631,818 | 1/1972 | Zito | 99/450.7 |
| 3,648,596 | 3/1972 | Zito | 99/450.7 |
| 3,763,764 | 10/1973 | Schy | 99/353 |
| 3,892,171 | 7/1975 | Fitch et al. | 99/450.7 |
| 3,892,868 | 7/1975 | Klingler | 426/94 |
| 4,702,926 | 10/1987 | Fowler | 426/283 |
| 4,976,978 | 12/1990 | Schubert | 426/295 |
| 5,012,726 | 5/1991 | Fehr et al. | 99/450.6 |
| 5,117,749 | 6/1992 | Bakker | 99/450.1 |
| 5,121,677 | 6/1992 | Le Claire et al. | 99/357 |
| 5,348,751 | 9/1994 | Packer et al. | 426/94 |
| 5,458,055 | 10/1995 | Fitch, Jr. | 99/450.1 |
| 5,522,310 | 6/1996 | Black, Sr. et al. | 99/357 |

FOREIGN PATENT DOCUMENTS 385 035  1/1933  United Kingdom.

*Primary Examiner*—Keith Hendricks
*Assistant Examiner*—Drew Becker
*Attorney, Agent, or Firm*—Darby & Darby

[57] ABSTRACT

An apparatus and method for making pizza includes a housing and a plurality of canisters containing fresh dough stored in the housing. A cutting blade is disposed in the housing and is moveable between an upper limit position and a lower limit position to cut a slice of dough from one of the plurality of canisters. A press plate is disposed in the housing and receives the slice of dough. The press plate includes a first plate and a second plate that selectively move into engagement with each other to define an internal chamber therebetween to press flat and preheat the slice of dough. A rotary index table station is disposed in the housing and includes a plurality of plates, with each of the plates being rotatable about a central axis of the rotary index table station. Preheated pizza crust is deposited on the plates. Each of the plates is then moveable between an innermost radial position and an outermost radial position. Each of the plates also has a central axis such that each of the plates are rotatable about its respective central axis when moving between the innermost radial position and the outermost radial position. Toppings are applied during this movement so they are placed on the pizza crust in a spiral pattern.

4 Claims, 63 Drawing Sheets

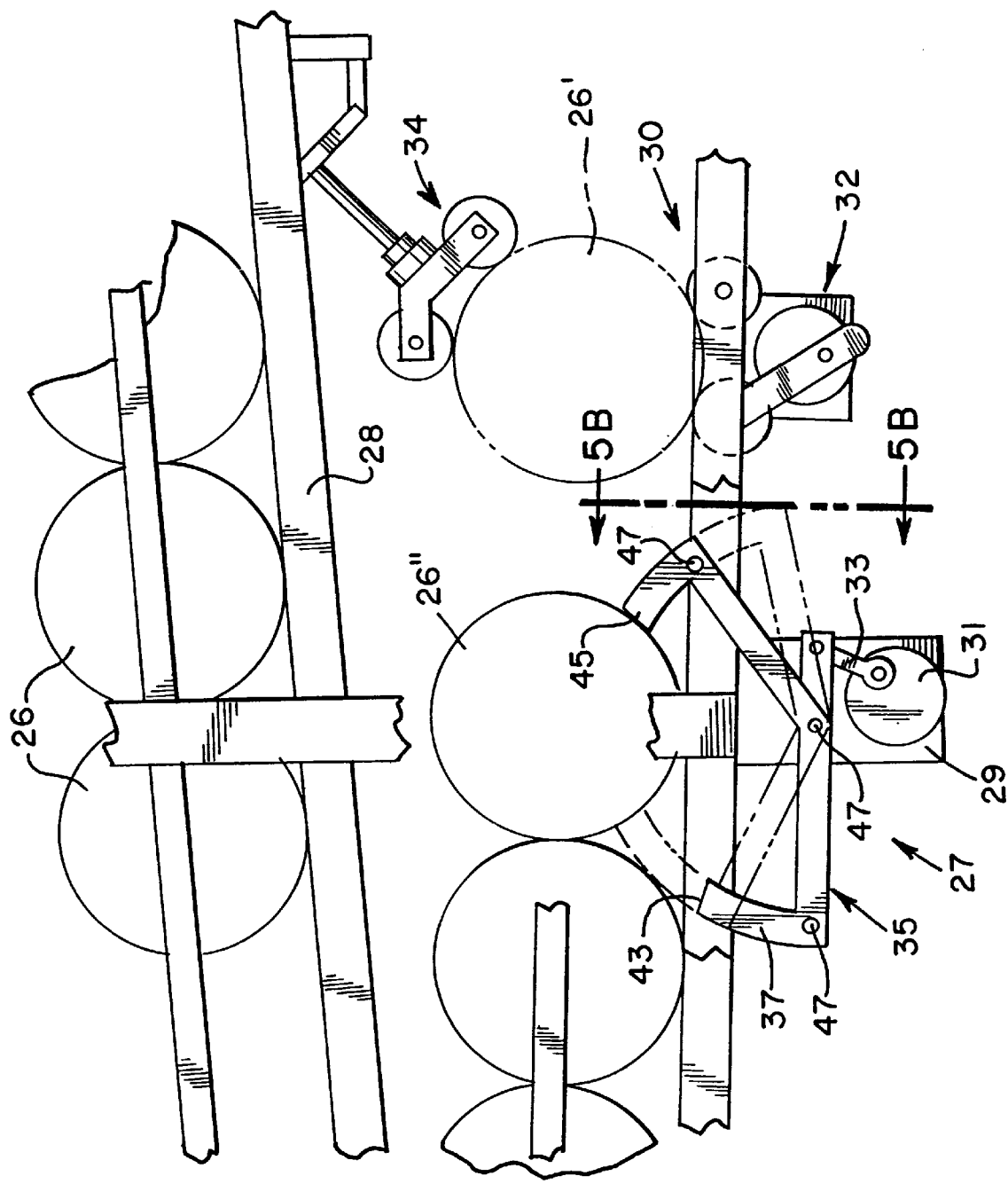

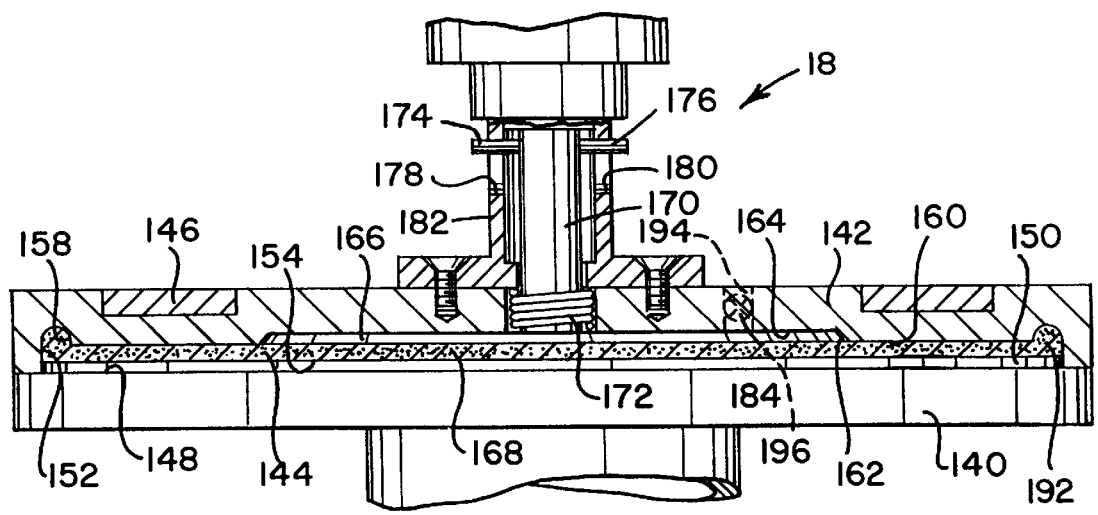
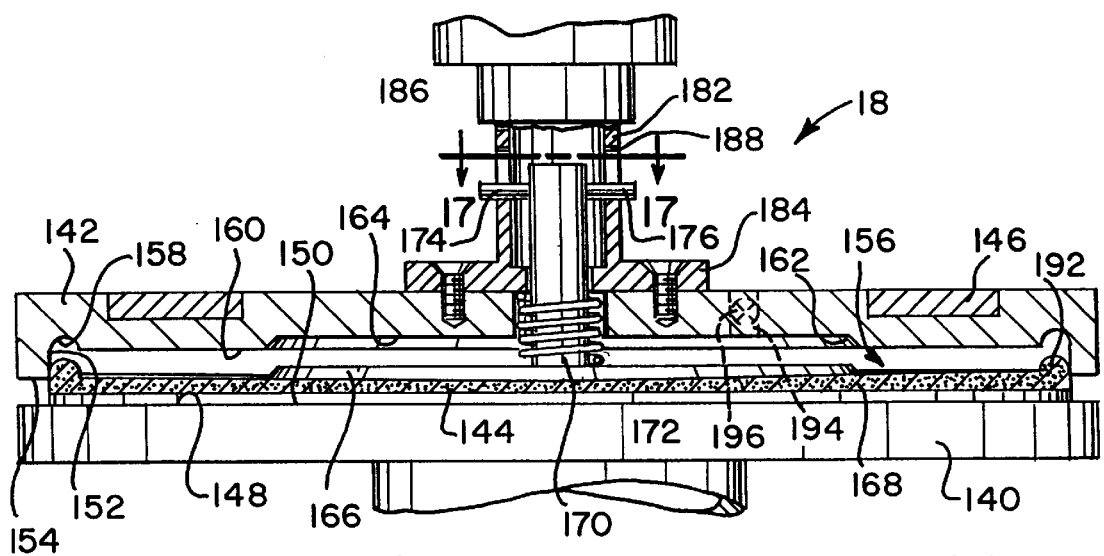
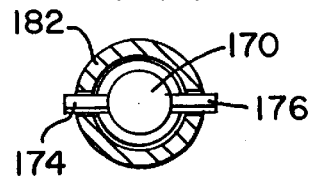
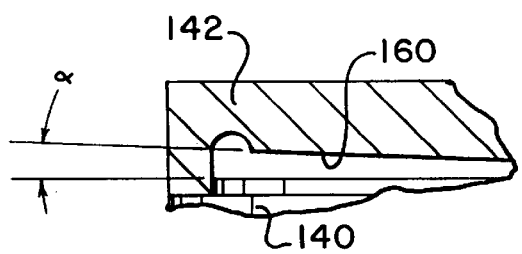

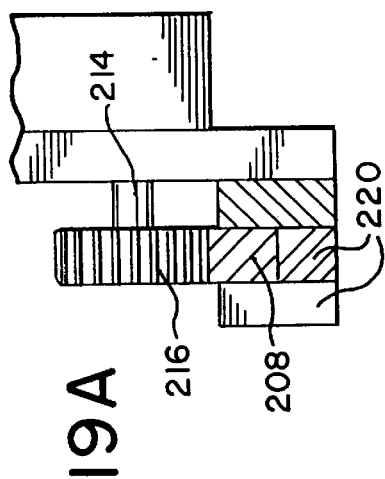
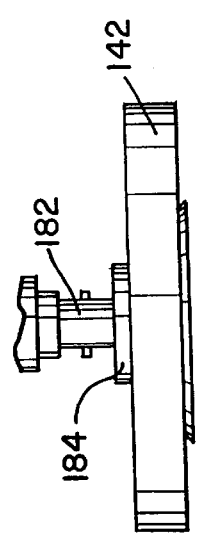
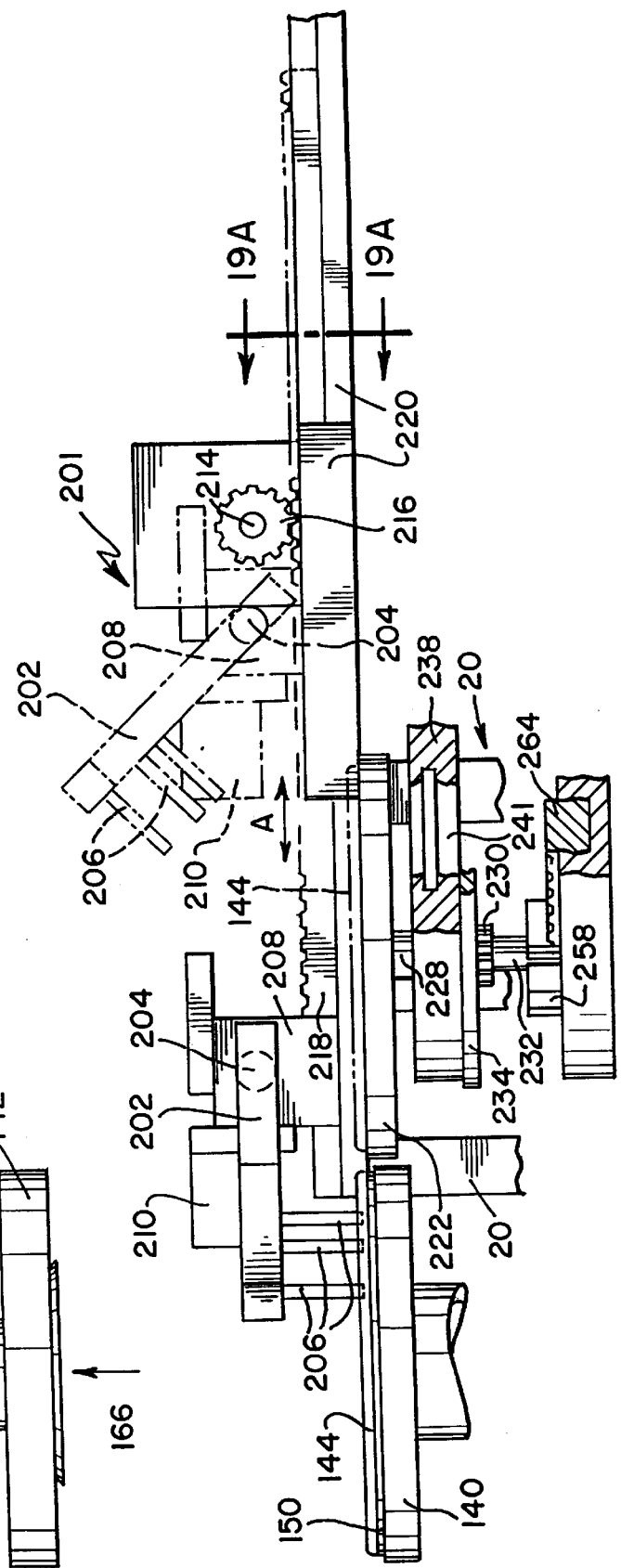

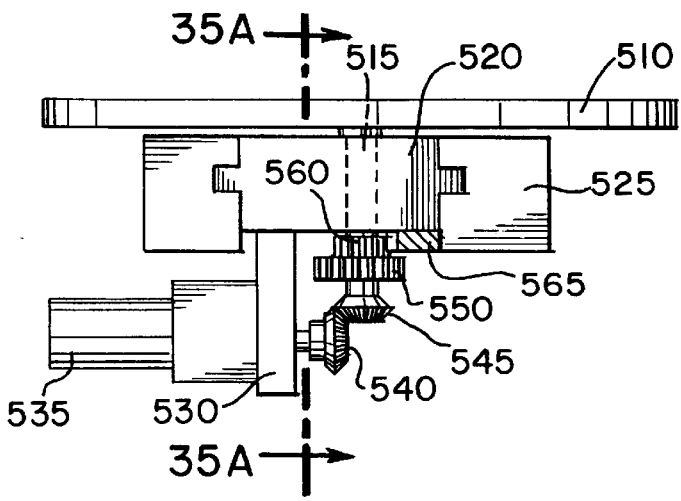
FIG. 34A
FIG. 35A
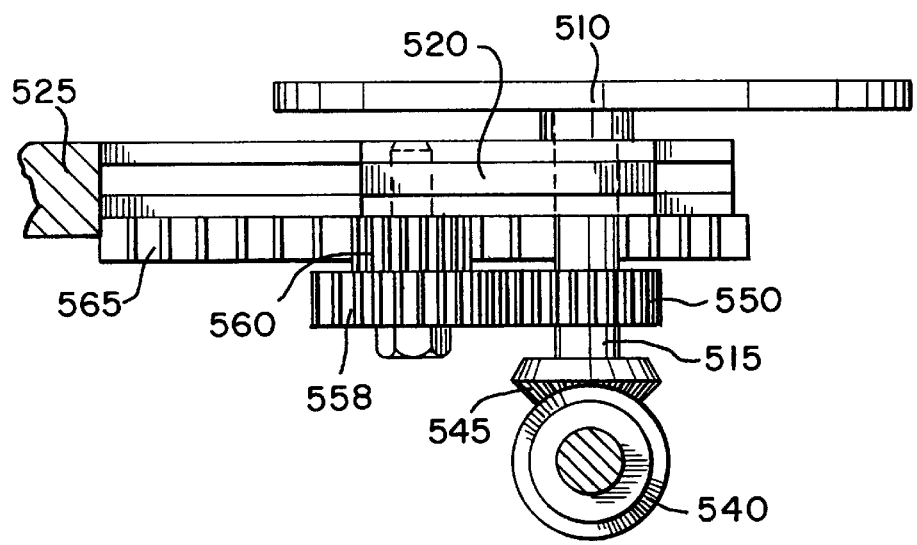
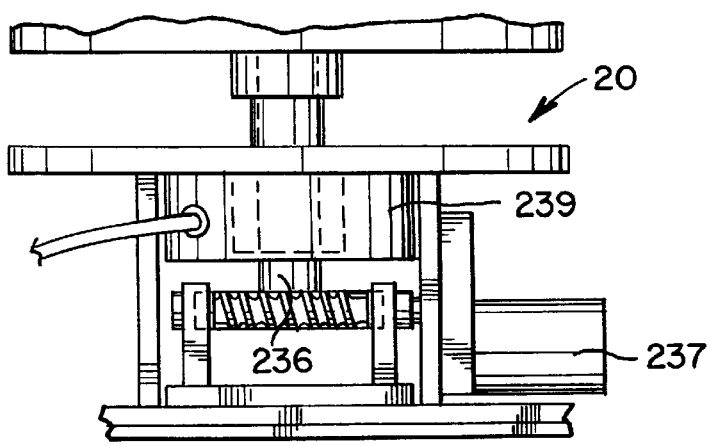
FIG. 36A

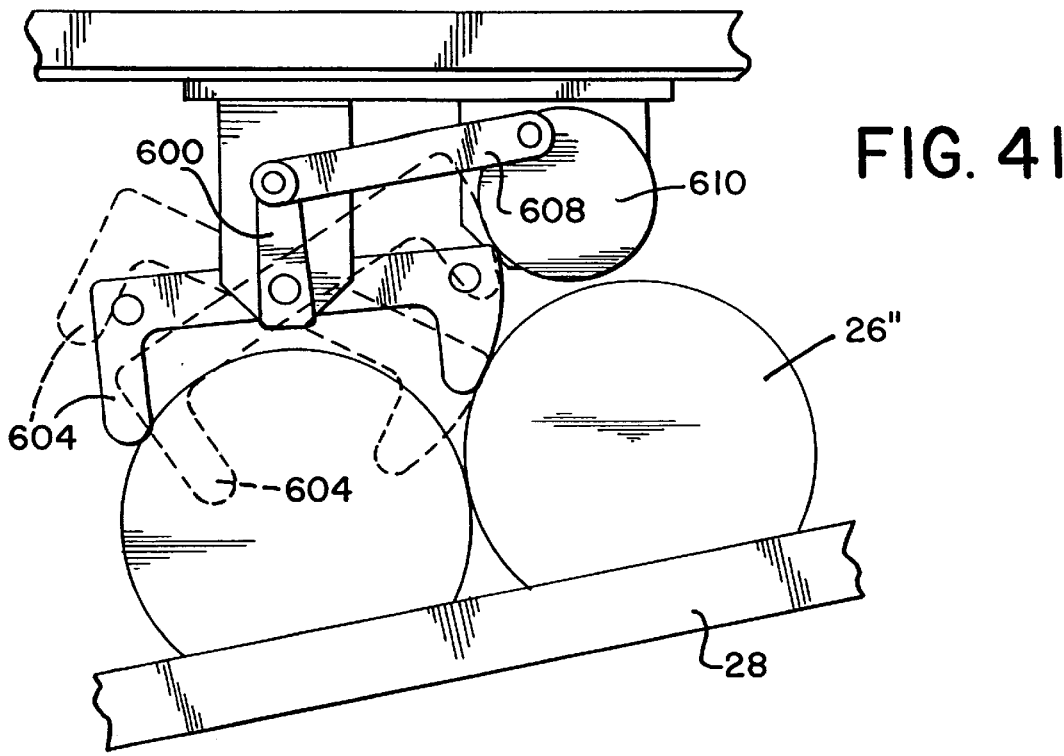
FIG. 41
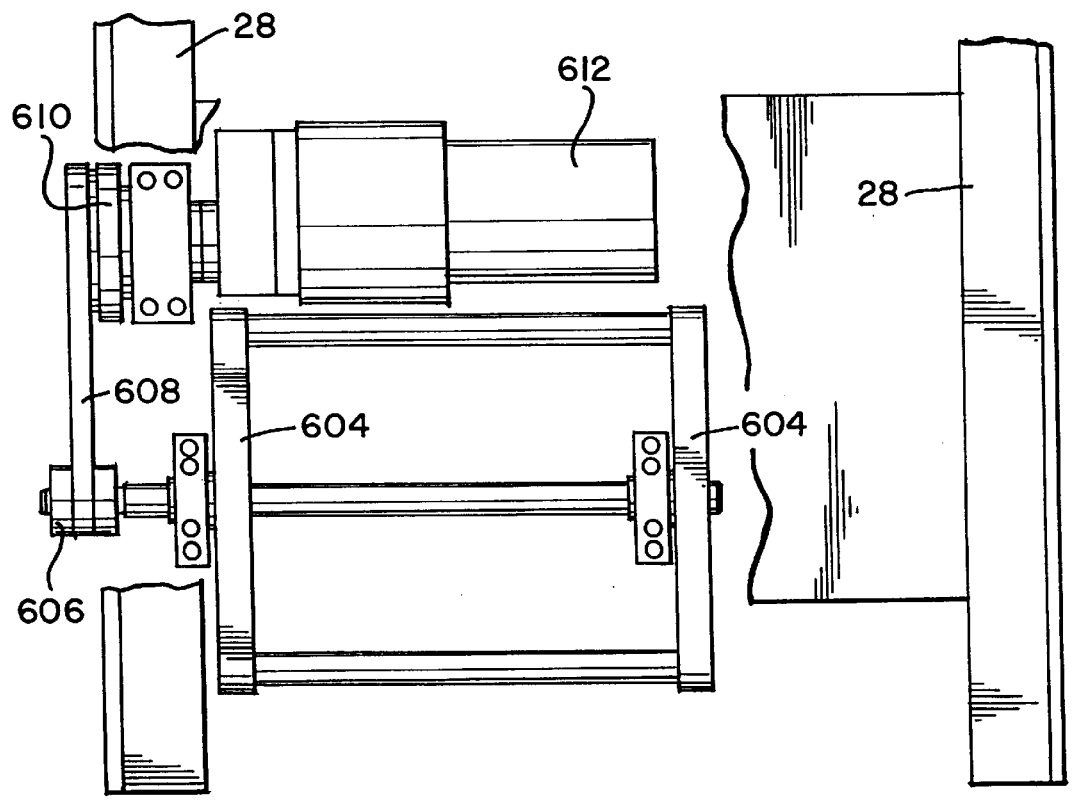

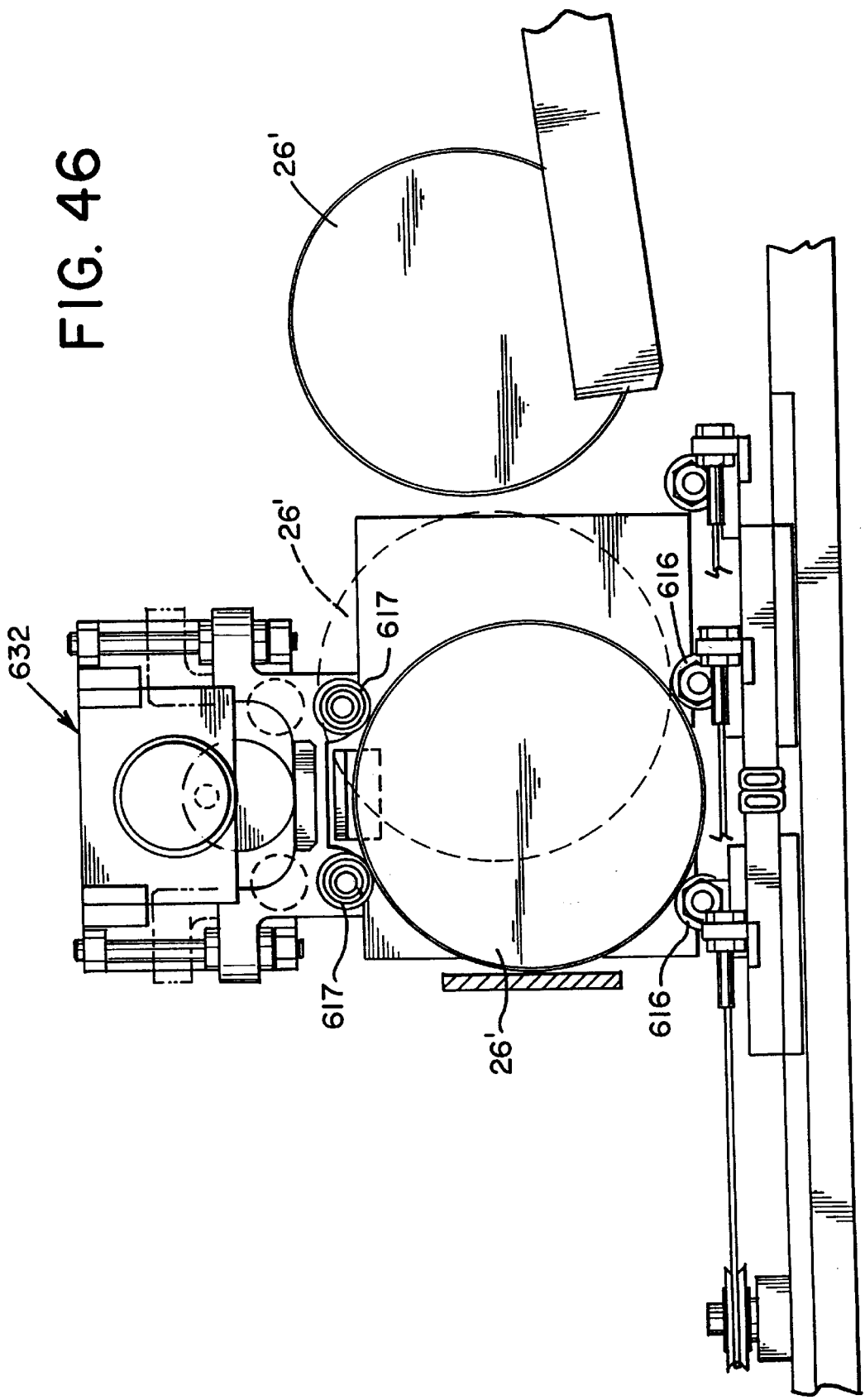

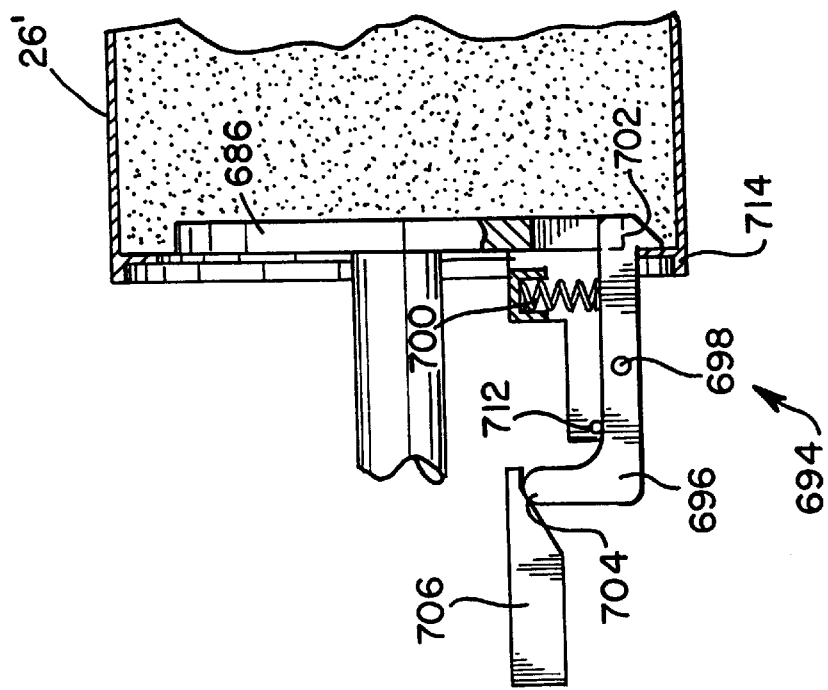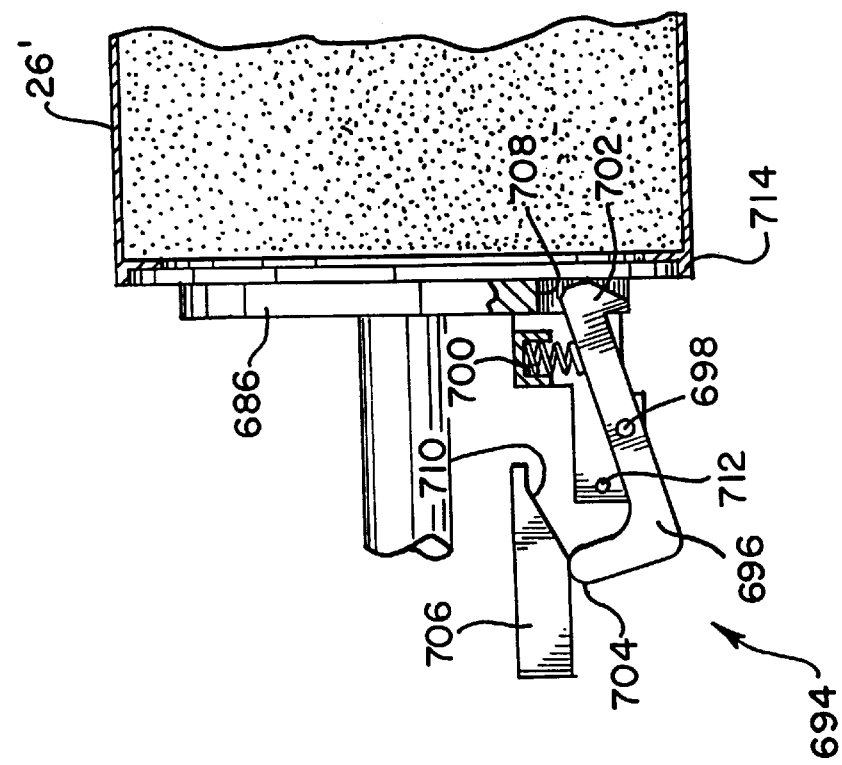

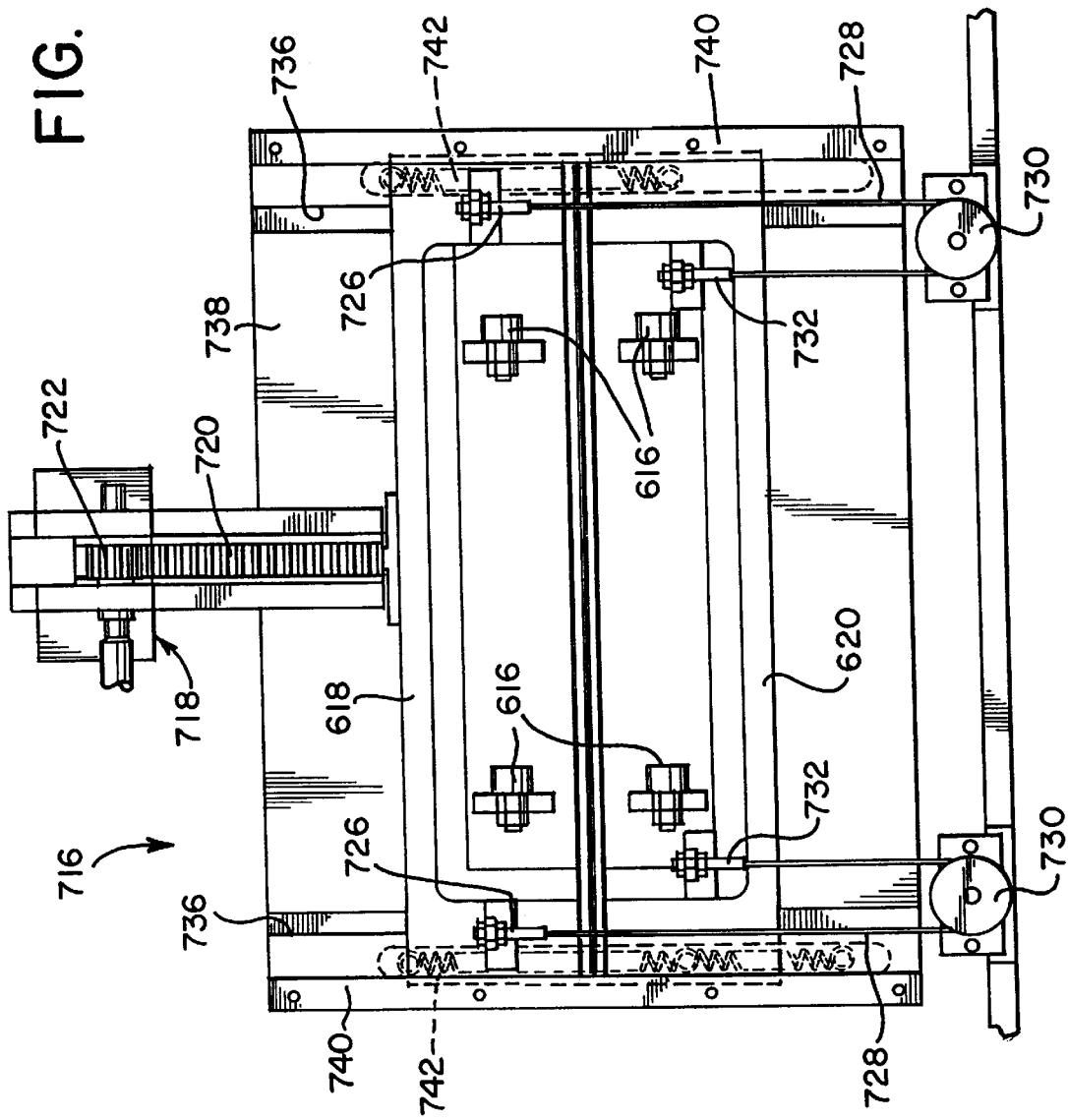

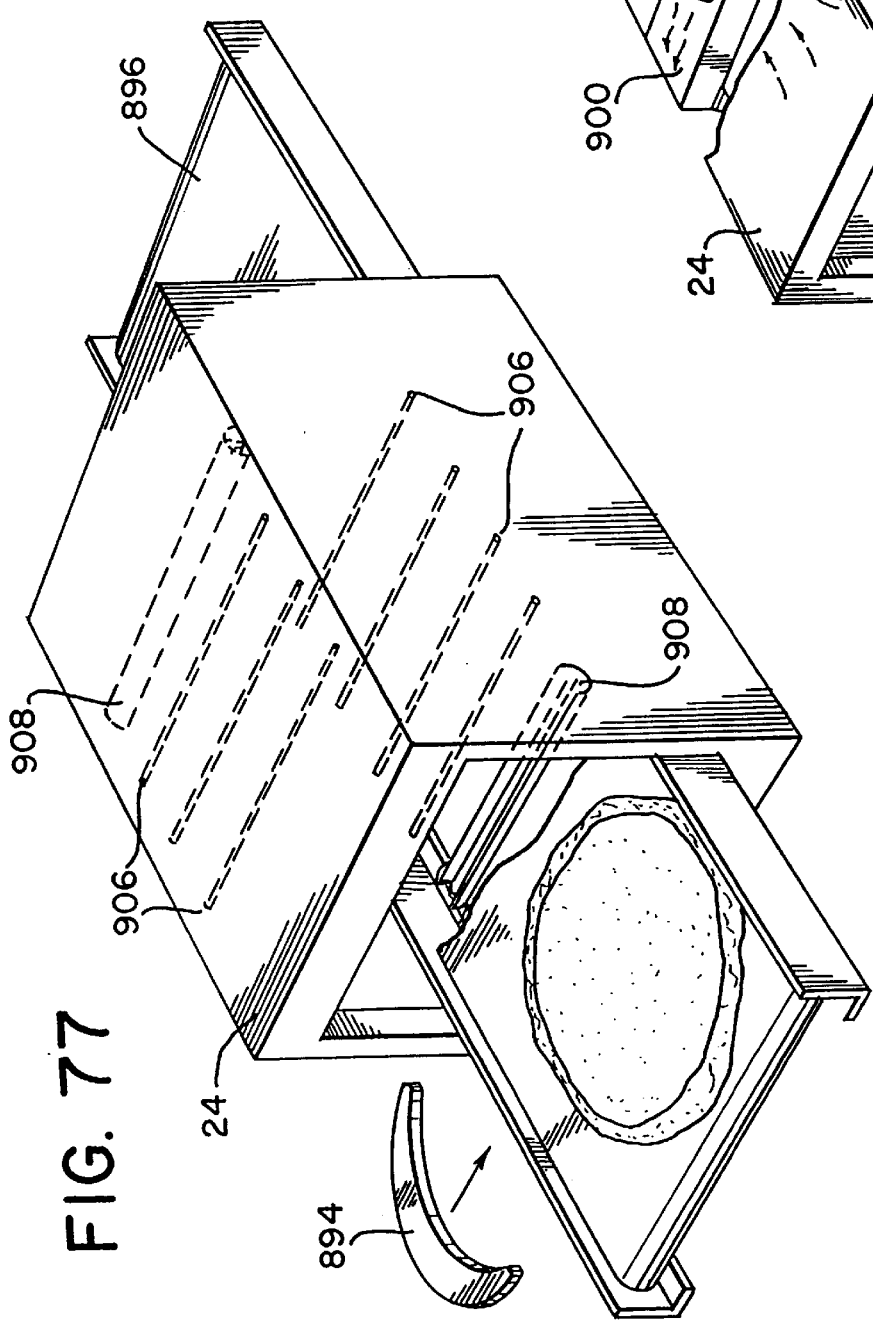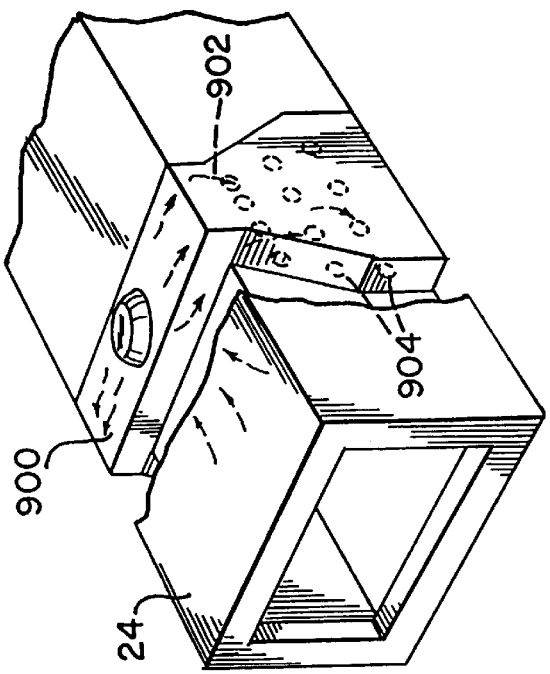

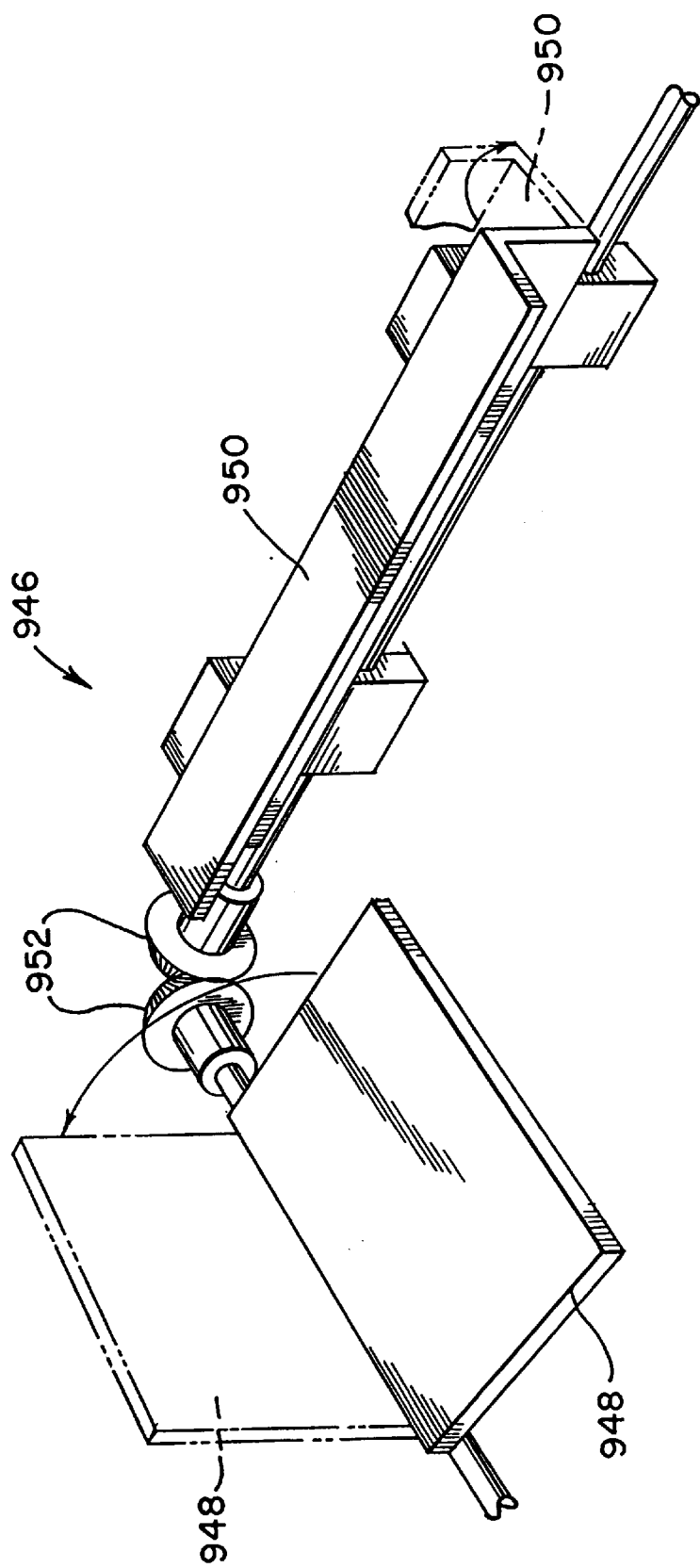

APPARATUS AND METHOD FOR MAKING PIZZA

This is a division of application Ser. No. 08/900,031, filed Jul. 24, 1997 now U.S. Pat. No. 5,921,170. The prior application is hereby incorporated herein by reference, in its entirety.

The enclosed application is based upon one Provisional Patent Application Serial No. 60/022,603 filed Jul. 25, 1996. Applicants claim the benefit of the filing dates of the aforesaid provisional application under 35 U.S.C. §119(E)(1).

BACKGROUND OF THE INVENTION

1. Field of the Invention

The present invention relates to an apparatus and method for making pizza. More specifically, the present invention relates to a pizza making machine that makes pizza from a fresh slice of dough. The slice of dough is partially cooked before any toppings are placed thereon. The toppings, including, for example, sauce, cheese, pepperoni, sausage, mushroom, etc., are placed on top of the preheated pizza dough in a manner that mimics the way pizza is made by hand.

2. Discussion of the Related Art

U.S. Pat. No. 5,121,677 to LeClaire et al. discloses a pizza making and baking machine which includes a plurality of stacks of pans. Each pan has a precooked crust disposed therein. The stacks of pans are stored on a conveyor at the top of a refrigerator cabinet and are moveable to a pan dispensing station. After a pan is dispensed from the pan dispensing station, it moves to a first station where a layer of sauce is applied to the crust by a sauce dispenser. The next station is a cheese dispensing station, which dispenses mozzarella cheese onto the crust and sauce. This station is followed by a meat product dispensing station. The meat product dispensing station is followed by a number of vegetable dispensing stations, which may dispense products such as olives, mushrooms, onions, peppers, etc. onto the pre-cooked pizza crust. After the pan has passed the last dispenser it moves onto the platform of an elevator mechanism. The elevator lowers the pan either to the level of a countertop (to deliver an uncooked pizza) or to the level of an oven entrance, depending on whether the customer wishes to have an uncooked pizza or a cooked pizza. If the customer chooses to have a cooked pizza, the pan moves through the oven on a conveyor belt. The oven includes a number of independently heated zones such that the cooking is tailored to the combination selected by the customer. The cooked pizza is then pushed out of the oven onto a further platform. This platform is raised to the level of a cook delivery shelf and the cooked pizza is pushed onto the shelf. Thereafter, the customer can remove the cooked pizza.

The '677 patent utilizes crusts which are precooked and therefore do not provide a product that tastes like a fresh cooked pizza. Additionally, the toppings are not placed on top of the pizza crust in the same manner in which a handmade pizza is made. For example, the sauce is peristalticly pumped through a tube 84 and dispensed onto the crust (see FIG. 6 of the '677 patent). Thereafter, a spread roller 32 is lowered to engage the top of the crust and rotates over the top surface of the crust to spread the sauce on top of the crust. Such an apparatus for dispensing sauce is extremely unclean and results in sauce continuing to drip from roller 32 long after the roller has been moved to the retracted position.

It is an object of the present invention to provide a machine for making pizza from a fresh slice of dough in a manner which substantially mimics the way in which pizza is made by hand so that the cooked pizza tastes like pizza that is made by hand.

Additionally, it is an object of the present invention to provide a machine for making pizza that is relatively clean during use and is relatively maintenance free.

SUMMARY OF THE INVENTION

A preferred embodiment of the present invention, i.e. apparatus for making pizza, which demonstrates features, objects and advantages thereof, includes a housing and a rotary index table station disposed in the housing. The rotary index table station includes a plurality of plates, with each plate being rotatable about a central axis of the rotary index table station. Each of the plates is moveable between an innermost radial position and an outermost radial position. Each of the plates has a central axis such that each of the plates are rotatable about its central axis when moving between the innermost position and the outermost position.

In another embodiment of the present invention, the apparatus includes a housing and a plurality of canisters stored in the housing. The plurality of canisters each contain fresh dough. A cutting blade is disposed in the housing. The cutting blade is moveable between an upper limit position and a lower limit position to cut a slice of dough from one of the plurality of canisters. A press plate is disposed in the housing and includes a first plate and a second plate that selectively move into engagement with each other to define an internal chamber therebetween to preheat the slice of dough.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIGS. 5 and 5A are enlarged left elevational views showing the storage rack for the canisters;

FIG. 15 is a partial sectional view of the press plate station in the closed position;

FIG. 16 is a partial sectional view of the press plate station in the partially open position;

FIG. 17 is a sectional view taken along line 17—17 of FIG. 16 and looking in the direction of the arrows;

FIG. 18 is an enlarged partial cross-sectional view of the upper plate of the press plate station;

FIG. 19 is an enlarged rear view of the device for moving the partially cooked pizza crust from the press plate station to the rotary index table station;

FIG. 19A is a sectional view taken along line 19A—19A of FIG. 19 and looking in the direction of the arrows;

FIG. 34A is a side elevational view of an alternate embodiment of the rotary index table station;

FIG. 35A is a sectional view taken along lines 35A—35A of FIG. 34A and looking in the direction of the arrows;

FIG. 36A is a sectional view similar to FIG. 36 showing a slip ring connection;

FIG. 41 is an enlarged side view of the canister separator mechanism;

FIG. 42 is a top view of the canister separator mechanism;

FIG. 46 is a side view of the canister top roller mechanism;

FIG. 54 is a front view of the canister retracting mechanism;

FIG. 55 is a front view of the canister retracting mechanism;

FIG. 56 is a top view of the canister dispenser door;

FIG. 77 is a perspective view of the oven;

FIG. 78A is a perspective view of the oven and its associated duct work;

FIG. 82 is a perspective view of the box bending mechanism.

DETAILED DESCRIPTION OF THE PREFERRED EMBODIMENT

Figure 1:
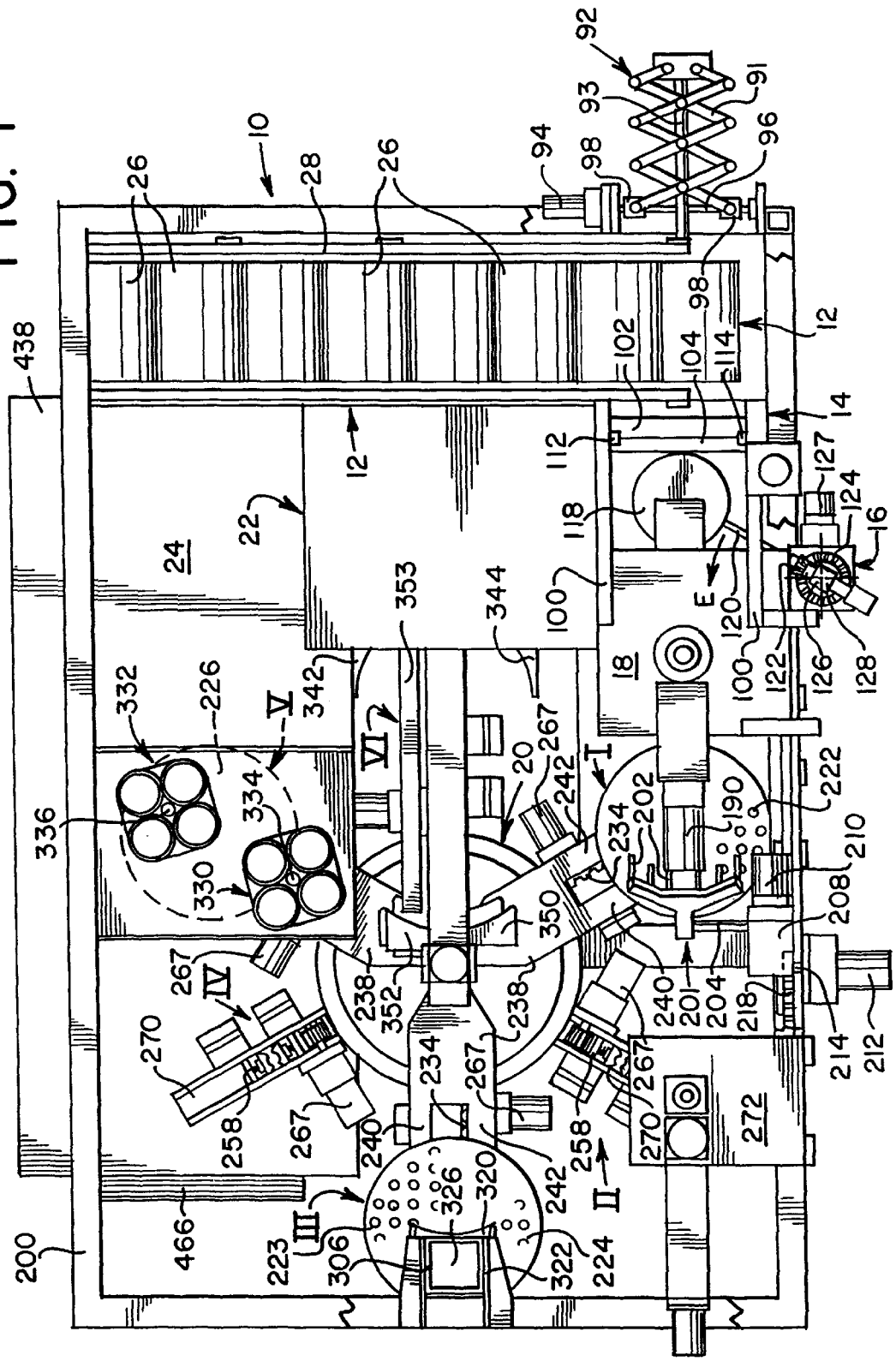
FIG. 1 is a top plan view of the pizza making apparatus according to the present invention.

Referring now to FIG. 1, an apparatus 10 for making pizza is illustrated. The apparatus includes a canister station 12, a dough cutting station 14, a catch plate station 16, a press plate station 18, a rotary index table station 20, an elevator station 22, and an oven station 24. FIGS. 39–82 illustrates a second embodiment of the apparatus 10' for making pizza. Apparatus 10' includes a canister station 12', a dough cutting station 14', a press plate station 18', a rotary index table station 20', an elevator station 22', an oven station 24', and a packaging station 25'. For the sake of brevity, only the portion of this second embodiment 10' that differs substantially from the first embodiment 10 will be described below.

The Canister Station

The canister station 12 includes a plurality of canisters 26. Each canister 26 contains fresh dough. The canisters 26 are stored in a refrigerated portion of the housing 200 for the apparatus, which is preferably maintained at a temperature of between 32° and 33° F. Each canister preferably has an internal diameter of approximately 4 inches and is approximately 8 inches in axial length.

Referring now to FIGS. 3–12, canisters 26 are stored with the use of a series of ramps 28, which feed the canisters to a stop assembly 30. The canister received in the stop assembly will be referred to as canister 26'. Stop assembly 30 includes a kick mechanism 32 disposed below canister 26' and a retaining mechanism 34 disposed above canister 26'. Stop assembly 30 prevents canister 26' from proceeding to a dough extruder position 36 (See FIG. 5). When the canister 26 disposed in the dough extruder position 36 is empty (i.e., the canister has had all of its dough removed therefrom) the kick and retaining mechanisms are actuated to remove the axial front cover or lid 38 from canister 26'.

Figure 7:
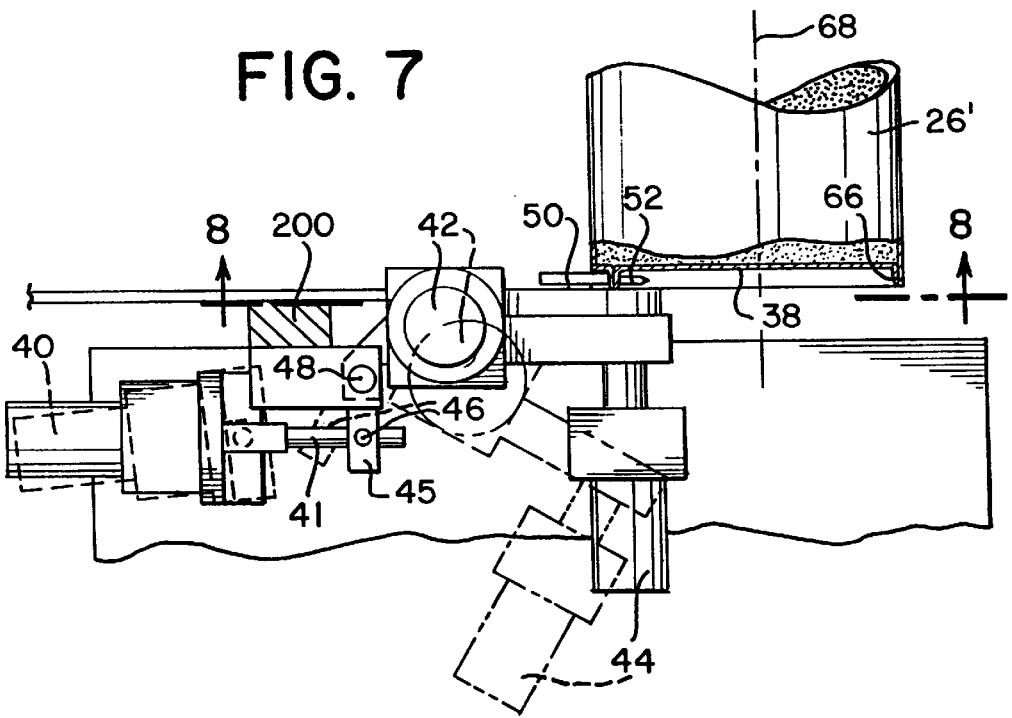
FIG. 7 is a top plan view of the kick mechanism illustrated in FIG. 6.
Figure 8:
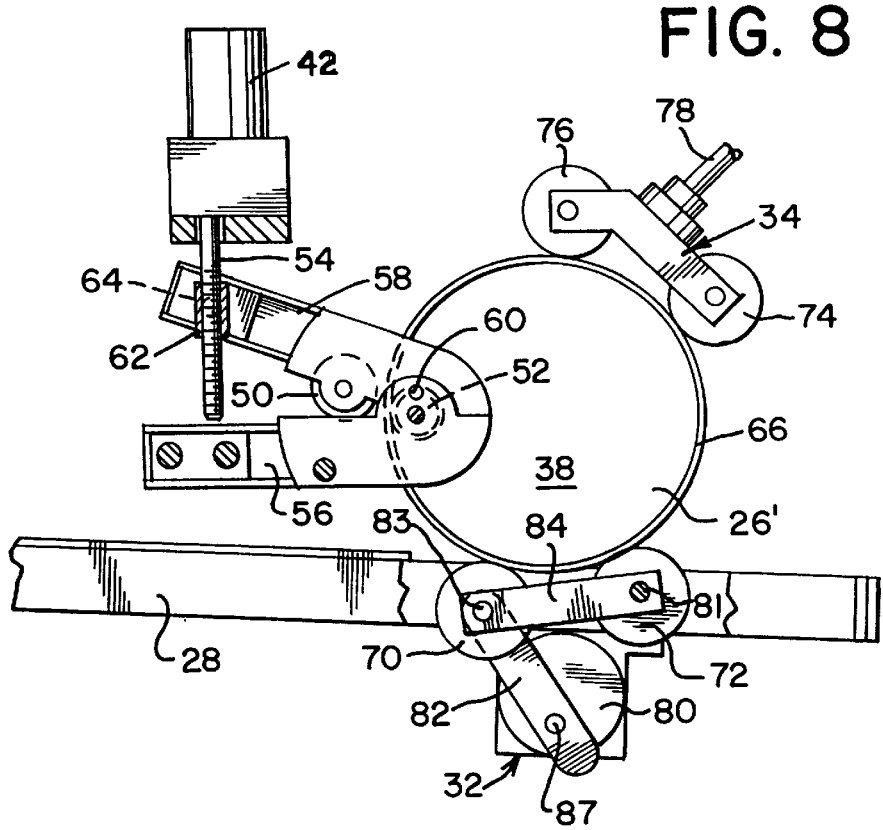
FIG. 8 is a sectional view taken along line 8—8 of FIG. 7 and looking in the direction of the arrows.
Figure 9:
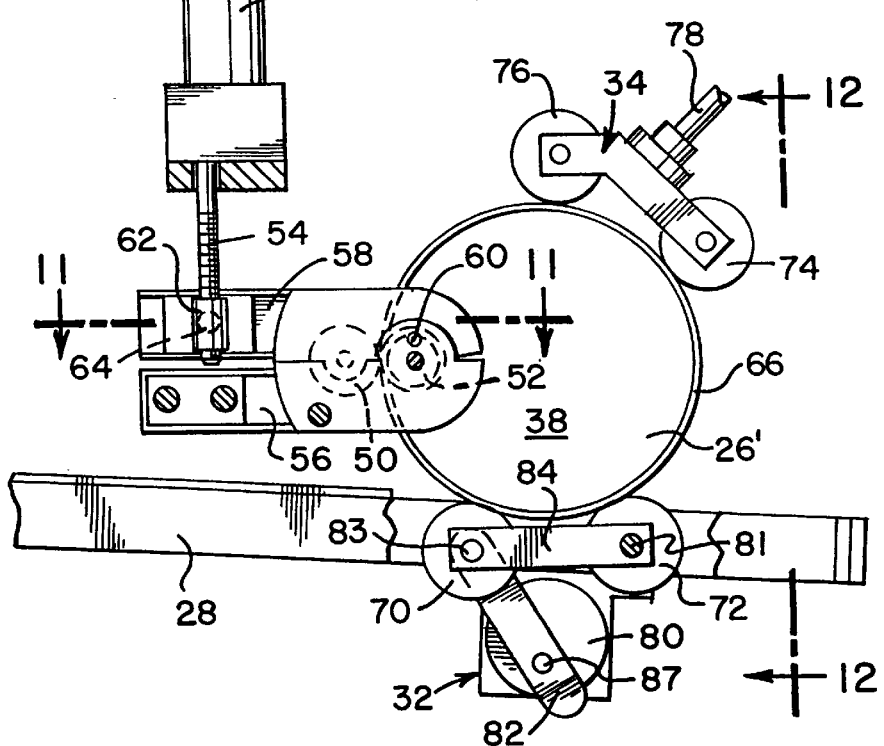
FIG. 9 is a sectional view similar to FIG. 8, but with the cutting mechanism in the engaged position.

The canister opening mechanism (see FIGS. 6–12) includes a first motor 40, which pivots the canister opening mechanism between an engagement position with lid 38, as illustrated in solid lines in FIG. 7, and a retracted position, as illustrated in phantom in FIG. 7. A second motor 42 pivots the handles of the canister opening mechanism between an open position (FIG. 8) and a closed position (FIG. 9). First motor 40 is connected to a reciprocating shaft 41 (See FIG. 7). Shaft 41 is pivotably connected to a "L" shaped bracket 45 via pivot pin 46.

Normally, the can opening mechanism is in the retracted position, which is illustrated in phantom in FIG. 7. Thus, the can opening mechanism is pivoted away from canister 26'. When a new canister is required in the dough extruder position 36, the can opening mechanism is first actuated to remove lid 38 from canister 26'. Motor 40 is actuated to advance shaft 41 which causes the pivot pin 46 to move from the position illustrated in phantom in FIG. 7 to the position illustrated in solid lines in FIG. 7. Thus, the cutting mechanism, including second motor 42 and a third motor 44, moves from the retracted position into the engagement position. Motor 42 is then actuated causing threaded rod 54 to rotate (FIGS. 8 and 9). A first cutting wheel 52 is fixedly mounted on fixed handle 56. A second pressure wheel 50 is fixedly mounted on pivoting handle 58. Handles 56, 58 pivot about pivot point 60, which is the pivot point of first cutting wheel 52. An internally threaded sleeve 62 is pivotably mounted to the pivoting handle 58 about pivot 64. Thus, when threaded rod 54 rotates in a first direction, threaded sleeve 62 moves from the position illustrated in FIG. 8 to the position illustrated in FIG. 9 causing handle 58 to move from the open position to the closed position. As handle 58 is pivoted towards fixed handle 56, pressure wheel 50 moves into engagement with a lip 66 behind lid 38 of the canister 26' disposed in the kick and retaining mechanism (See FIG. 11). Thus, pressure wheel 50 is disposed on the external cylindrical surface of lip 66 and cutting wheel 52 is disposed on the internal cylindrical surface of lip 66 in front of lid 38 (see FIG. 11).

The third motor 44 is now actuated to rotate internal cutting wheel 52. As cutting wheel 52 rotates, lip 66 is cut due to the engagement of wheels 50, 52. Canister 26' is permitted to rotate about its longitudinal axis 68 (FIG. 7) due to the guiding action of rollers 70, 72, 74, 76. After at least one complete revolution of canister 26', lid 38 is separated from canister 26' and the cutting mechanism can now be moved to the retracted position illustrated in phantom in FIG. 7. Accordingly, motor 44 is stopped. Motor 40 is actuated to cause shaft 41 to reciprocate towards motor 40, which causes the cutting mechanism to move to the retracted position illustrated in phantom in FIG. 7. Motor 42 is then actuated in the reverse direction causing threaded rod 54 to rotate in the opposite direction, which causes handle 58 to move from the position illustrated in FIG. 9 to the position illustrated in FIG. 8 (i.e., from the closed position to the open position). The cutting mechanism has thus been pivoted away from canister 26'. The separated lid 38 is free to fall into a garbage dispenser below (not shown) and the now opened canister 26' is ready to be advanced to the dough cutting station 14.

Referring now to FIGS. 5A, 5B, 10 and 12, the open canister 26' can now be removed from the stop assembly 30 and advanced to the dough extruding position 36. To remove canister 26' from the stop assembly 30, the retaining mechanism 34 is first moved from the position illustrated in phantom in FIG. 10 to the position illustrated in solid lines in FIG. 10. Shaft 78 is retracted due to the actuation of a motor (not shown) which is operably connected to shaft 78 in a manner known in the art. Kick mechanism 32 includes rollers 70, 72 and cam 80. Roller 72 is free to rotate about fixed pivot point 81. Roller 70 rotates about free pivot point 83. A motor 86 selectively causes cam 80 to rotate about its longitudinal axis 85. Link 82 is eccentrically connected to cam 80 about pivot point 87. Link 82 pivotably connects cam 80 to roller 70. A link 84 pivotably connects rollers 70, 72.

Figure 10:
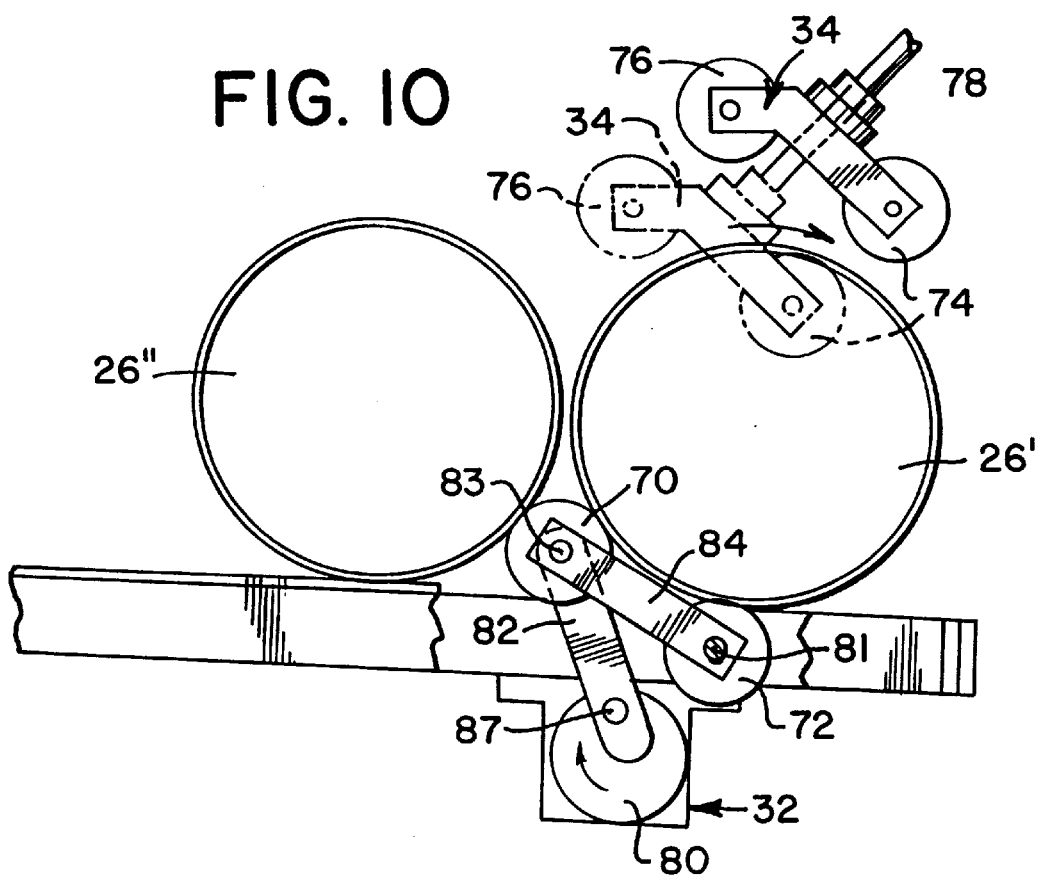
FIG. 10 is a left side elevational view of the kick mechanism in various positions.
Figure 11:
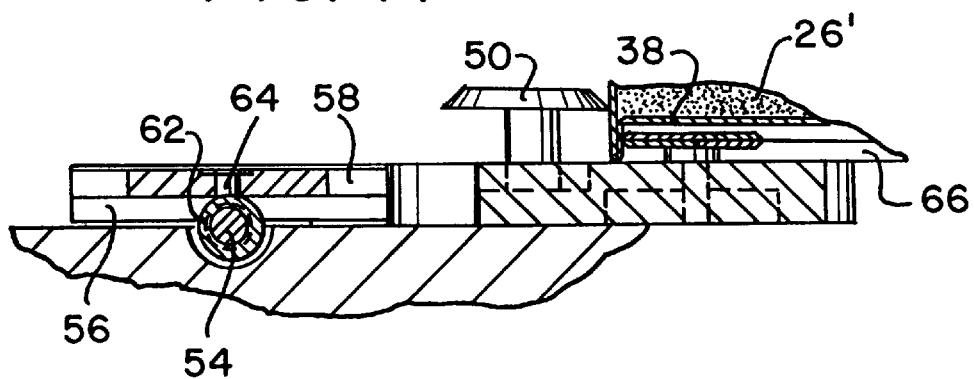
FIG. 11 is a sectional view taken along the line 11—11 of FIG. 9 and looking in the direction of the arrows.

In operation, cam 80 is rotated from the position illustrated in FIG. 8 to the position illustrated in FIG. 10 causing link 82 to move upwardly, which causes roller 70 to move upwardly and advances canister 26' to the right as illustrated in FIG. 10 toward the dough extruder position 36. In this position, roller 70 also prevents canister 26" from advancing to the kick and retaining mechanism. Once canister 26' is advanced to the dough extruding position 36, shaft 78 is returned to the position illustrated in phantom in FIG. 10. Cam 80 is rotated in the reverse direction so that roller 70 is returned to the position illustrated in FIG. 8. Thus, the next canister 26" is ready to be released by a canister delivery mechanism 27 so that it may gently advance and stop in the stop assembly 30 and is ready to be opened as soon as the just advanced canister 26' has had all of the dough contained therein removed by a dough extruder, which will be described below.

The canister delivery mechanism 27 includes a motor 29 that rotatably drives a cam 31. A link 33 pivotably connects cam 31 to a pivoting jaw member 35. Jaw 35 is comprised of two C-shaped arms 37, 39. One jaw is disposed at each axial end of the canister 26" (see FIG. 5B). Arms 37, 39 are connected together by rods 47 and by stop bars 43, 45. The stop bars are disposed at the open ends of the jaws 37, 39.

In operation, jaw member 35 pivots about the axis of the central rod 47 and moves between a canister retaining position illustrated in solid lines in FIG. 5A and a single canister release position illustrated in phantom lines in FIG. 5A. To release a single canister 26, motor 29 is actuated so that its output shaft rotates by one complete revolution. Link arm 33, which is eccentrically mounted on cam 31, thereby causes jaw member 35 to pivot from the canister retaining position to the single canister release position (thereby releasing only canister 26") and back to the canister retaining position.

Figure 40:
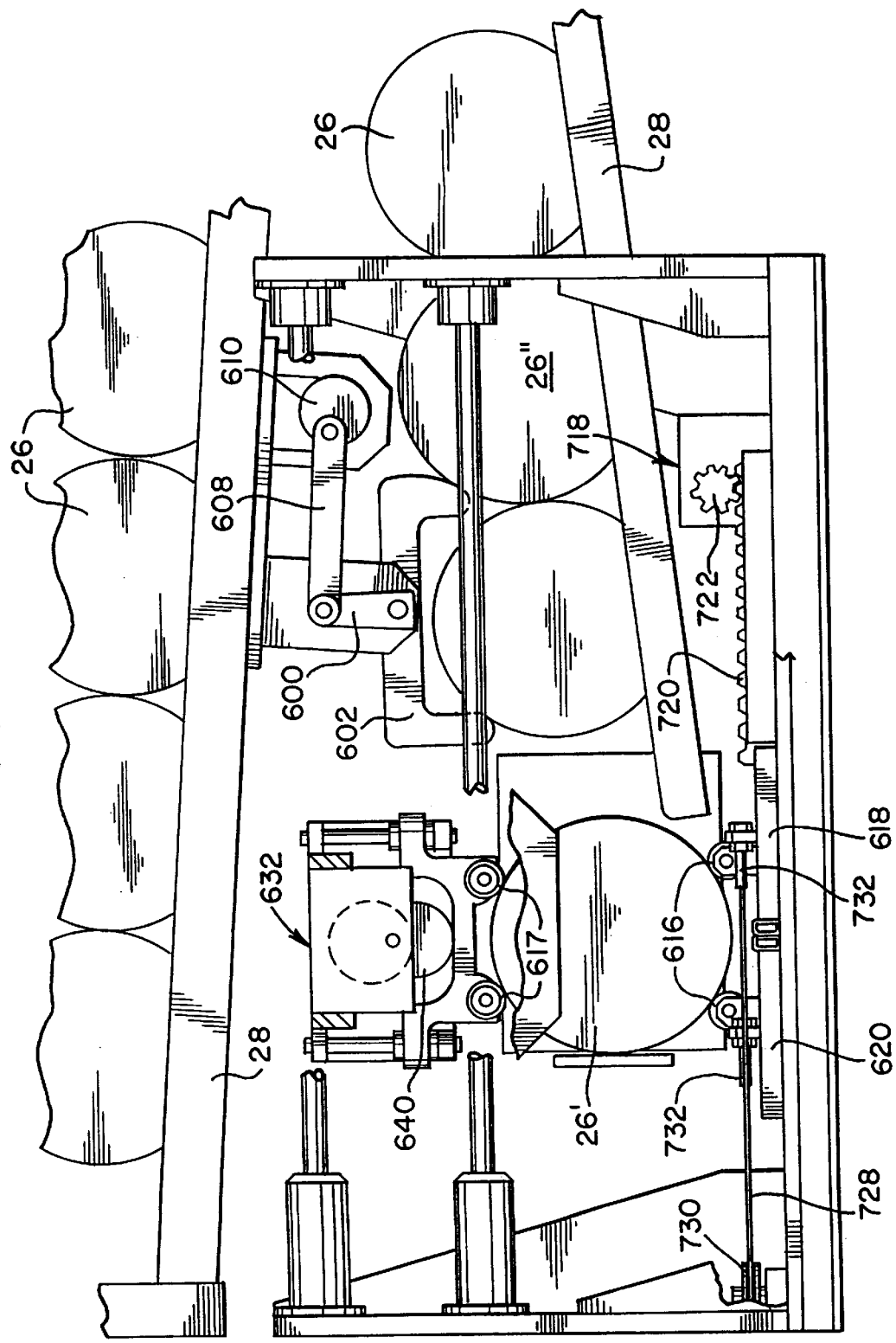
FIG. 40 is a side view of the canister separator mechanism.

Referring now to FIGS. 40–53, a second embodiment of the canister station is illustrated. Referring now to FIG. 40, a side view of the canister station is illustrated. The canisters 26 are loaded at the top, left-hand side (as viewed in FIG. 40) and due to the declination of the tracks, canisters 26 roll down accordingly. The initial canister 26" stops at the canister separator mechanism 602.

Separator mechanism 602 is illustrated in FIGS. 41 and 42, which are a side view and top view, respectively. Canister 26" is prevented from rolling down the track due to the separator arms 604. The arms are linked to a lever arm 606, which is linked to a connecting rod 608, which in turn is connected to an eccentric disk 610. Eccentric disk 610, which is coupled to a motor 612, allows the lever arm to pivot by a fixed angle thereby allowing the initial canister 26" to advance to the dough cutting station. The geometry of the separator arms prevents the remaining canisters upstream of initial canister 26" from moving, until it is time for the next canister to be cut (i.e., until the lever arm 606 is pivoted once again).

Once a canister has been separated from the rack, it rolls to a stop at the cutting station 614 (see FIG. 40). Canister 26' (as above, the canister received in the stop assembly is referred to as canister 26') is resting on top of four lower rollers 616, two on each side of the canister (only two of the rollers 616 are shown in FIG. 40). Rollers 616 are rotatably mounted on a first dispensing door 618 and a second dispensing door 620. Additionally, canister 26' is selectively engaged by two upper rollers 617, one on each side of the canister. The next operation is to remove the lid from the canister (i.e., the canister opening mechanism).

The first step is to advance the canister to the canister lid cutter mechanism 614 by a canister pusher mechanism 622. Pusher mechanism 622 advances canister 26' in the axial direction (see FIGS. 43–46).

Figure 44:
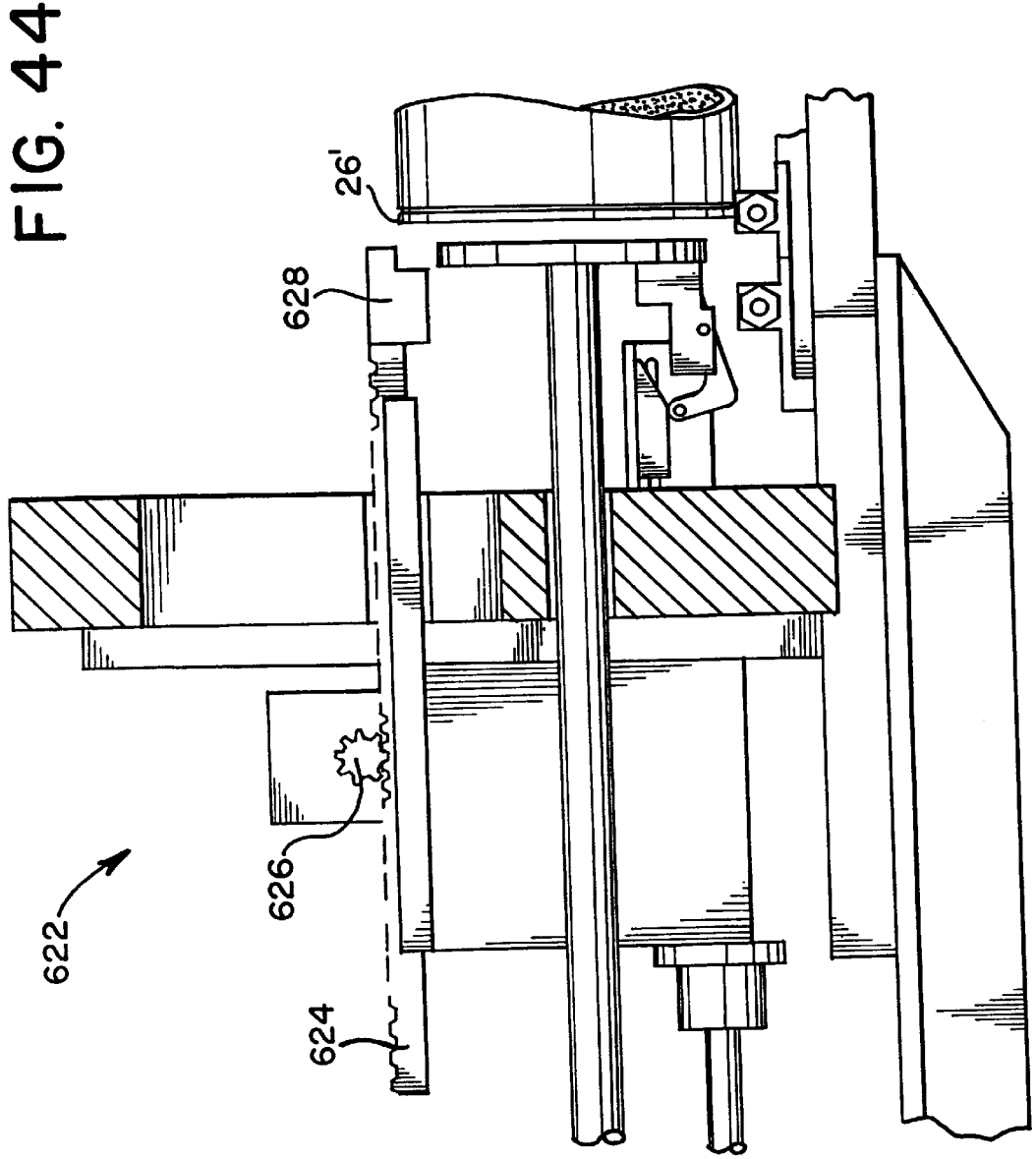
FIG. 44 is an enlarged front view of the canister pusher mechanism.
Figure 45:
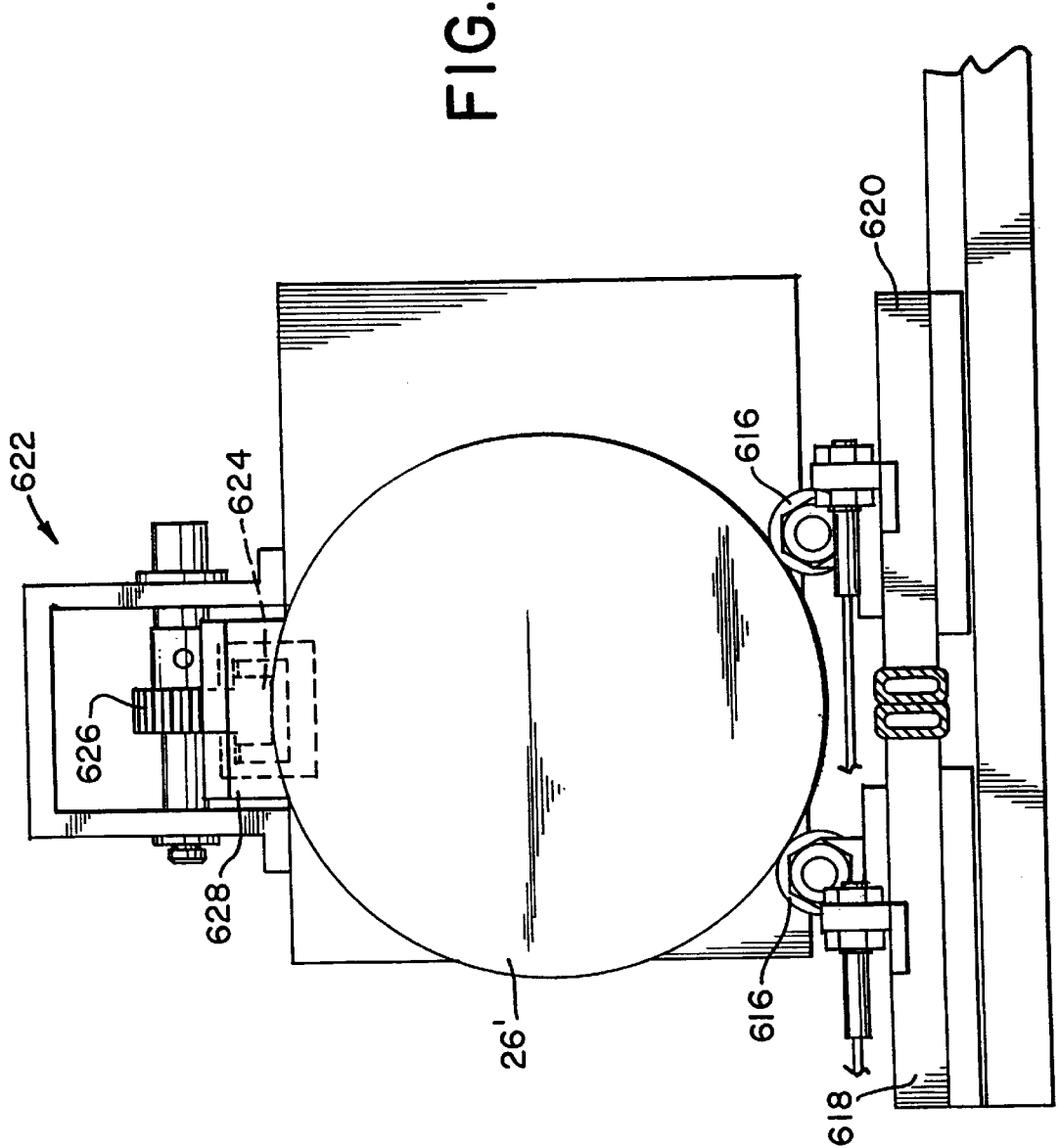
FIG. 45 is an enlarged side view of the canister pusher mechanism.
Figure 48:
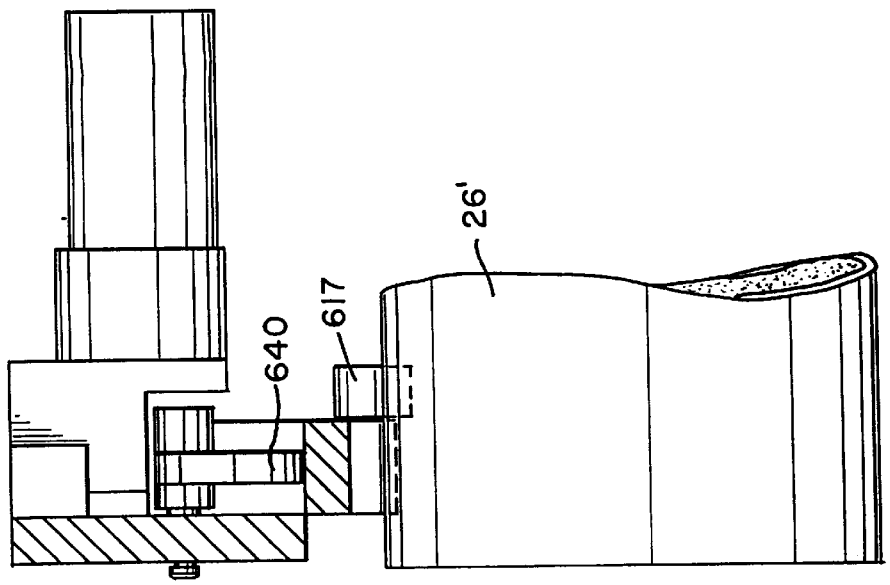
FIG. 48 is an enlarged front view of the canister top roller mechanism.
Figure 47:
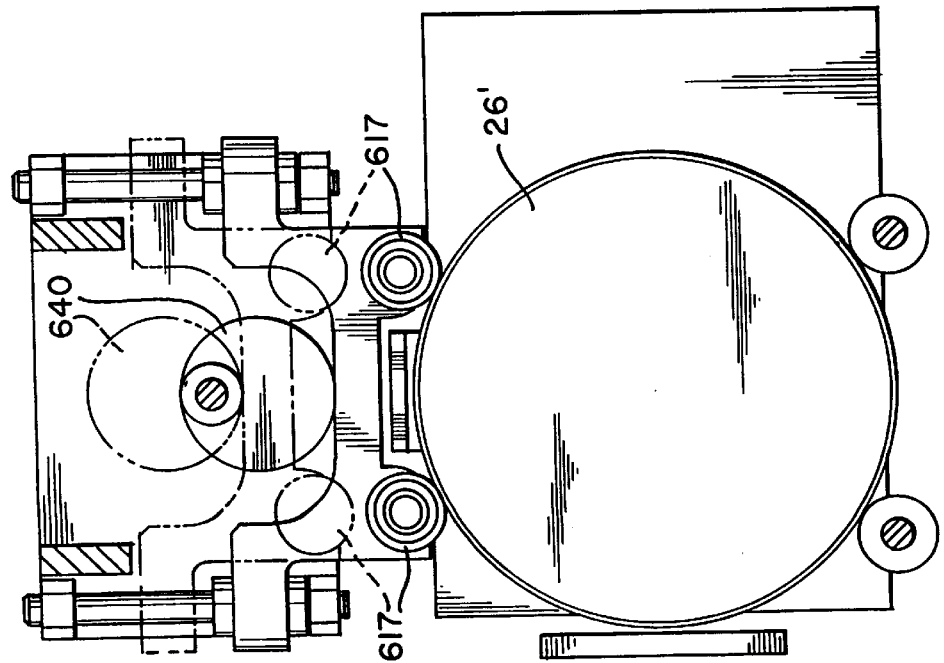
FIG. 47 is an enlarged side view of the canister top roller mechanism.

FIGS. 44 and 45 illustrate a front view and side view, respectively, of the canister pusher 622. Pusher 622 includes a rack 624 and pinion drive 626, where rack 624 acts as a pushing arm. At the end of rack 624 is an adapter 628 that makes contact with the canister 26'. Pinion gear 626 is pinned to a shaft, which in turn is coupled to a motor (see FIG. 45).

Canister pusher 622 has three axial positions. The first position 630 is the fully retracted position and is considered the home position. The second position is where pusher 622 advances the canister 26' to the canister lid cutter station 614. The third position is where the canister pusher 622 advances the canister 26' to the dough cutting station 14'.

Once the canister is at the canister lid cutter station 614 (position 2 of the canister pusher), the canister's lid can be cut off and removed. Two main mechanisms are involved in this operation; canister top roller 632 and canister lid cutter 634. (See FIG. 43).

Canister top roller 632 holds down and prevents canister 26' from moving out of the cutter station 614. The canister top roller mechanism 632 is shown in a side view in FIG. 46. This mechanism includes rollers 617 that selectively contact the canister 26'. Rollers 617 permit canister 26' to rotate about its axis smoothly when its canister lid is being cut.

Rollers 617 move between an upper limit position (shown in phantom in FIGS. 46 and 47) and a lower limit position. The normal position of rollers 617 is the retracted or upper limit position so that when canister 26' is rolling into the cutting station, it will avoid contacting the canister top roller mechanism 632. Rollers 617 are rotatably mounted on a roller housing plate 634 (see FIGS. 47 and 48), which has, at its extremities, two linear bearings 636 that each ride on a shaft 638. Roller housing plate 634 moves between the upper limit position and the lower limit position because an eccentric disk 640, which is coupled to a motor 641, selectively rotates. Springs (not shown) bias the roller housing plate 634 into the upper limit position to ensure that the housing plate 634 is in constant contact with the eccentric disk 640.

In the lower position, the motor rotates the eccentric disk 640, thus forcing the roller housing plate down where rollers 617 contact with canister 26'. The motor is stopped so that the roller 617 will remain in contact with canister 26' until the canister lid is cut and removed.

Figure 49A:
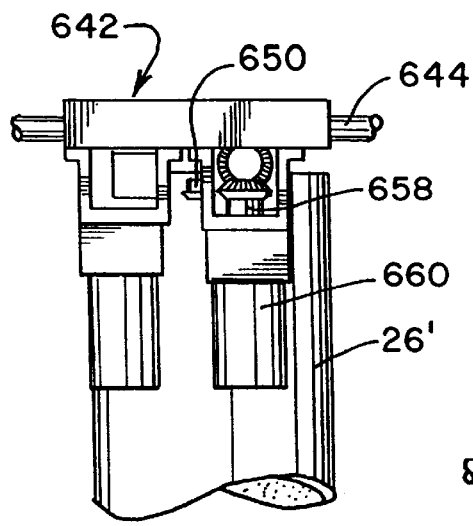
FIGS. 49A–C are a top, front and side view, respectively, of the canister lid cutter mechanism.
Figure 49C:
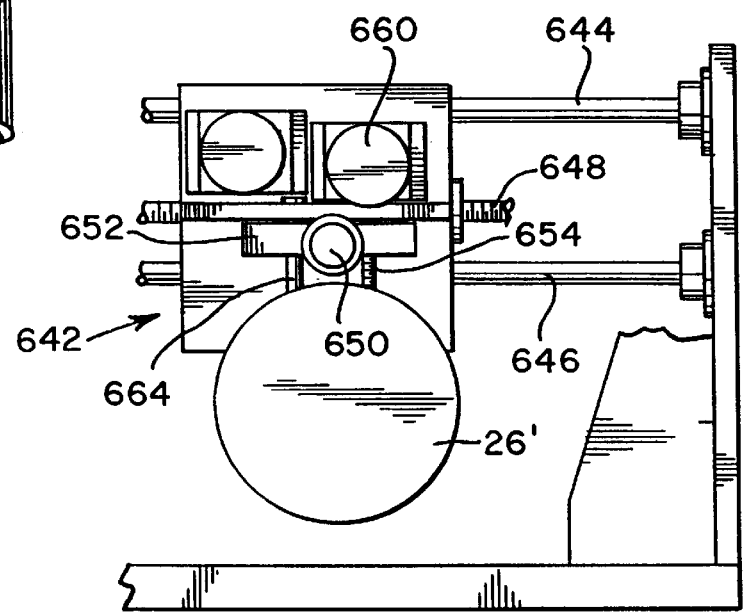
Figure 49B:
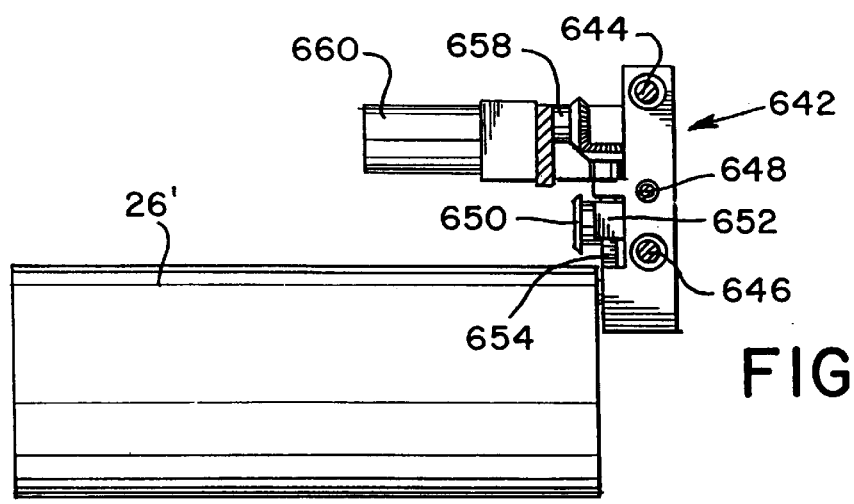

FIGS. 49A–C illustrate a top, front, and side view, respectively, of the canister lid cutter mechanism 642. The canister lid cutter is supported on two shafts 644, 646 and a center shaft 648 that is externally threaded. When the threaded rod 648 rotates, the canister lid cutter mechanism 642 moves adjacent to the canister 26', the lid of the canister is cut and removed, and, thereafter, the cutting mechanism 642 travels back to the home station with the removed lid to dispose of the lid.

Figure 50:
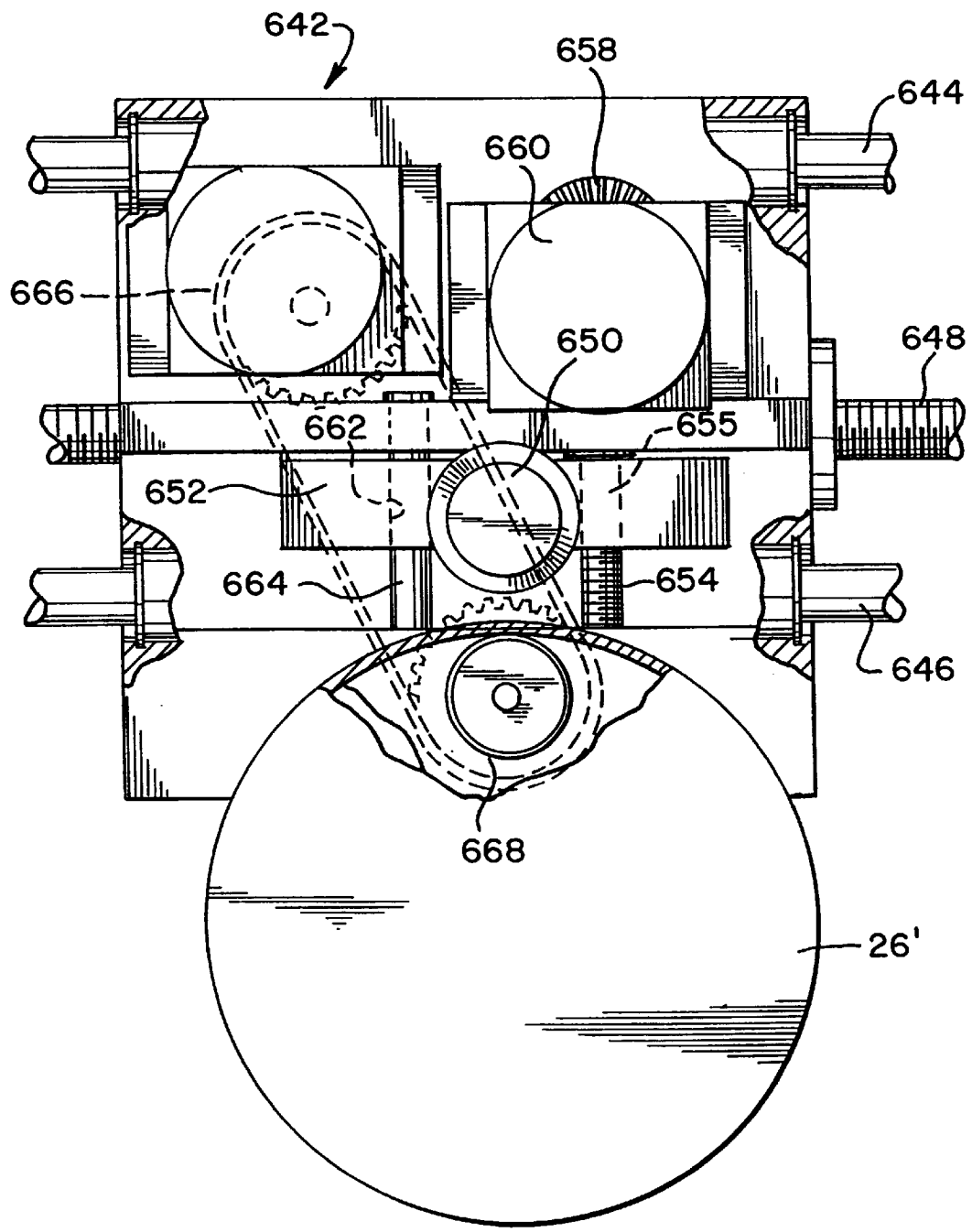
FIG. 50 is an enlarged side view of the canister lid cutter mechanism.
Figure 51:
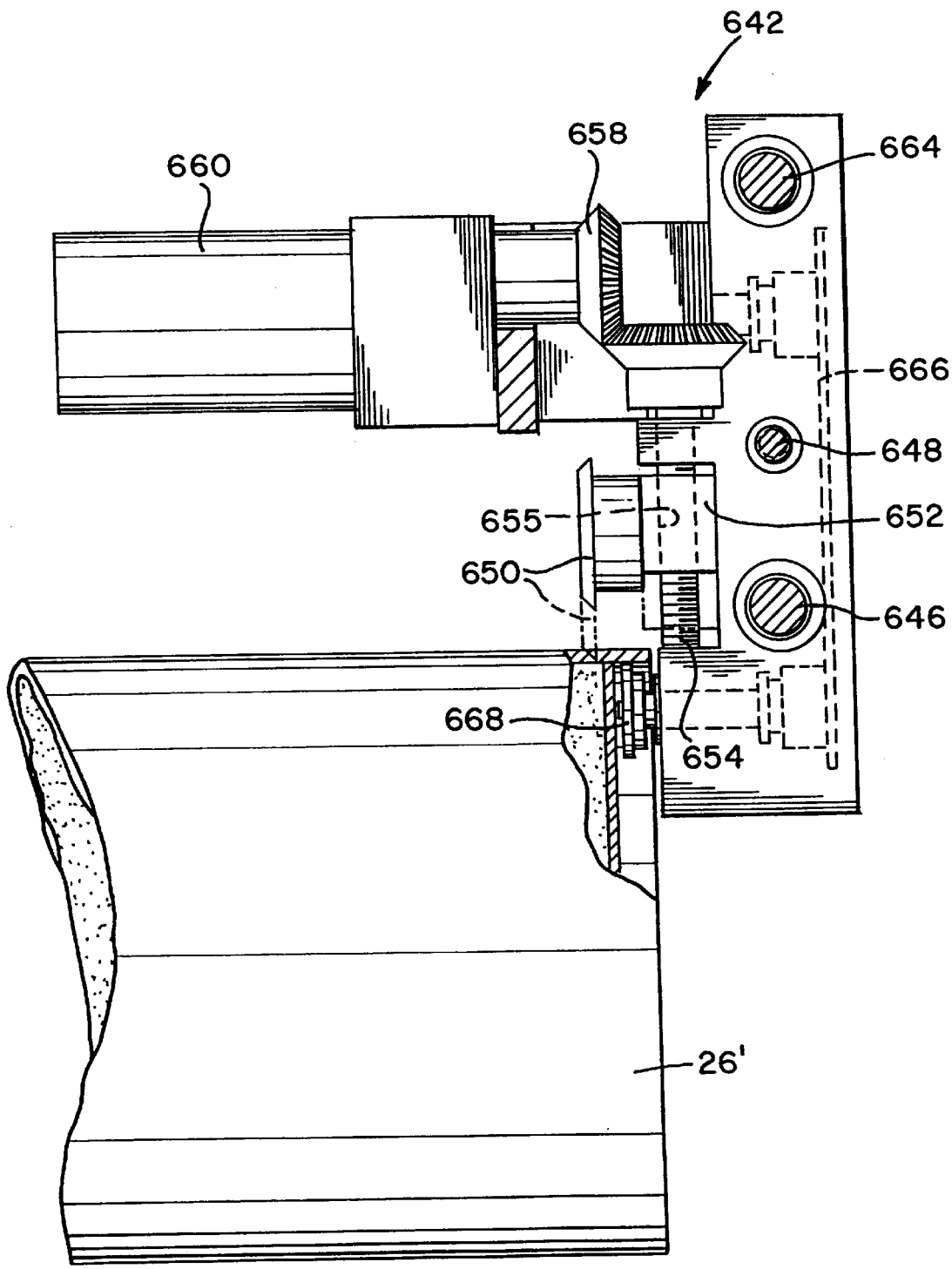
FIG. 51 is an enlarged front view of the canister lid cutter mechanism.
Figure 52:
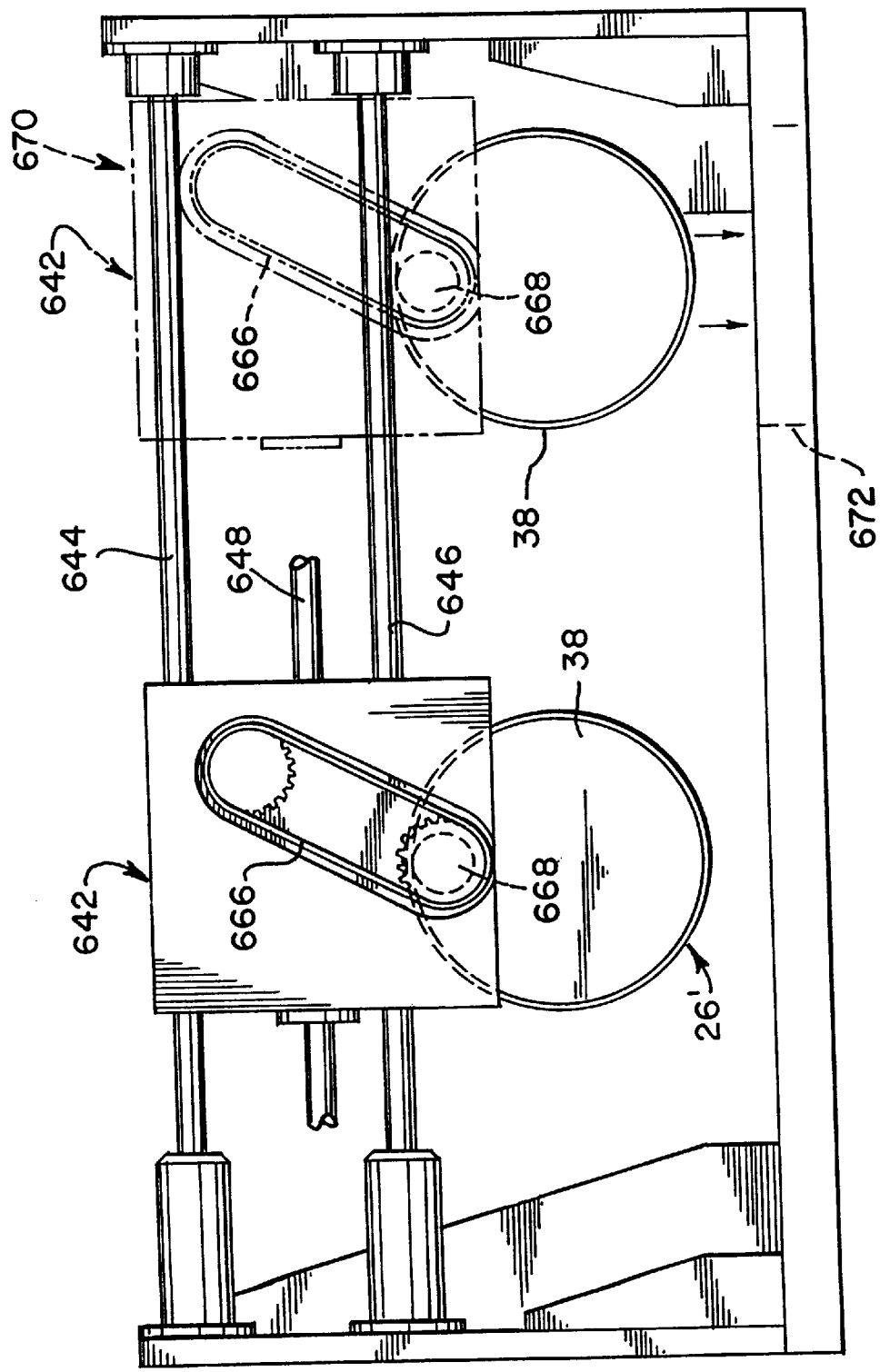
FIG. 52 is a side view of the canister lid cutter mechanism.

FIGS. 50–52 illustrate an enlarged view of the side view, front view and the side view again, of the canister lid cutter mechanism 642. FIG. 52 also illustrates the home position of the cutter mechanism 642.

A cutter blade 650 is shown in the retracted position (in solid lines) and in the extended or engaged position (in phantom lines) in FIG. 51. Blade 650 is located on a blade housing plate 652 which extends and retracts upon rotation of a threaded shaft 654 (See FIG. 51), which is threadably received in an internally threaded through bore 655 in blade housing plate 652. One end of shaft 654 has a miter gear 656 pinned to it. A corresponding miter gear 658 is coupled to a motor 660. The blade housing plate 652 has a second guide through bore 662 that receives a guide shaft 664 to maintain plate 652 in an aligned position. Motor 660 is actuated to cause housing plate 652 to move to the extended position, thereby causing cutter blade 650 to penetrate into canister 26', as illustrated in phantom in FIG. 51.

Rotation of a sprocket/chain drive 666 causes a cutting wheel 668 to rotate, which in turn allows canister 26' to rotate. Because cutter blade 650 has penetrated into the canister, rotation of canister 26' causes the canister lid 38 to begin to be cut from the remainder of canister 26'. After at least one complete revolution of canister 26', lid 38 is separated from canister 26' and the lid cutter mechanism 642 can now return to the home position while still clenching the removed lid 38 (see FIG. 52). Once the lid cutter mechanism is in the home position 670, the blade housing plate 652 is retracted (by actuating motor 660), thus dropping the removed lid 38. The lid will fall into an opening 672 where it is guided to a waste receiving bin below (not shown).

Once the canister lid 38 has been disposed of, open ended canister 26', which is filled with dough, can now be advanced to the dough extruding position. In the dough extruding station, the dough is cut into individual pucks or disc-shaped pieces.

The canister pusher 622 now advances canister 26' to the third position so that the open canister 26' is in the dough cutting station 14'. Once the canister is snugly fit into the dough cutter blade housing, the extruder mechanism extrudes the dough from the canister so that it can then be cut into pucks.

Dough Cutting Station

Figure 2:
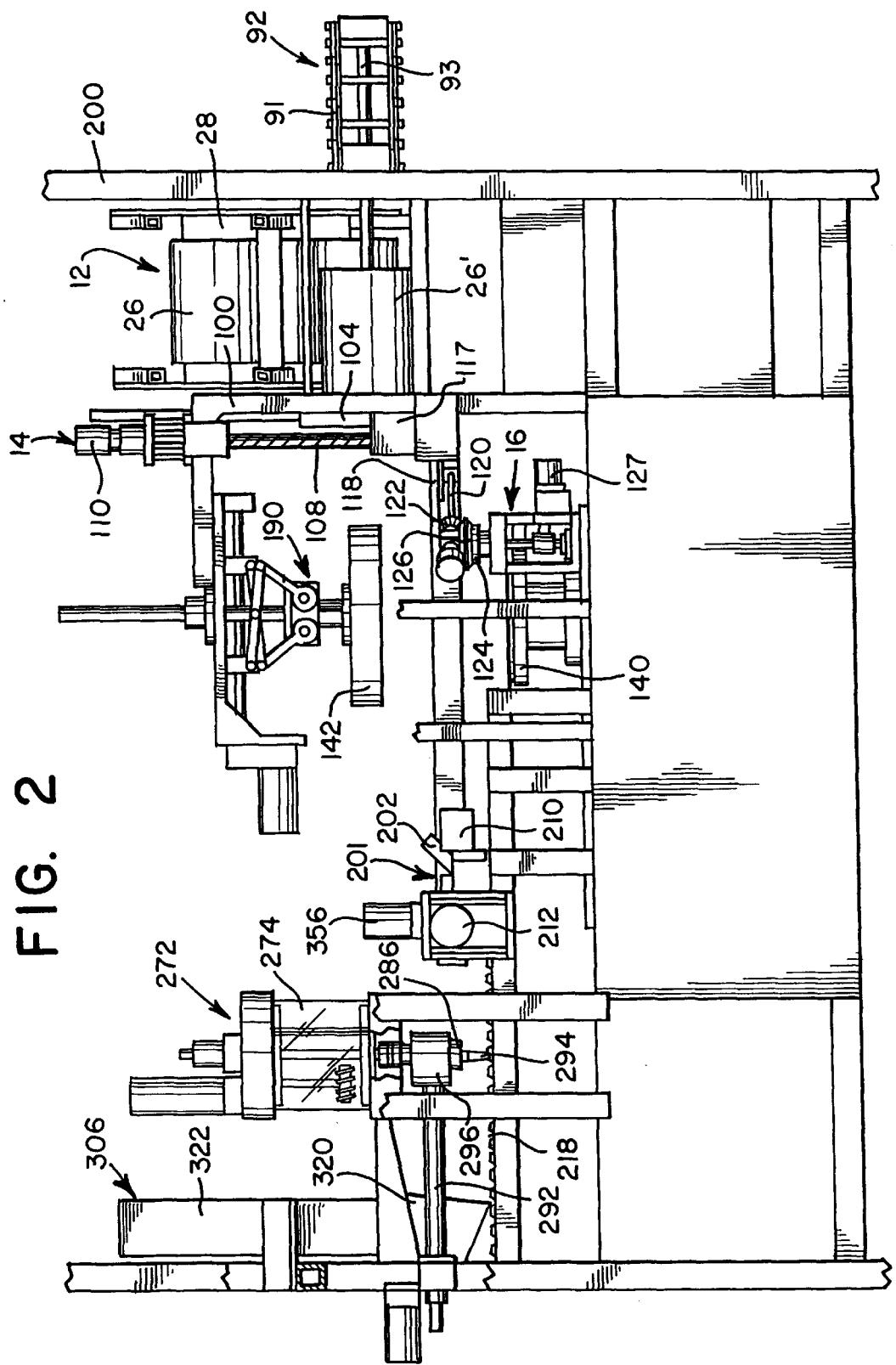
FIG. 2 is a front elevational view thereof.
Figure 3:
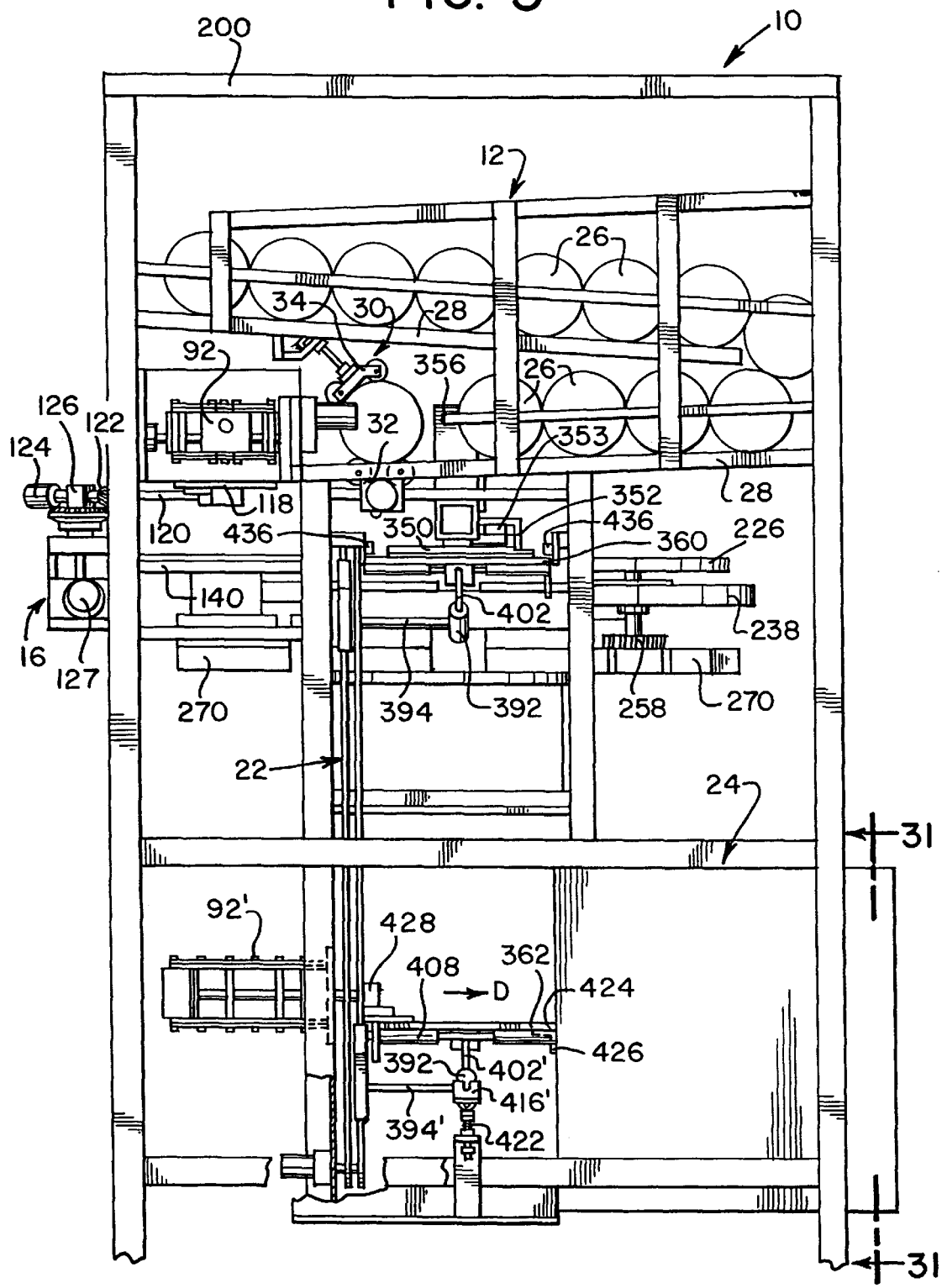
FIG. 3 is a right side view thereof.
Figure 4:
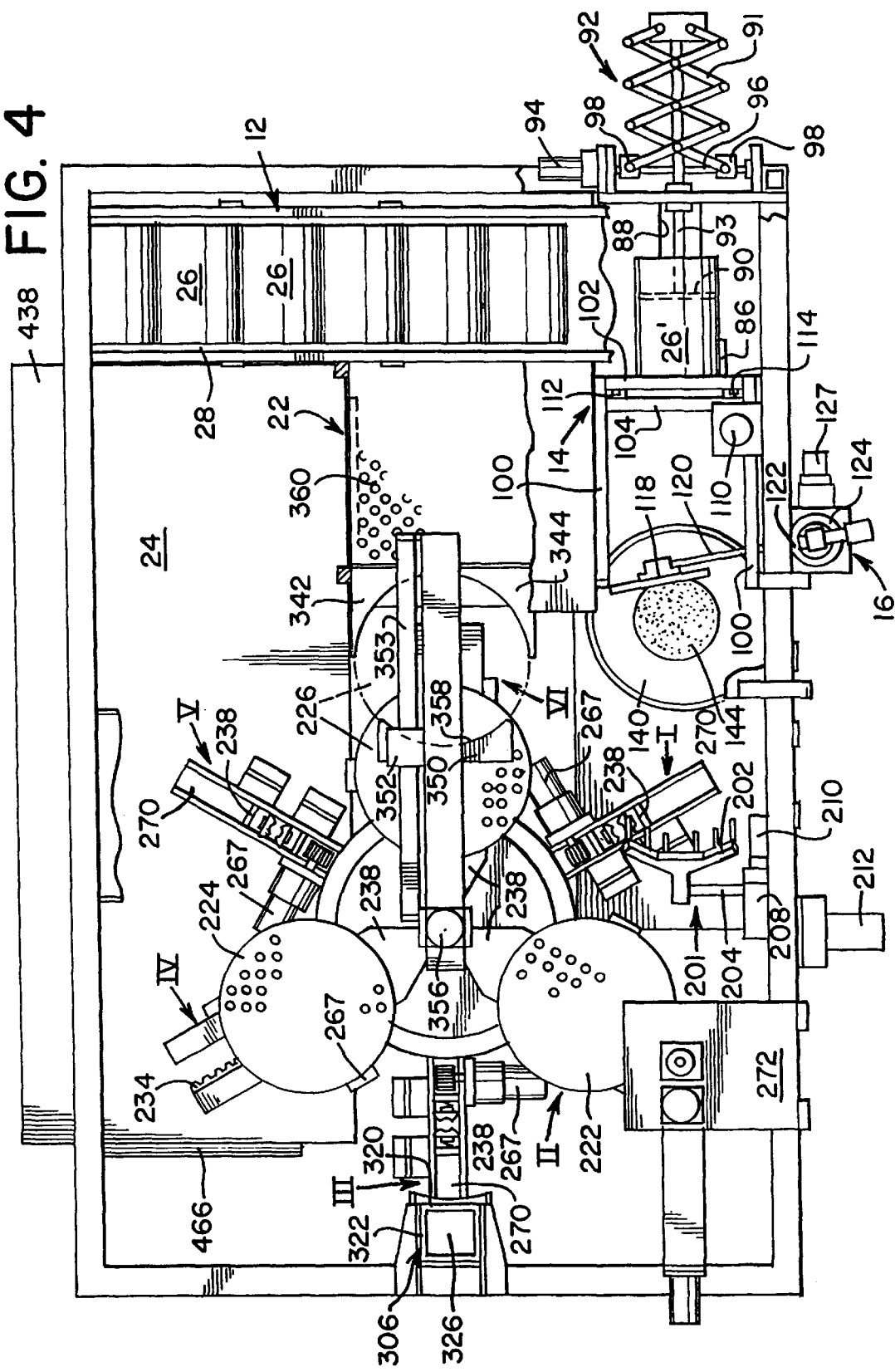
FIG. 4 is a top plan view thereof with parts broken away showing the rotary index table in different positions.
Figure 5:
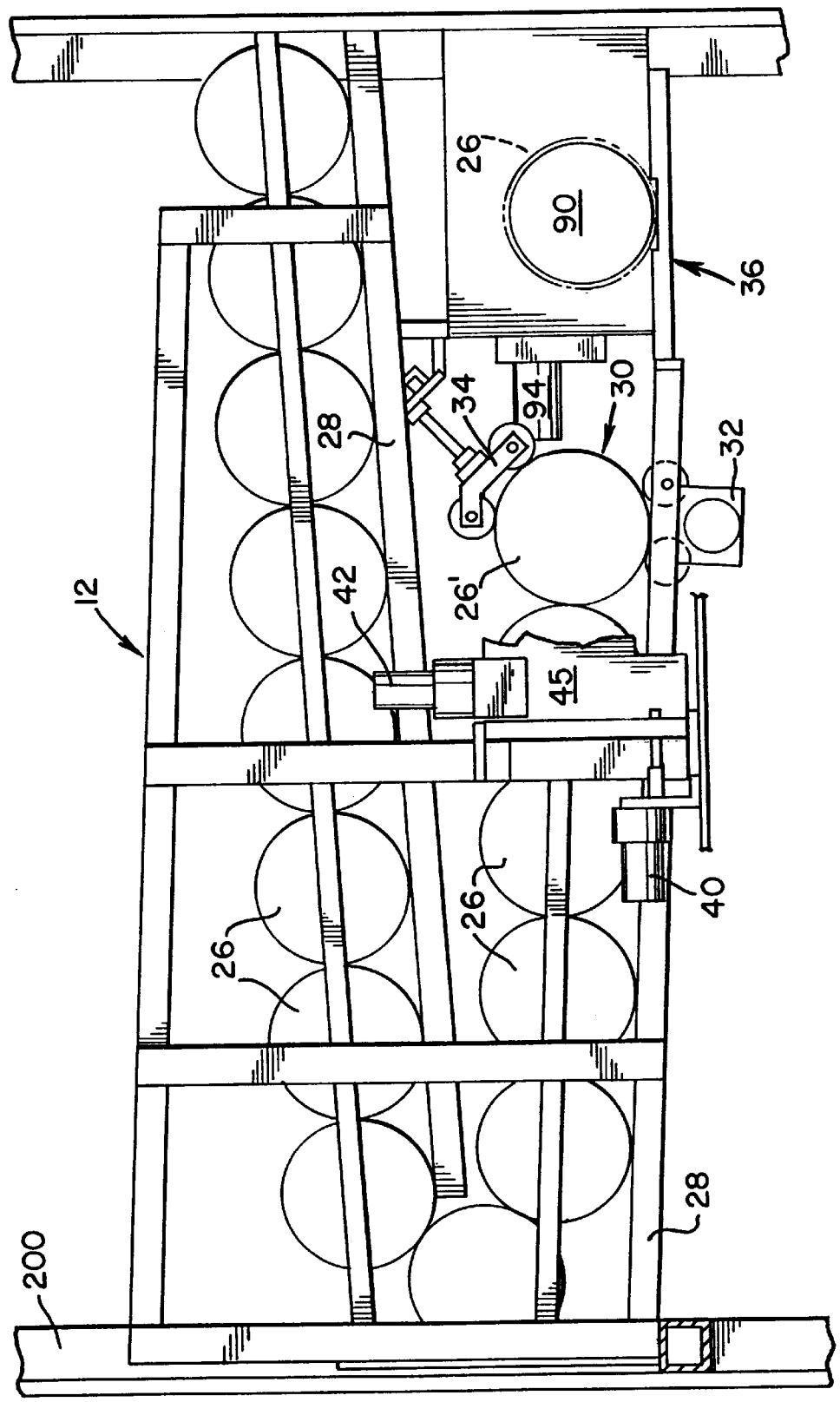
Figure 5B:
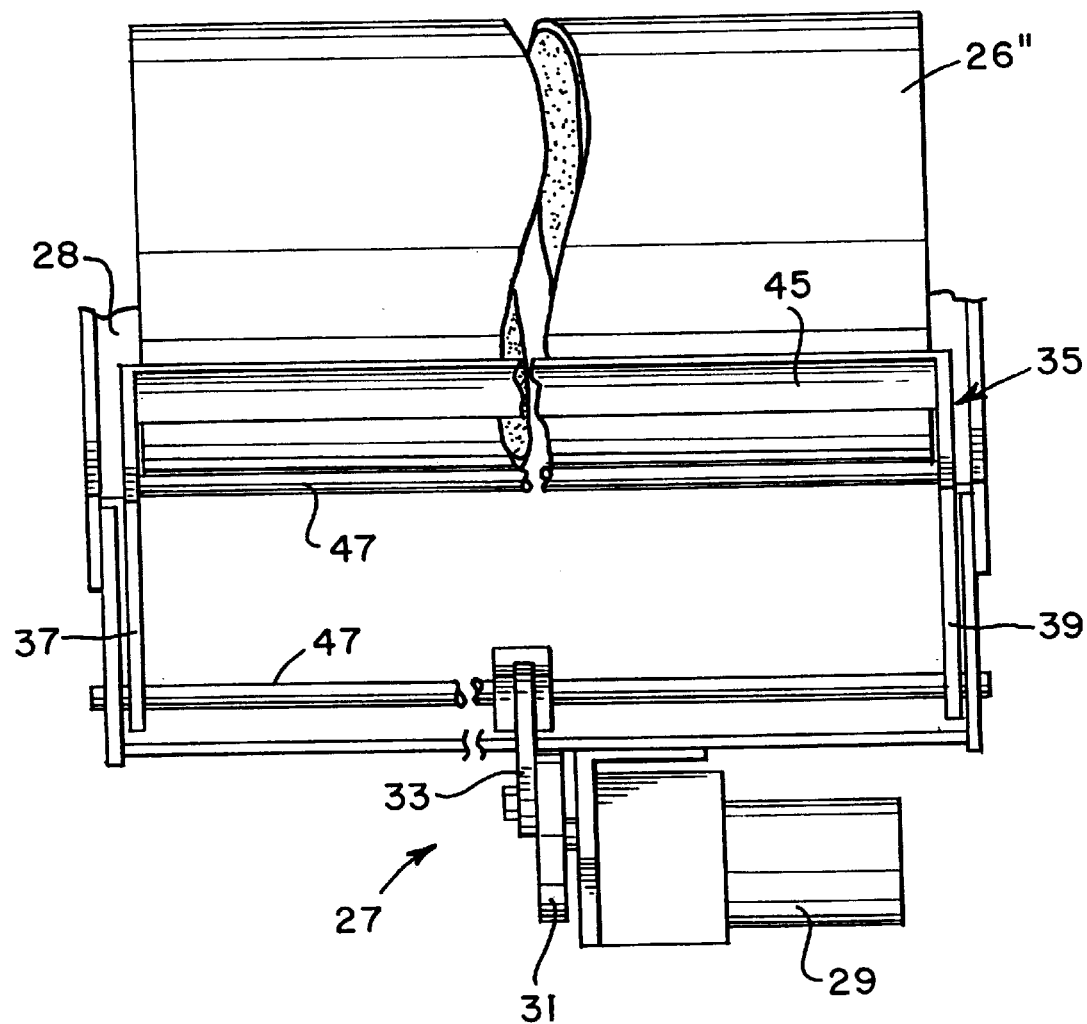
FIG. 5B is a sectional view taken along line 5B—5B of FIG. 5A and looking in the direction of the arrows.
Figure 6:
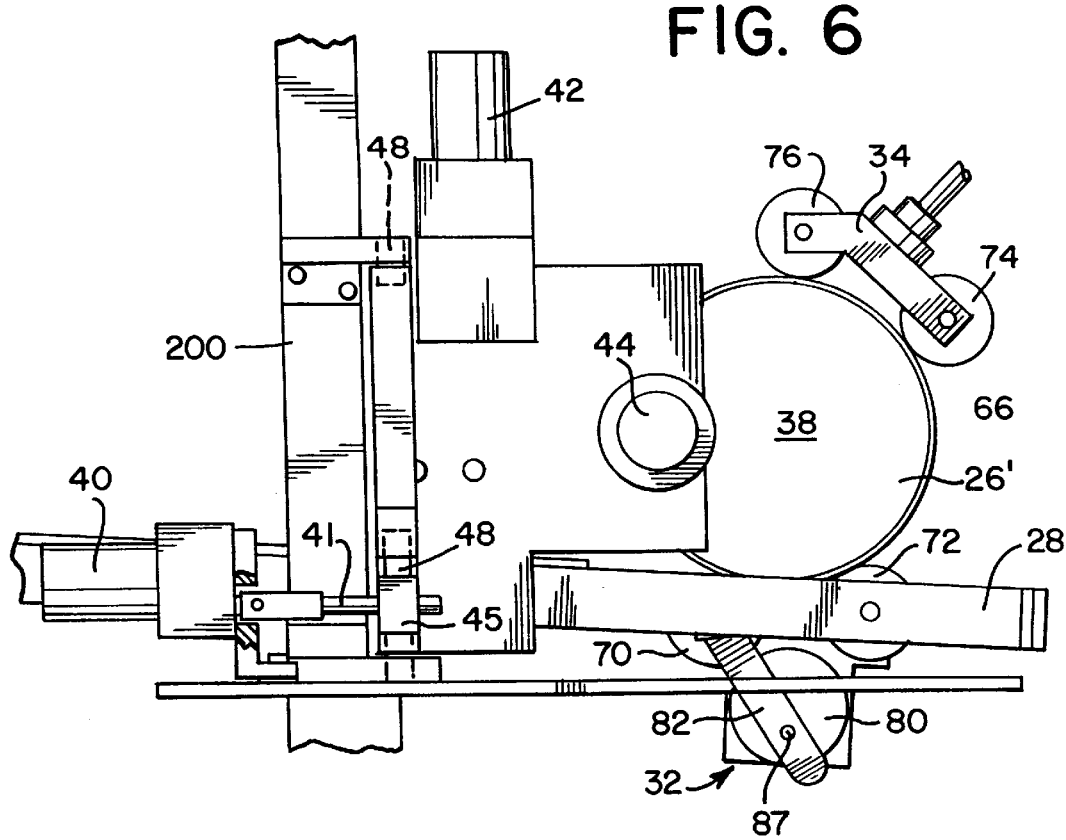
FIG. 6 is an enlarged left side elevational view of the kick mechanism.

Referring now to FIGS. 2 and 4, canister 26' is now positioned in the dough extruder position. The rear axial wall of each canister 26' is preferably a sliding piston-type wall. Canister 26' is held in the dough extruder position by a recess 88 disposed in the guide ramp. The rear axial sliding piston-type wall of canister 26 is advanced, to the left as viewed in FIG. 4, by a piston 90, which is actuated by mechanism 92. The rear axial sliding piston-type wall of canister 26 moves with respect to the tubular housing wall of the canister when actuated by piston 90.

As illustrated in FIGS. 1 and 4, the actuating mechanism 92 is operated by a reversible motor 94, which causes a threaded rod 96 to rotate. A pair of internally threaded guide bushings 98 are pivotably connected to a piston rod 93 via an accordion-type connection 91. Threaded rod 96 is threaded oppositely about its central point. Thus, when rod 94 rotates in a first direction, threaded bushings 98 are caused to move towards one another, thereby causing piston rod 90 to retract (i.e., to the right, as illustrated in FIG. 1). When motor 94 is rotated in the opposite direction, guide bushings 98 move away from one another thereby causing piston rod 93 to move in the advanced position towards canister 26' (i.e., to the left, as illustrated in FIG. 1). The accordion-type mechanism is used to conserve space. A hydraulic, pneumatic or solenoid actuating motor could also be used to actuate rod 93. However, these type of actuating devices would require additional structure to be disposed to the right of piston rod 93, as illustrated in FIG. 1. But if space is not a concern, such a known type of hydraulic, pneumatic or solenoid type of actuation mechanism may be used.

Figure 43:
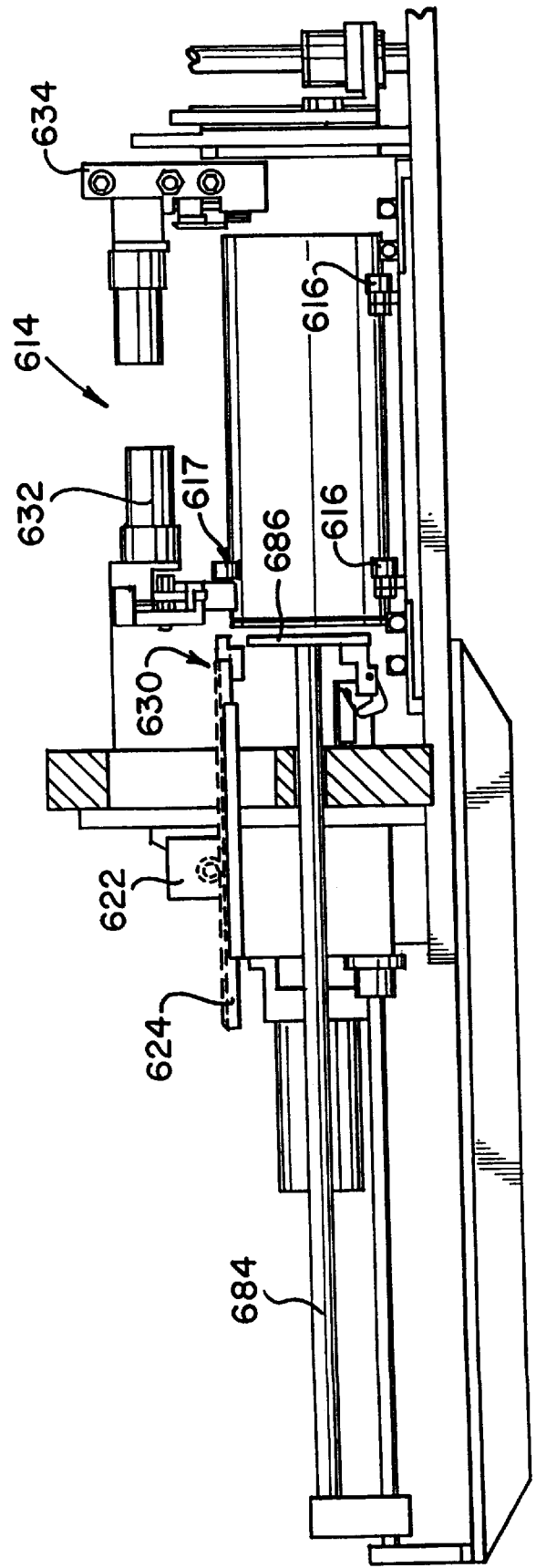
FIG. 43 is a front view of the canister pusher mechanism.
Figure 53:
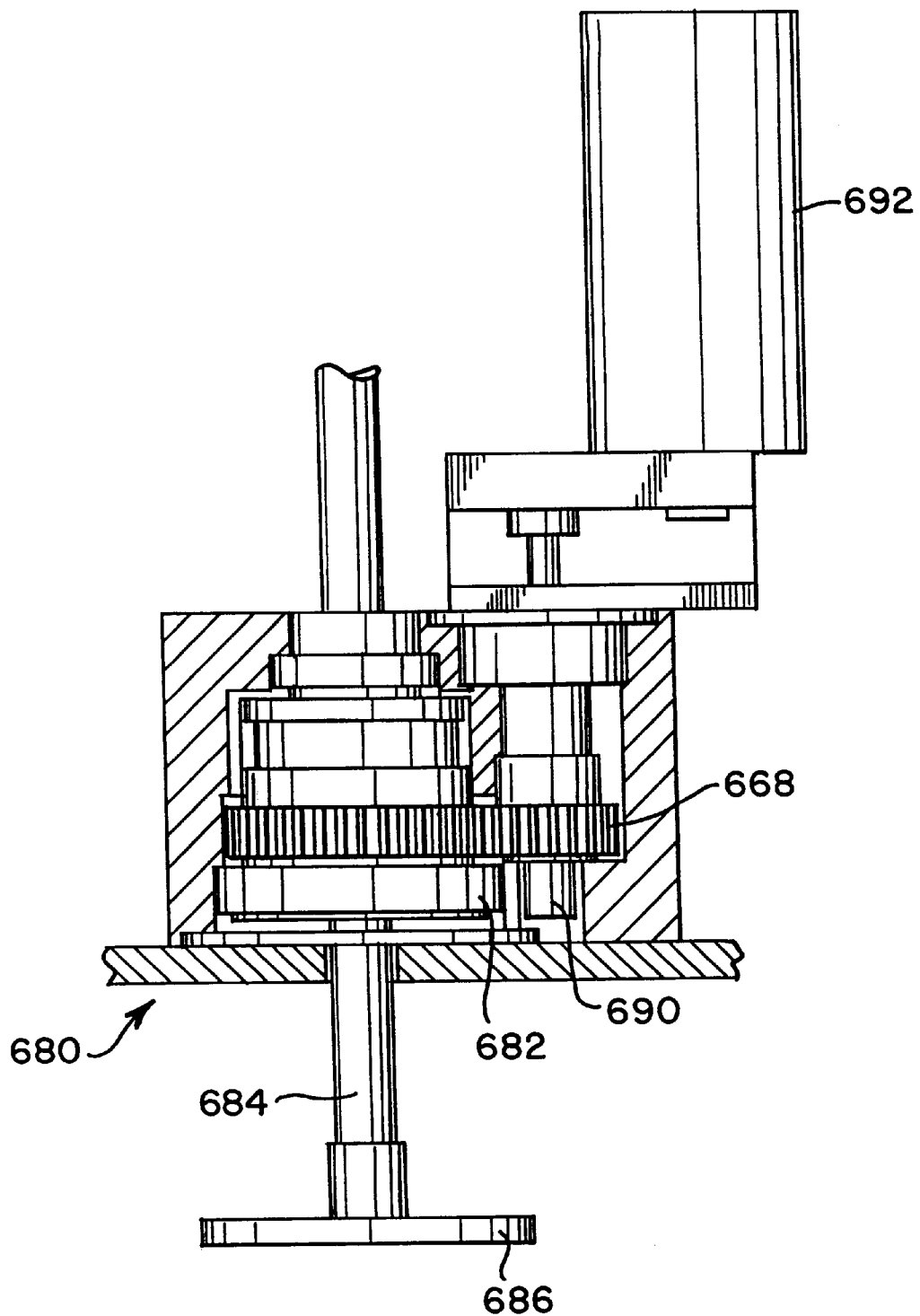
FIG. 53 is a top view of the dough extruder.

In accordance with the second embodiment of the present invention, the dough extruder 680 is best illustrated in FIGS. 43 and 53, which are a front view and top view, respectively. The dough extruder 680 includes a ball screw nut 682 and a shaft 684. An extruder plate 686 is connected to the forward end of shaft 684. Ball screw nut 682 has an external gear that meshes with a drive gear 688. Drive gear 688 is pinned to a shaft 690, which is coupled to a drive motor 692. The rotating ball screw nut 682, which is driven by the gear train, causes shaft 684 to move linearly forward (i.e., axially), until enough dough is extruded from the open canister 26' to be cut into a puck.

Referring now to FIGS. 1, 2, 13 and 14, the cutting station 14 is illustrated. Cutting station 14 includes a cutting blade 102 that is fixedly mounted within a blade frame 104. Alternatively, cutting blade 102 can be mounted on a secondary housing, which is then mounted to the housings so that the cutting blade can be easily dismantled for cleaning and quickly replaced with a new or restored blade. Frame 104 is vertically, slidably mounted within a portion of frame 200. A bushing 106 is fixedly connected to the blade frame 104. Bushing 106 includes an internally threaded through-bore which mates with an externally threaded rod 108 that is rotatably driven by a motor 110. Alternatively, a ball screw mechanism may be used to drive the blade frame. Blade frame 104 is guided for vertical movement by a pair of fixed tracks 112, 114 that are fixedly connected to the frame 100. Motor 110 is rotated in a first direction to cause cutting blade 102 to move up into the open position illustrated in solid lines in FIG. 13. Motor 110 is rotated in the opposite direction to cause blade 102 to move down into the closed position illustrated in phantom in FIG. 13.

In operation, to slice the dough, cutting blade 102 is normally in the closed lower limit down position. Blade 102 acts as a front cover plate for canister 26' as the lid 38 has previously been removed from the canister. Piston rod 90 is advanced due to actuation of motor 94, which causes the rear sliding piston-like wall of the canister housing 26' to move toward the blade, thus priming the dough. In other words, any undesired air pockets that may be trapped within the fresh dough are removed. After the dough has been primed, motor 110 is actuated to raise cutting blade 102 to the open upper limit position illustrated in solid lines in FIG. 13. Piston rod 90 is advanced once again causing a predetermined amount of dough to be extruded out of the front end of the canister. The predetermined amount of dough is preferably between ¾ of an inch and 1 inch. A sensor 116 detects when the predetermined amount of dough has been extruded. Motor 94 is stopped by a control system when the predetermined amount of dough has been extruded. Blade 102 is then actuated in the downward direction by motor 110 to cut a slice of dough of the predetermined thickness. The cut dough then falls onto catch plate 118 (See FIG. 1).

Similar to the first embodiment, the amount of dough being cut in the second embodiment is determined by an infrared sensor 116, which can signal the cutting blade 102 to cut the dough when the infrared beam it reflects is broken by the protruding dough. Therefore, in the second embodiment (see FIGS. 54 and 55), the extruder 680 advances a predetermined amount of dough to be cut. Once the canister is empty or substantially empty of dough, the extruder 680 is retracted to its home position.

Upon retraction of the extruder 680, including the extruder plate 686, the dough canister is removed from the dough cutter housing by a canister retracting mechanism 694 (See FIGS. 54 and 55). Mechanism 694 is fixedly connected to extruder plate 686 and shaft 684. Mechanism 694 includes a pivoting lever arm 696. Arm 696 pivots about pin 698 and is biased in the clockwise direction, as viewed in FIGS. 54 and 55, by a spring 700. A first end portion of arm 696 includes a hook 702. Hook 702 is received in a cut-out opening or notch 708 in extruder plate 686. A second opposite end portion of arm 696 includes a cam follower surface 704. Cam follower surface selectively engages with a stationary cam 706.

Upon advancement of the extruder plate into the canister to extrude dough from the canister, hook 702 advances (to the right as viewed in FIGS. 54 and 55) with plate 686 to the position illustrated in FIG. 54. As plate 686 continues to advance, cam follower 704 rides up ramped surface 710 of cam 706, causing arm 696 to pivot in the clockwise direction to the position illustrated in FIG. 55. A stop 712 prevents further rotation of arm 696. Arm 696 and plate 686 continue to advance into canister 26' until all of the dough has been extruded. As the extruder is retracting to its home position, hook 72 engages the back lid 714 of canister 26' and retracts canister 26' from the dough cutting station. The canister retracting mechanism 694 releases canister 26' at a predetermined location so that the empty canister 26' can be disposed of. Ramp surface 710 of stationary cam 706 first makes contact with the cam follower surface 704 of the retracting canister arm 696, thus pivoting the arm in the counter-clockwise direction, and, consequently, releasing the empty canister 26' in the predetermined location. The extruder 680, including the extruder plate 686, continue to retract to its home position.

The dough is preferably maintained at a temperature of between 32° and 33° F. to make sure that the dough is solid enough so that an even amount of dough may be extruded (i.e., the slice of dough is uniform and in the shape of a disk). Additionally, maintaining the dough at between approximately between 32° and 33° F. helps prevent the yeast from growing. The overall weight of this approximately 4" diameter by ¾ to 1" thick slice of dough is between 120 and 140 grams (wet weight). The toppings (to be described later) do not need to be kept at such a low temperature and can be stored at a temperature of approximately 40° F.

Canister Dispensing Door

Upon release of the empty dough canister 26' by mechanism 694, the canister is ready to be disposed of. Referring now to FIGS. 40 and 56–59, the canister dispensing door mechanism 716 is illustrated. Canister 26' rests on rollers 616 that are rotatably mounted on the dispensing doors 618, 620. To dispose of an empty canister 26', doors 618, 620 slide open (i.e., move away from each other) beneath the canister, so that the canister will fall straight down. It is preferable that the empty canister 26' fall straight down because space within the overall housing is limited, and mechanisms located beneath the canister rack area must also be taken into consideration.

Figure 57:
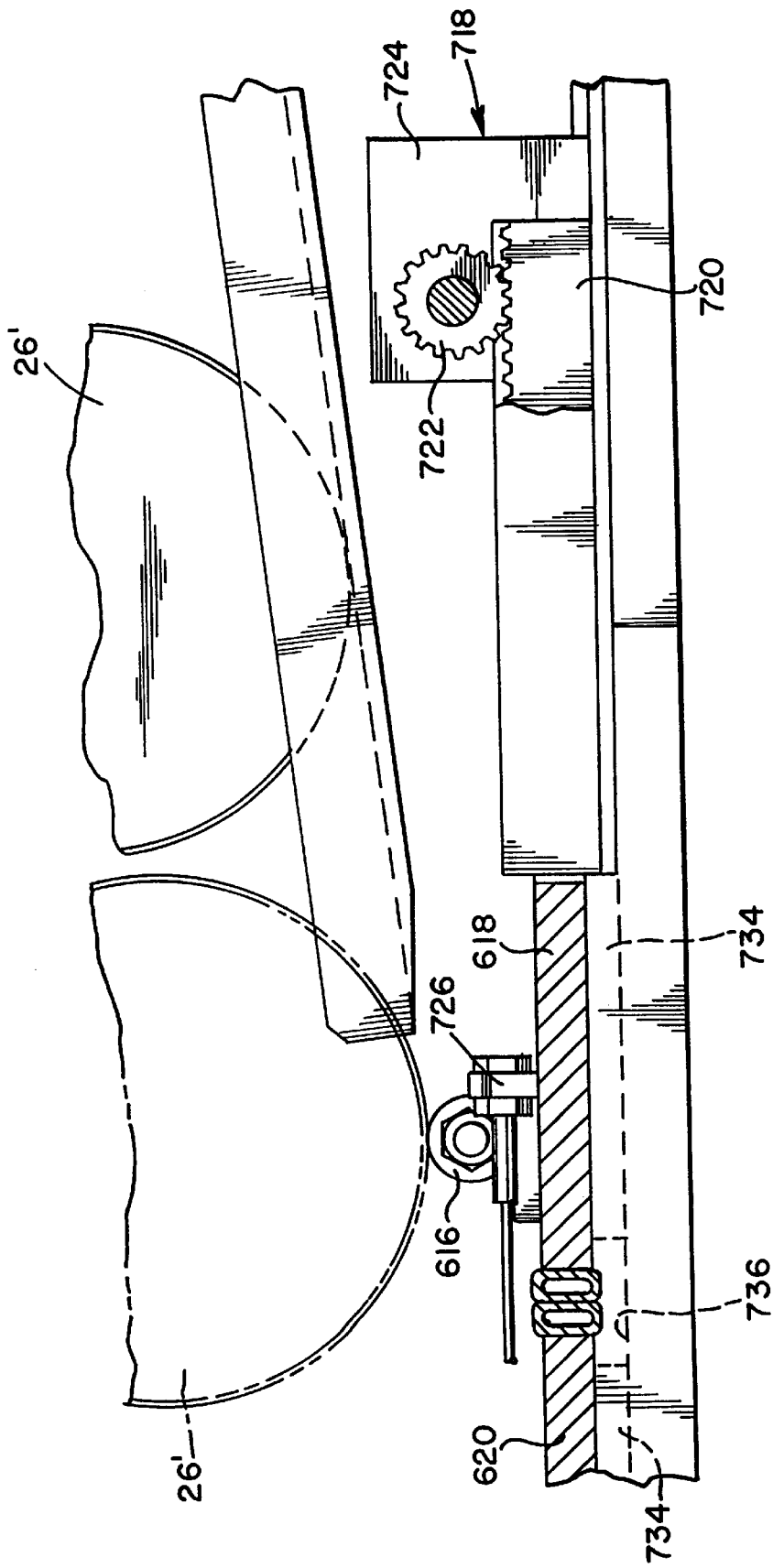
FIG. 57 is an enlarged side view of the canister dispenser door mechanism.

The sliding of doors 618, 620 is achieved by a rack 720 and pinion 722 drive system 718 (See FIG. 57). Door 618 is fixedly connected to 720 rack. Rack 720, which is driven by a pinion gear 722, is coupled to a motor 724. Actuation of motor 724 causes door 618 to slide away from or towards door 620. It is preferable that door 618 and door 620 open simultaneously, so as to assure that canister 26' falls straight down. To achieve this, a cable system is hooked up to each end of doors 618, 620. Door 618 has one end 726 of a cable 728 fixedly connected to it. Cable 728 loops around a pulley 730, and the second end 732 of cable 728 is connected to door 620.

Figure 58:
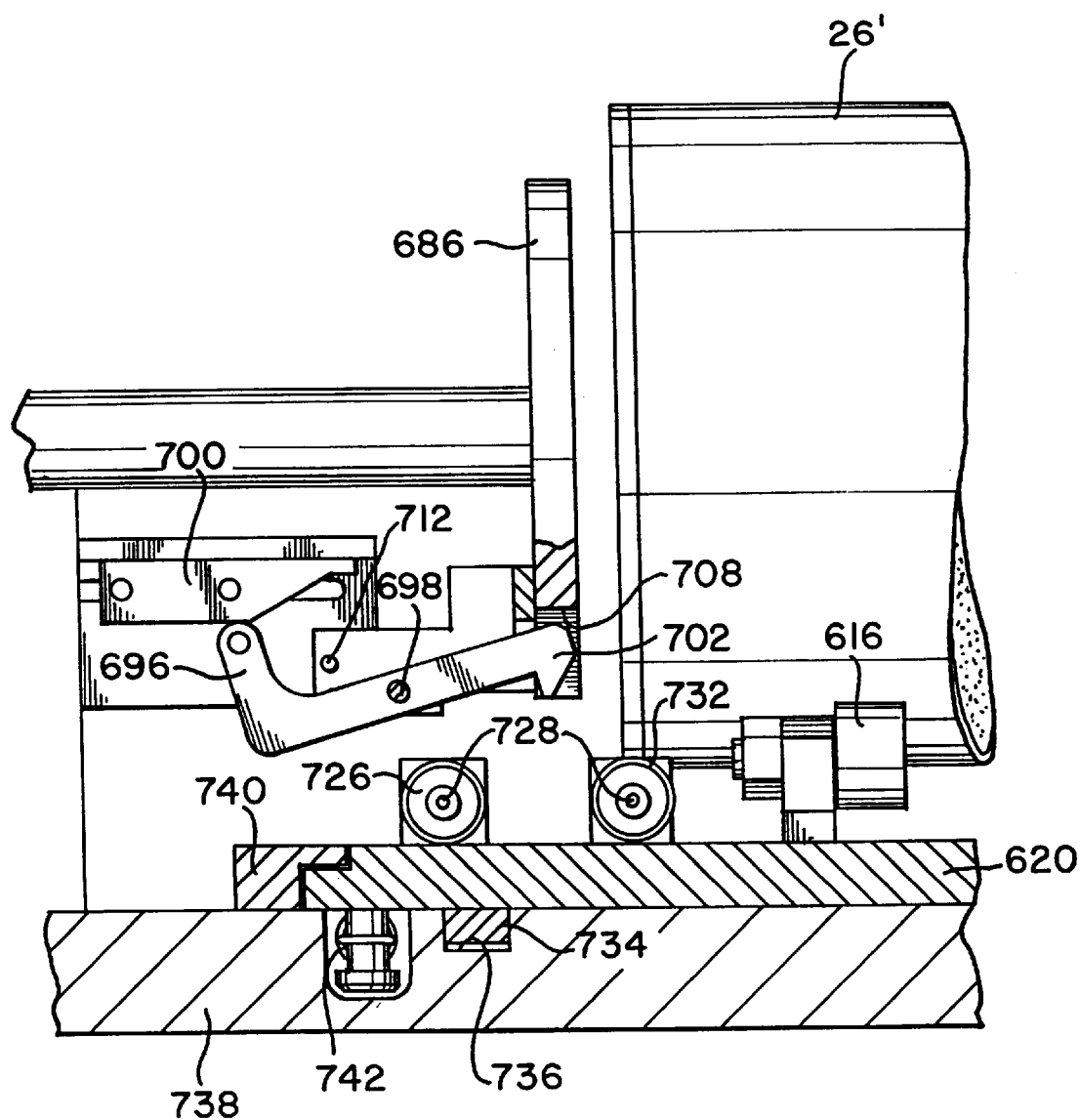
FIG. 58 is an enlarged front view of the canister dispenser door mechanism.

Referring now to FIG. 58, two guiding lips 734, one per side, are mounted to each door 618, 620 (only one lip 734 is visible in FIG. 58). Each lip 734 rides inside of groove 736 in the main plate 738. Guiding lips 734 ensure that doors 618, 620 move in a linear fashion. Also, at the extremities of the doors 618, 620, a cutout is provided to receive a fixed guide track 740 that is fixed to main plate 738 to assure that doors 618, 620 do not lift off of the main plate 738.

A first end of a spring 742 is fixed to door 620. The other end of spring 742 is fixedly connected to main plate 738, and passes underneath Door 618. Spring 742 is in tension so as to maintain a certain tension between the two doors and the cabling system, thereby maintaining the doors in the closed position.

Catch Plate Station

Referring now to FIGS. 1 and 4, catch plate 118 is fixedly connected to a rod 120. A bevel gear 122 is fixedly connected to rod 120. Bevel gear 122 meshes with a fixed bevel gear 124. Rod 120 is mounted within a bushing 126. Bushing 126 permits rod 120 to rotate within bushing 126, but does not permit any axial movement of rod 120 with respect to bushing 126. Bushing 126 is connected to a motor 127 which causes rotation of bushing 126 about axis 128, which causes rod 120 to rotate from the position illustrated in FIG. 1, in the direction indicated by arrow E in FIG. 1. As rod 120 rotates about axis 128, bevel gear 122 meshes with bevel gear 124, which causes rod 120 to rotate about its longitudinal axis thus causing catch plate 118 to rotate by approximately 180° from a substantially horizontal position through a substantially vertical position to an "upside-down" substantially horizontal position. In completing this movement, the slice of dough 144, which was dropped onto catch plate 118, is transferred substantially to the center of a bottom heated lower plate 140 of the press plate station 18.

Figure 59:
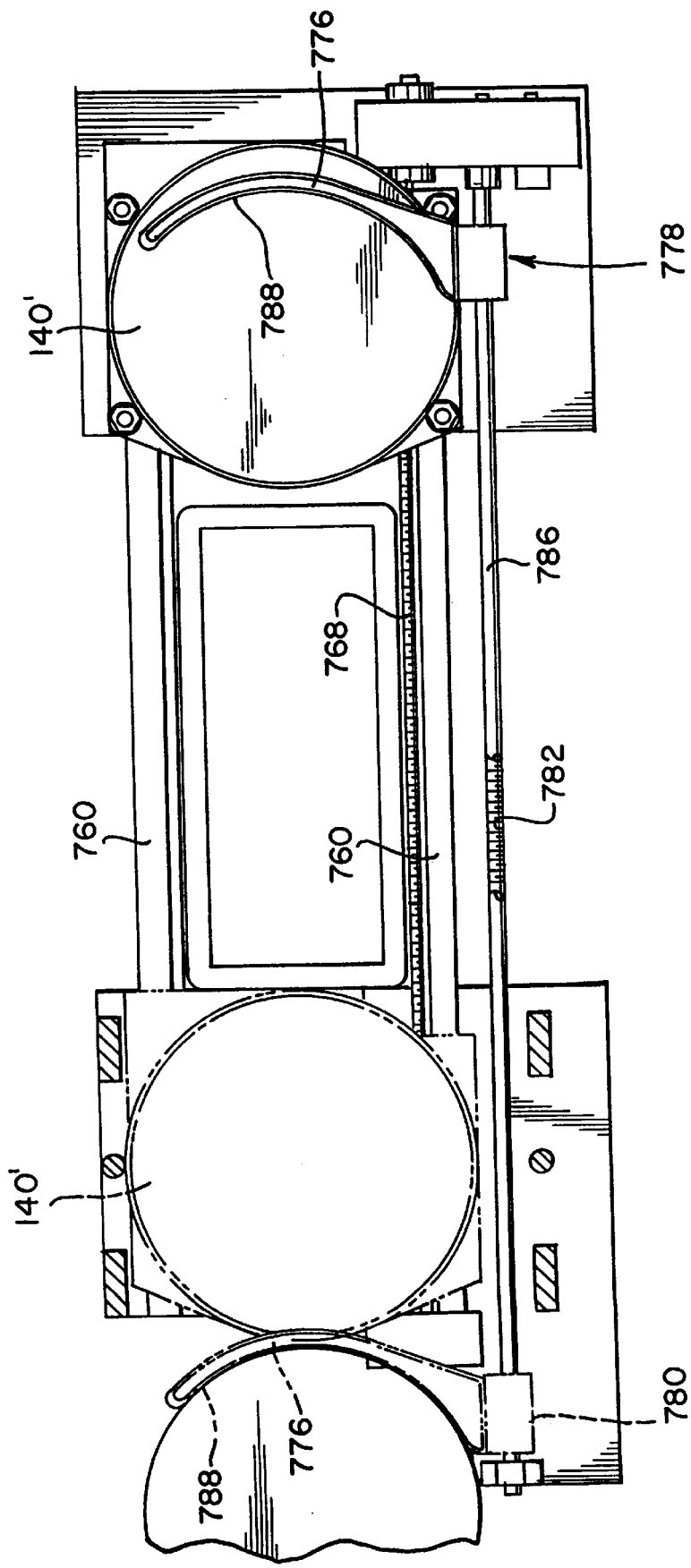
FIG. 59 is a top view of the canister dispenser doors and the bottom press plate.

Referring now to FIG. 59, in accordance with the second embodiment of the present invention, the catch plate 118 has been eliminated. The opening of canister 26' is now pointing to the right (as viewed in FIG. 59). When a slice of dough is cut, the bottom press plate 140' must be positioned at location 750 so as to be in line with the fall of the dough puck slice 144. Therefore, the bottom press plate is moveable i.e., it is initially located beneath the dough cutter at location 750, receives the dough puck, and then proceeds and stops underneath and center to the top press plate 142' at location 752.

Press Plate Station

Referring now to FIGS. 15–18, the press plate station 18 includes a lower heated plate 140 which cooperates with an upper heated plate 142 to preheat the dough. The slice of dough 144 that fell onto the upper surface of the lower heated plate 140 initially has a diameter of approximately 4", which corresponds to the internal diameter of the canisters 26. The upper heated plate 142 has a heating element 146 disposed on its upper surface. Similarly, lower heated plate 140 has a heating element disposed on its lower surface (not shown). The heating elements heat the upper plate 142 and the lower plate 140 to preheat the slice of dough 144. The plates 140, 142 are preferably maintained at a temperature between 400° F. and 450° F. when preheating the dough.

This step of preheating the dough is known in the industry as "par baking". The upper surface 148 of the lower plate 140 includes a centrally located raised platform 150. Raised platform 150 is preferably circular in shape and has an outer diameter of approximately 8". Platform 150 fits snugly within an internal cylindrical wall 152 of a recess in the lower surface 154 of upper plate 142 as illustrated in FIG. 15.

Lower surface 154 of upper plate 142 selectively moves into contact with upper surface 148 of lower plate 140 to define a recessed cavity 156. Cavity 156 is defined, in part, by the internal cylindrical wall 152, an annular rim 158, an annular tapered wall section 160, a beveled annular wall surface 162 and a substantially flat plate-shaped surface 164. A press plate 166 is disposed within a portion of recess 156 that is created by wall surfaces 162, 164 so that the bottom surface 168 of press plate 166 lies substantially flat with the inner edge portion of the tapered wall surface 160 when press plate is in its upper limit position as illustrated in FIG. 15. Plate 166 preferably has an outer diameter of about 4.5" so that the press plate's diameter is greater than the diameter of the slice of dough 144. Press plate 166 is fixedly connected to an upwardly projecting shaft stub 170. Shaft stub 170 is normally biased to a lower limit position, as illustrated in FIG. 16, by a coil spring 172. The downward position of shaft 170 is limited by pins 174, 176, which abut fixed lower stops 178, 180. In a preferred embodiment, pins 174, 176 constitute one pin that extends through shaft 170 and is fixedly connected thereto. Stops 178, 180 are the lower portion of a pair of elongated slots located in cylindrical tube 182, which is fixedly connected, by a flange 184, to the upper plate 142. The elongated slots in cylinder 182 also include a pair of upper stops 186, 188. The elongated slots guide the vertical movement of stub shaft 170 with respect to upper plate 142.

Figure 15B:
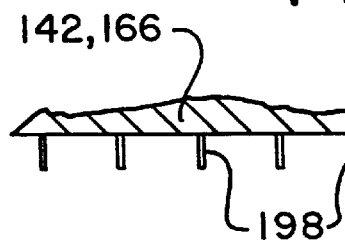
FIG. 15B is a partial sectional view of the upper plate of the press plate station.
Figure 12:
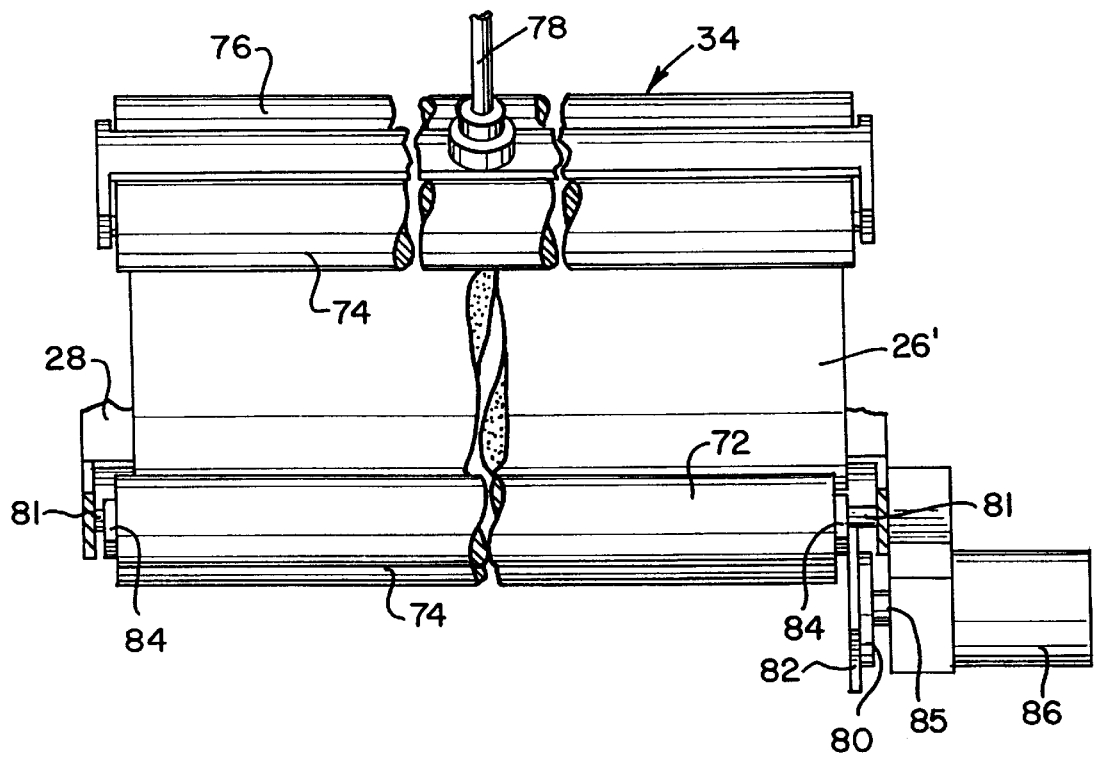
FIG. 12 is a sectional view taken along line 12—12 of FIG. 9 and looking in the direction of the arrows.
Figure 36:
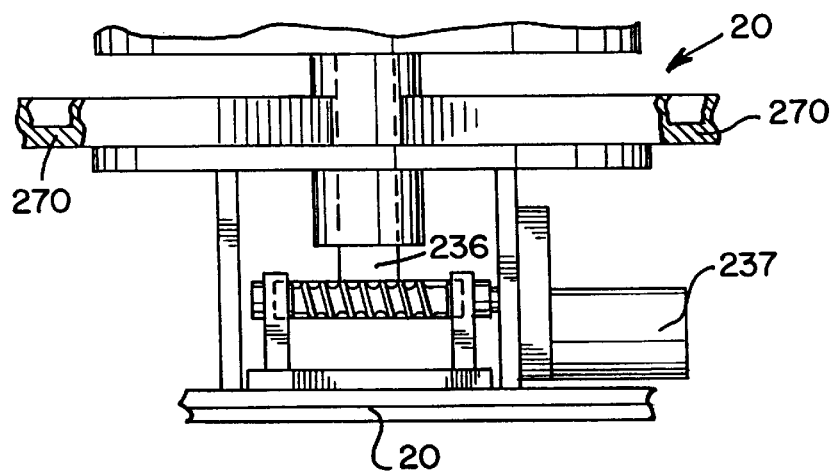
FIG. 36 is a sectional view taken along line 36—36 of FIG. 34 and looking in the direction of the arrows.
Figure 13:
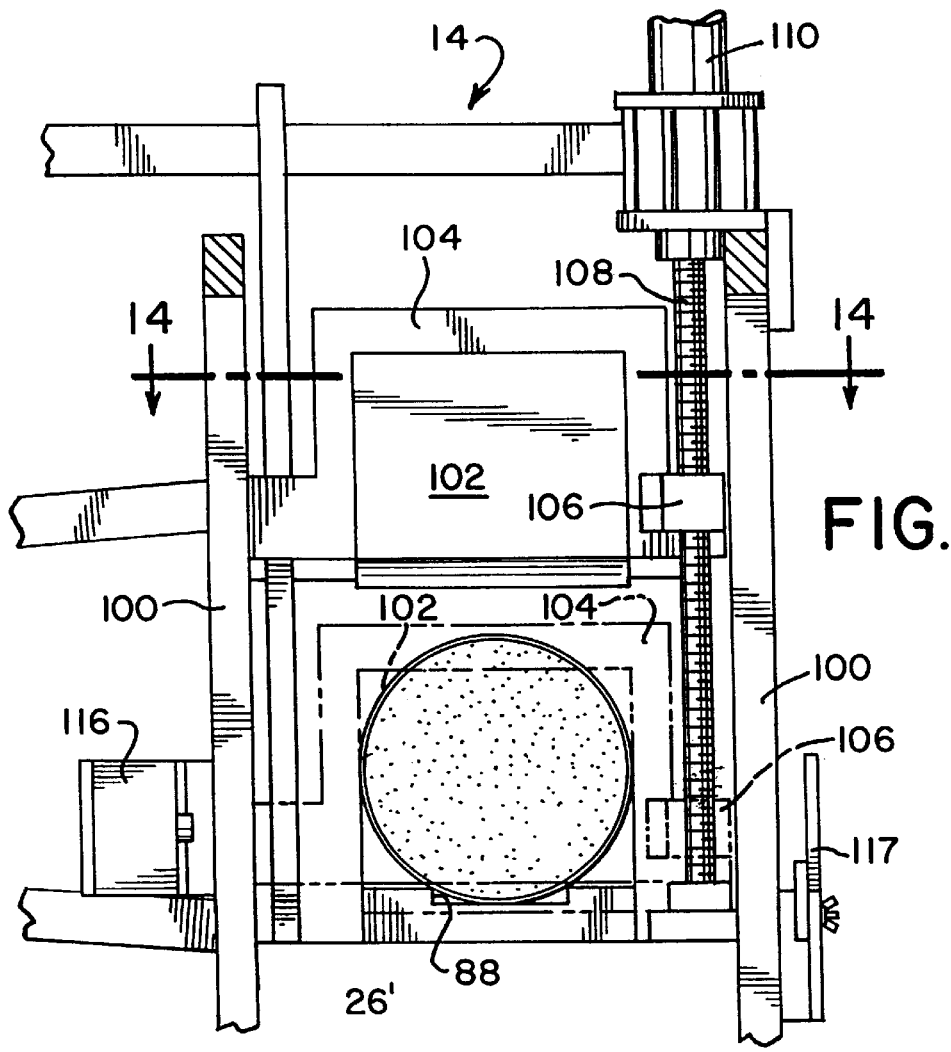
FIG. 13 is an enlarged front view of the cutting station.
Figure 14:
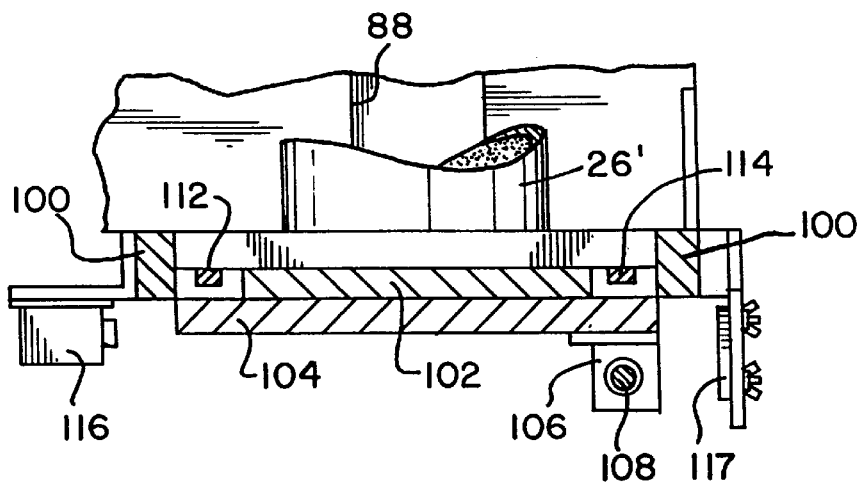
FIG. 14 is a sectional view taken along line 14—14 of FIG. 13 and looking in the direction of the arrows.
Figure 15A:
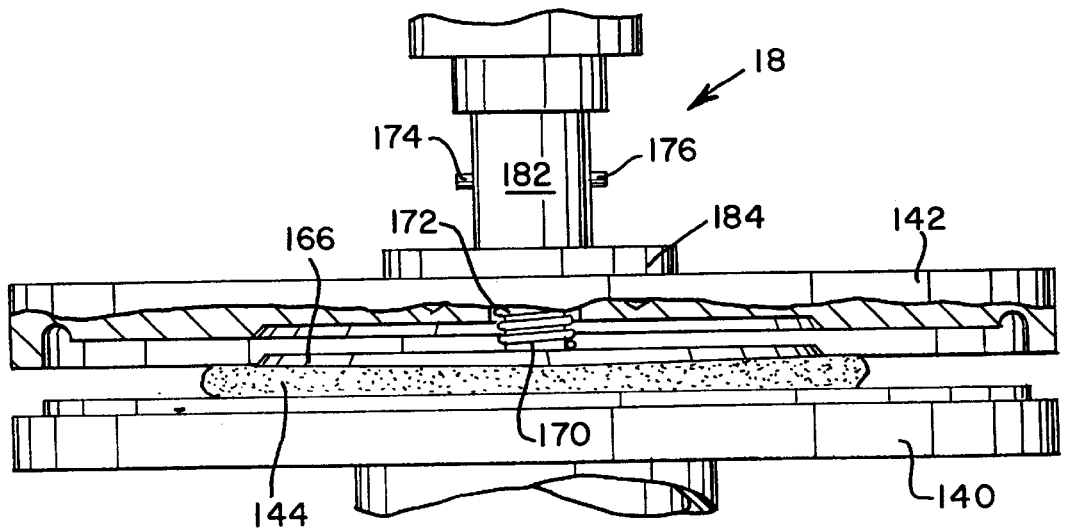
FIG. 15A is a partial sectional view of the press plate station in an intermediate position.

Referring now to FIG. 2, upper plate 142 is normally spaced at a relatively large distance above lower plate 140 so as to permit catch plate 118 to transfer the dough to the lower plate. After the slice of dough 144 has been placed upon the lower heated plate 140 by catch plate 118, the upper plate 142 is lowered until the lower surface 168 of press plate 166 contacts the approximately 4" diameter slice of dough and starts to compress the dough and simultaneously spreads the dough out in the radial direction as illustrated in FIG. 15A. Upper plate 142 is lowered by actuating mechanism 190, which operates in a manner similar to how mechanism 92 for the canisters is actuated. Upon further lowering of the upper plate 142, press plate 166 moves towards the upper plate 142 due to the compression of spring 172. The spring constant of spring 172 is chosen to permit plate 166 to sufficiently press the slice of dough 144 while maintaining a predetermined minimum thickness of the dough, as illustrated in FIGS. 15, 15A and 16. In the fully closed position, as illustrated in FIG. 15, the press plate 166 is in the recessed position and is in contact with the upper plate 142. The dough has been pressed and spread out radially to encompass substantially the entire chamber 156 disposed between the upper plate 142 and the lower plate 140.

The chamber is shaped in the shape of a pizza crust, and preferably includes an outer annular raised rim 192. If desired, rim 158 in the upper plate 142 can have a plurality of downwardly depending indentations to give the rim 192 of the pressed dough the appearance of being a handmade pizza crust. The chamber 156 is designed so that it is thinnest at its center and gradually tapers, by angle α, to increase the crust thickness as the radial dimension increases. For example, in one embodiment, the crust is 0.2" in thickness at the outer radial edge just radially inside of the rim 192 and is 0.125" in thickness at about a 1.5" radial dimension from the center of the crust. Thus, the 3" diameter center of the crust is preferably substantially of constant thickness. However, the crust can also increase in thickness from the center to the outer radial edge. By having the crust thinner in the center, the toppings that are added to the pizza crust, including tomato sauce, cheese, pepperoni, sausage, mushroom, etc. are maintained within the radial dimension of the crust as defined by the outer rim 192. Additionally, the pizza tends to cook more uniformly with this crust configuration.

The upper plate and lower plate, while being maintained a temperature between 400° F. and 450° F., are closed to the position illustrated in FIG. 15 and are preferably maintained in the closed position for about 30 to 45 seconds depending on the dough material and the relative thickness of the dough. Of course, other time ranges will be readily apparent to those skilled in the art depending on these and other factors, such as, for example, altitude. Thereafter, the upper plate is lifted from the position illustrated in FIG. 15 to the upper position illustrated in FIG. 2. The dough is now par-baked so that the dough loses its elasticity and can thereafter be transferred from station to station while maintaining the thus formed shape of a pizza crust 144. Additionally, pre-heating the dough reduces the amount of cooking time required in oven 24.

The upper plate 142 preferably has a throughbore 194 with a pressure relief valve 196 disposed therein. Pressure relief valve 196 is designed to open when the pressure within chamber 156 reaches a predetermined value, which may occur when preheating the dough. Additionally, the lower surface 168 of the press plate 166 (or the lower surface of upper plate 142) may have pins 198 depending downwardly as illustrated in FIG. 15B. Pins 198 extend so that they puncture pressure relief holes in the dough 144, to permit steam to be released from the dough. Pins 198 do not extend completely through the dough; In other words, pins 198 do not contact the upper surface of raised platform 150 even when upper plate 142 is in the closed position as illustrated in FIG. 15.

When not in use, the upper plate 142 and lower plate 140 are preferably maintained at 150° F. to reduce the amount of time required to heat these plates to the required 400° to 450° F. temperature range.

Referring now to FIGS. 1, 19 and 19A, a device 201 for moving the par-baked pizza crust 144 from the upper surface of lower plate 140 to the rotary index table station 20 is illustrated. Device 201 includes an arm 202 that is fixed to a selectively rotatable shaft 204 so that arm 202 pivots between a retracted position as illustrated in phantom in FIG. 19 and a grasping position as illustrated in solid lines in FIG. 19. Arm 202 includes a plurality of depending pins 206, which are of a predetermined length so that when arm 202 is in the grasping position, the distal end of pins 206 partially penetrate into the upper surface of the formed pizza crust 144, as illustrated in FIG. 19. Shaft 204 is rotatably mounted in a housing 208. A motor or solenoid 210 selectively actuates shaft 204 to cause arm 202 to pivot between the retracted position and the grasping position.

A reversible motor 212 (FIG. 1) is fixedly mounted to the machine frame 200. Upon actuation, motor 212 causes output shaft 214 to rotate. A pinion gear 216 (FIG. 19) is fixedly attached to the distal end of shaft 214. Gear 216 rotates with shaft 214 when motor 212 is actuated. The gear teeth of pinion 216 mesh with the gear teeth of a rack 218. Rack 218 is guided for linear movement in the direction indicated by double arrow A in FIG. 19, by a fixed track 220. Housing 208 is fixedly connected to rack 218. Thus, when motor 212 is actuated, pinion 216 rotates, thereby causing rack 218 to move from the retracted position to the forward position and vice versa.

In operation, the upper plate 142 is moved upward by a predetermined distance as illustrated in FIGS. 2 and 19. Arm 202 and rack 218 are each, initially, in the retracted position. Motor 212 is actuated in a first direction which causes pinion 216 to rotate in the clockwise direction, as illustrated in FIG. 19, thereby causing rack 218 to move to the left in FIG. 19 from the retracted position to the forward position. Once rack 218 is in the forward position, solenoid 210 is actuated to cause arm 202 to pivot from the retracted position to the grasping position. The distal ends of pins 206 have thus engaged the par-baked pizza crust 144. It is not necessary for the distal ends of pins 206 to actually penetrate into the partially cooked crust 144. The distal ends of pins 206 may simply cause a localized depression in the upper surface of crust 144.

Reversible motor 212 is then actuated in the opposite direction (i.e., the counterclockwise direction, as illustrated in FIG. 19) causing pinion gear 216 to rotate in the opposite direction, thereby causing rack 218 to move to the right in FIG. 19 from the forward position to the retracted position. During this movement, arm 202 is maintained in the grasping position by the motor or solenoid 210. The par-baked pizza crust 144, which is temporarily engaged by pins 206, is transferred from bottom plate 140 to plate 222, which is disposed in station number I of the rotary index table station 20.

Figure 60:
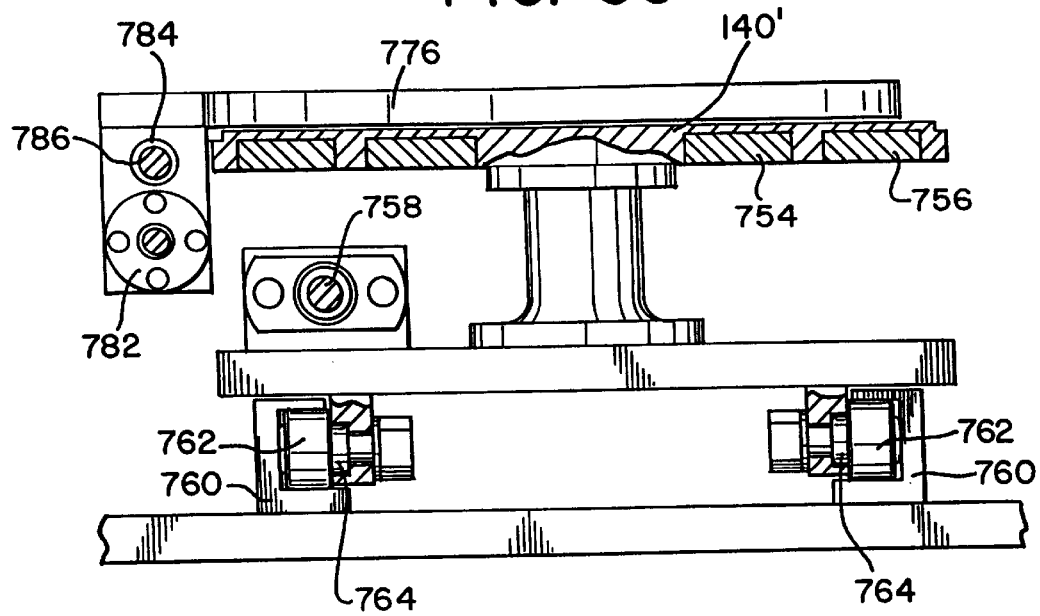
FIG. 60 is a side view of the bottom press plate and the linear transfer arm.

Referring now to FIG. 60, in accordance with the second embodiment, bottom plate 140' is illustrated as having two ring heaters 754, 756 that are placed beneath the plate to supply heat when pressing the dough.

In accordance with the second embodiment, plate 140' is moveable. Therefore, a threaded drive rod 758 is used to move plate 140 between locations 750, 752. A roller track 760 makes this movement smooth and effortless. This housing holds two roller bearings: one bearing 762 is for rolling the plate, the other bearing 764 is to help keep the plate aligned. The bottom press plate 140' preferably has four roller bearing housings, for a total of eight roller bearings. These bearings can support a great amount of load to support bottom plate 140', especially when the press is in operation.

Figure 61:
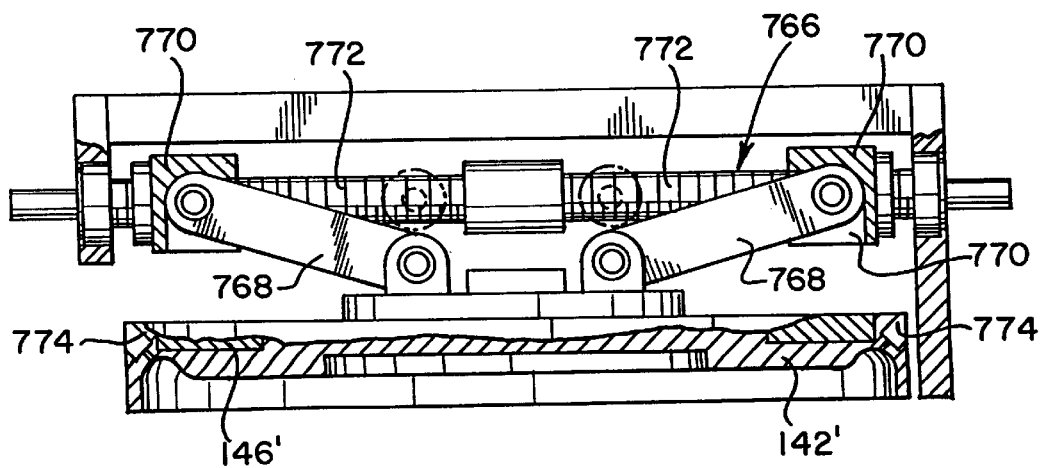
FIG. 61 is a front view of the top press plate.
Figure 62:
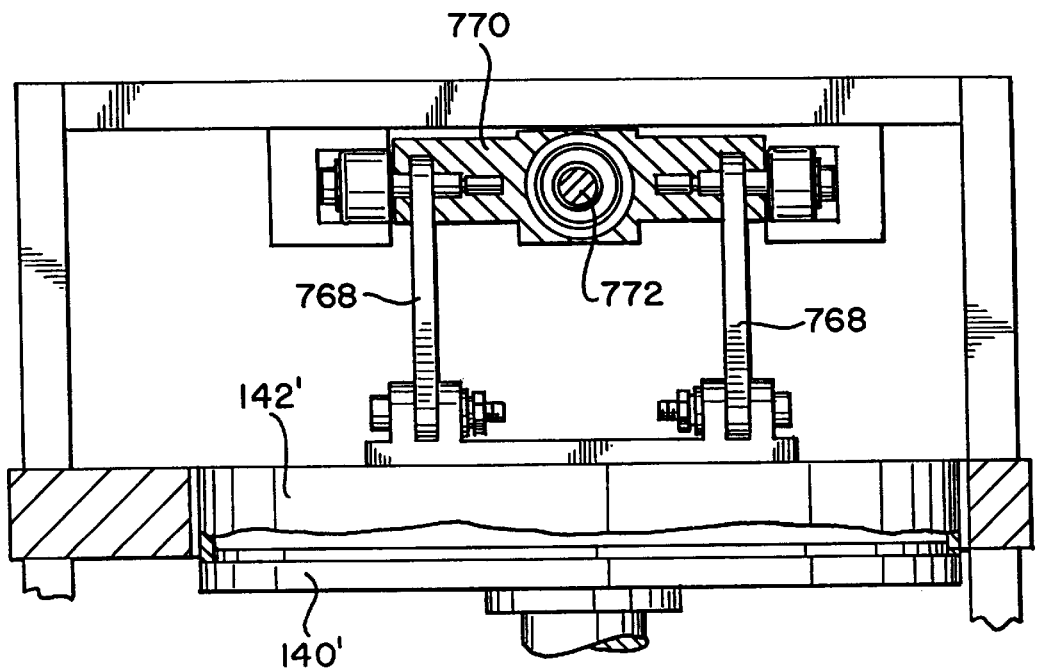
FIG. 62 is a side view of the top press plate.
Figure 63:
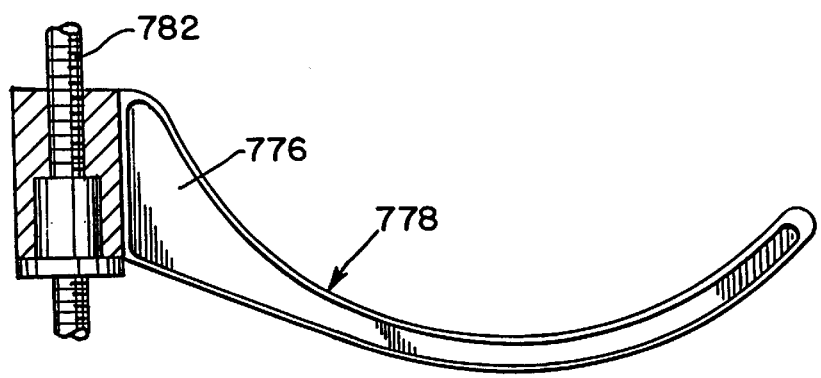
FIG. 63 is a top view of the linear transfer arm.
Figure 64:
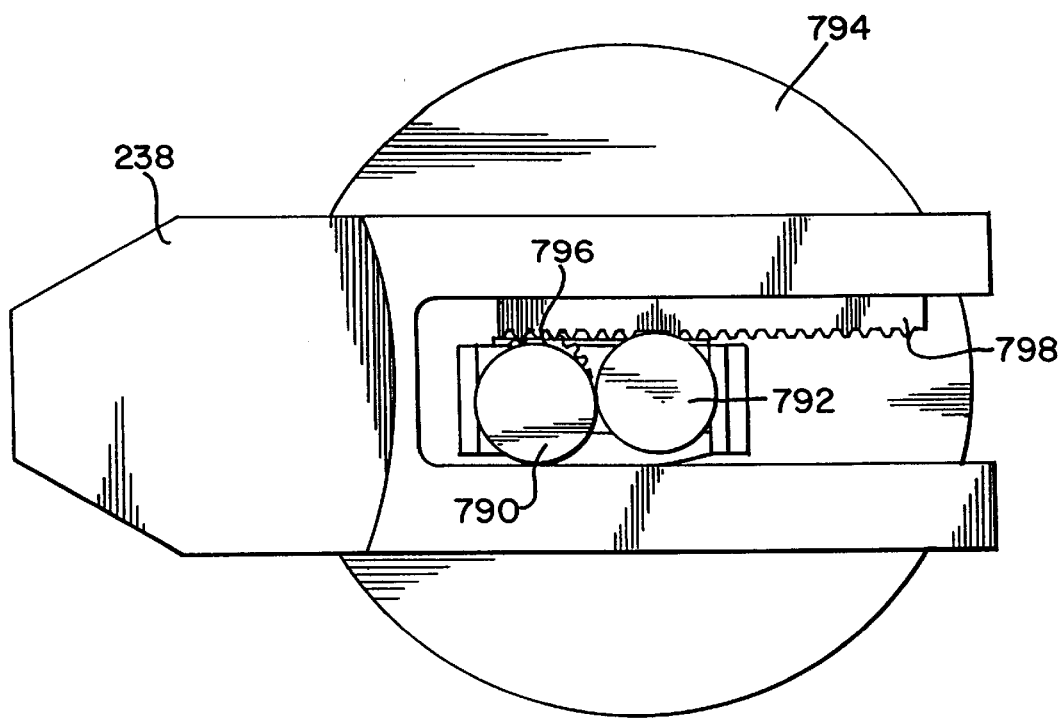
FIG. 64 is a top view of the rotary index plate mechanism.
Figure 65:
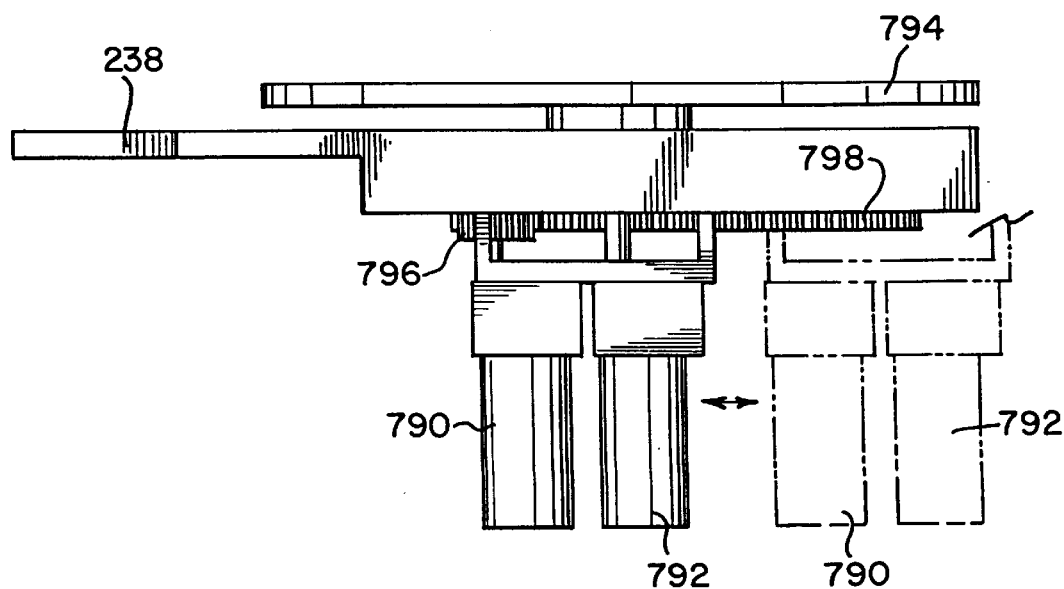
FIG. 65 is a front view of the rotary index plate mechanism.

Referring now to FIGS. 61 and 62, a four arm vise-type 766 of press to lower and raise the upper plate 142' with respect to lower plate 140' is illustrated. The arms 768 of the press are pined to an internally threaded beam 770, which act as a drive nut and is axially driven by a rotating threaded drive shaft 772.

FIG. 61 shows upper plate 142' and arms 768 in the retracted position. The circles shown in phantom represent the location of the threaded beams when the upper plate 142' is in the extended position. The pressing travel is greatly reduced as compared to the first embodiment due to this short arm configuration. The top press plate 142' has a plurality of steam escape holes 774. Holes 774 provide a pressure relief passageway 194' for the steam when the two plates are pressing the dough.

FIG. 62 illustrates the top press plate 142' in the extended position. The top press plate also has a ring heater 146' to warm this plate when pressing. Threaded beams 770 are mounted on a roller track system to provide a smooth and effortless movement of the beams. The top press plate 142' rides on a shaft on both sides of the plate. The top plate, which acts as a structure to the vice-type press, is supported by four columns.

Referring now to FIGS. 59 and 60, a linear transfer arm 776 is used to move the partially cooked crust 144' from the bottom press plate 140' to the index table station 20'. Transfer arm 776 moves between a first limit position 778 and a second limit position 780. Transfer arm is driven by a threaded rod 782 a sufficient distance to push the partially cooked crust 144' from the bottom press plate 140' to the index station 20'. A linear bearing 784 and guide shaft 786 arrangement are used to provide alignment during the motion of transfer arm 776.

Arm 776 has an arc shape 788 cutout to accept the partially cooked crust 144' easily. The arc shape helps prevent crust 144' from swaying side to side when being transferred from bottom plate 140' to the index station.

Rotary Index Table Station

Figure 34:
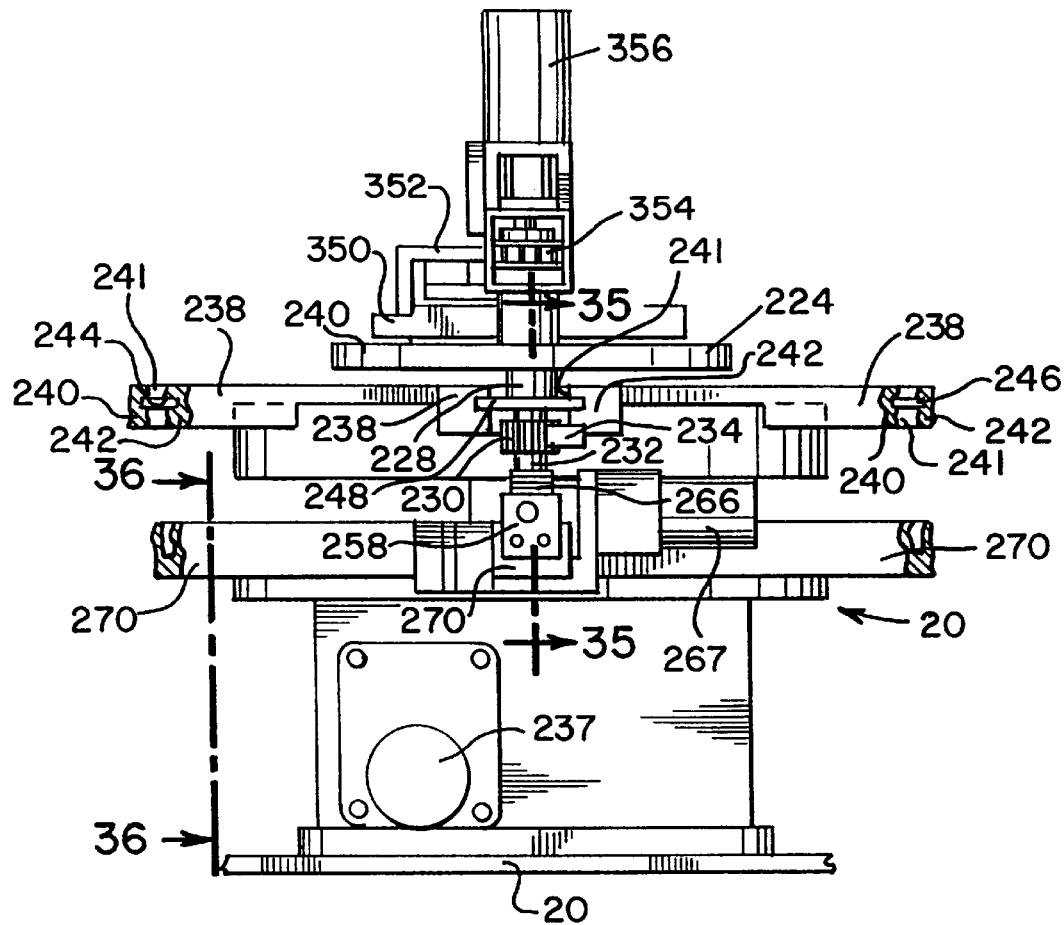
FIG. 34 is a side elevational view, partially in section, of the rotary index table station.
Figure 35:
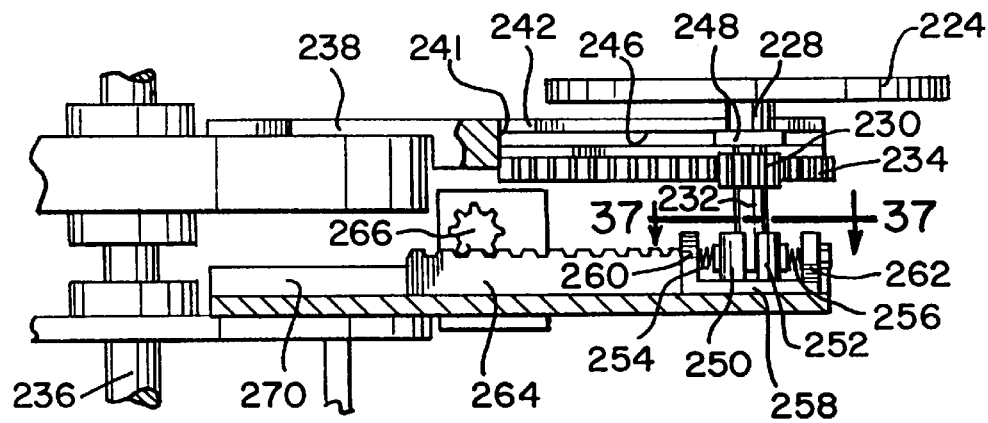
FIG. 35 is a sectional view taken along line 35—35 of FIG. 34 and looking in the direction of the arrows.

Referring now to FIGS. 1, 4 and 34–36, the rotary index table station 20 will now be described. As illustrated, there are six stations, stations numbers I, II, III, IV, V, and VI, that are each equally spaced apart by 60°. Rotary index table station 20 includes three plates 222, 224, 226, which are equally spaced apart by 120°. Each plate preferably has a plurality of throughbores 223 to reduce the overall weight of the plates. Additionally, all of the surfaces that contact the pizza crust 144, including plates 222, 224, 226, are preferably coated with a non-stick, non-toxic material, such as, for example, TEFLON®. Each plate 222, 224, 226 selectively moves between an outermost radial position, as illustrated in FIG. 1, and an inner most radial position as illustrated in solid lines in FIG. 4. For the sake of brevity, only plate 224 will be described. However, it is to be understood that the structure and actuation of the remaining plates 222, 226 are identical to plate 224. As illustrated in FIG. 35, a stub shaft 228 depends downward from plate 224. A pinion gear 230 is fixedly attached to a reduced diameter portion 232 of stub shaft 228. Pinion 230 has gear teeth which mate with the gear teeth of a rack 234. The rotary index table station 20 includes a selectively rotatable center shaft 236. A plurality of radially outwardly extending forked arms 238 are fixedly connected to central shaft 236. The arms are equally spaced apart by 120°. Shaft 236 is driven by a motor 237 via worm gear drive (see FIG. 36). Each arm 238 is forked at its radial outermost or distal end. (See FIG. 1). The fork divides the distal end of arm 238 into a first portion 240 and a second portion 242. An elongated channel 241 is defined intermediate the first portion 240 and the second portion 242. Stub shaft 228 is received within the elongated channel 241. Rack 234 is disposed on only portion 242 of arm 238 (See. FIG. 34).

As illustrated in FIG. 34, each portion 240, 242 of arm 238 includes a U-shaped slot 244, 246 disposed above rack 234. A plate 248 is slidably received in the U-shaped slots 244, 246. Plate 248 rotatably and axially supports plate 224 and includes a bearing to permit stub shaft 228 and therefore plate 224 to rotate. The lower portion of the reduced diameter shaft 232 is received within a pair of spring biased capturing wings 250, 252. Wing 250 is biased in the radially outward direction by spring 254 and wing 252 is biased in the radially inward direction by spring 256. The wings 250, 252 are radially slidably mounted within a U-shaped bracket 258, which has legs 260, 262. Spring 254 is mounted between leg 260 of U-shaped bracket 258 and wing 250.

Figure 37:
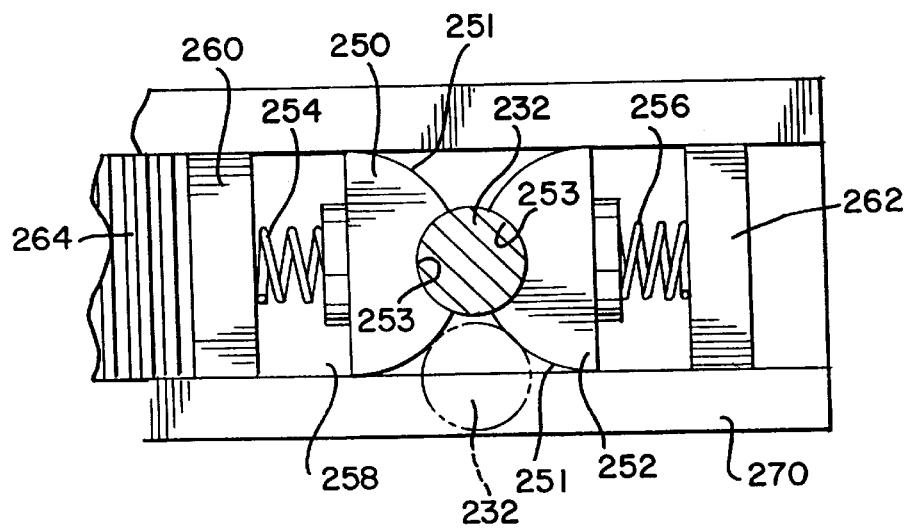
FIG. 37 is an enlarged sectional view taken along line 37—37 of FIG. 35 and looking in direction of the arrows.

Likewise, spring 256 is mounted between leg 262 of U-shaped bracket 258 and wing 252. Wings 250, 252 have an outer convex surface 251, and an outer concave surface 253 to facilitate the insertion and removal of the reduced diameter portion 232 of shaft 228 between wings 250, 252 (See FIG. 37).

U-shaped bracket 260 is fixedly mounted to a rack 264. Rack 264 has teeth which mesh with the teeth of a pinion 266 mounted on the shaft of a motor 267. To move the rack 264 to the radially inward position, motor 267 is actuated to cause pinion 266 to rotate in a clockwise direction as illustrated in FIG. 35. Rack 264 is thus moved from the radial outermost position to the radial inward most position, which causes U-shaped bracket 258 to move from the radial outermost position to the radially innermost position. Because reduced diameter portion 232 of shaft 228 is received within wings 250, 252, shaft 228 is retracted from the radially outermost position to the radial innermost position. As shaft 228 moves radially inwardly, pinion 230 meshes with rack 234, thereby causing shaft 228 to rotate about its axis. Thus, reduced diameter portion 232 is permitted to rotate even though it is captured between wings 250, 252. As illustrated in FIG. 34, the radial movement of the U-shaped bracket 258 is guided by radially extending fixed U-shaped track 270. In other words, rack 264 and U-shaped bracket 260 are permitted to move in the radial direction, but do not rotate.

Once all of the rotating and radially moveable plates 222, 224, 226 are in the radial inward position, shaft 236 is rotated, in the clockwise direction as viewed in FIG. 1, by 60°, which causes arms 238 to rotate by 60°. Rotation of arms 238 causes shaft 228, more specifically its reduced diameter portion 232, to disengage from surfaces 253 of the spring biased wing members 250, 252. In other words, the force applied by the motor to the rotating shaft 236 is sufficient to overcome the bias of the springs 254, 256 which are holding the reduced diameter portion 232 of shaft 228 in place. Each of the reduced diameter portions 232 of the shafts 228 move along a 60° arc and then snap into the next stations opposing pair of spring biased wings 250, 252. Thereafter, motor 268 is actuated in the counterclockwise direction to cause rack 264 to move to the radial outermost position. Pinion 230 engages with the rack 234 of the next station, thereby causing plate 224 to rotate as it is moving outwardly in the radial direction. Each of the next four stations (i.e., station nos. II, III, IV and V) may be used to apply toppings to the pizza crust in a manner which mimics the way toppings are placed on top of a fresh dough crust by hand.

In accordance with a second embodiment of the present invention, two motors 790, 792 are used. One motor 790 causes the radial movement of the plates 794 and the second motor 792 causes the rotation of the plate 794 about its own axis. Using two motors permits diverse patterns to be applied to the top of the pizza crust 144' by each condiment. For example, the sauce is preferably spiraled on the crust with a spacing of ½ inch between each spiral. The pepperoni, on the other hand, preferably provides a slice every 45 degree angle of rotation for the outer part of the pie. It is, therefore, necessary to have a system that is totally flexible at each station. By using two motors, the location and position of the plate can be accurately controlled.

Motor 792 is directly coupled to the plate. Thus, the speed of rotation of motor 792 is also the speed of rotation of the plate. The second motor 790 is used to radially advance and retract plate 794. A rack 798 and pinion 796 system (similar to the previous embodiment plate system) is used. The pinion 796 is mounted directly on motor's 790 output shaft.

Figure 20:
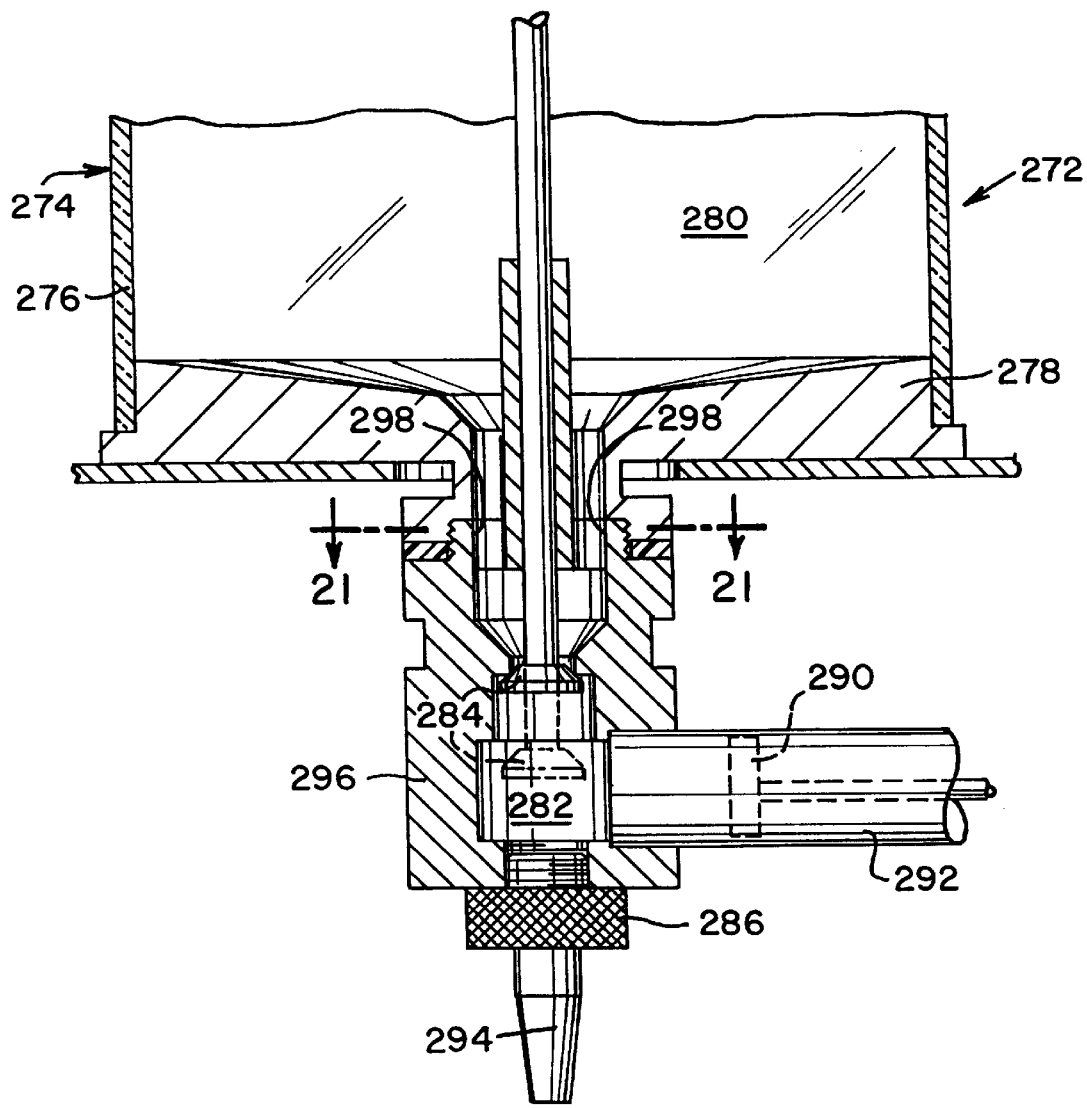
FIG. 20 is a cross sectional view of the sauce dispenser.
Figure 21:
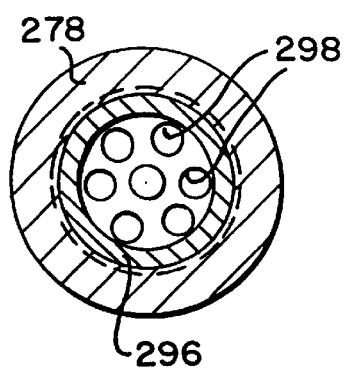
FIG. 21 is a cross sectional view taken along line 21—21 of FIG. 20 and looking in the direction of the arrows.

Referring now to FIGS. 1 and 20–22, the sauce dispenser, which is disposed at station no. II, will be described. The sauce dispenser 272 includes a container 274 which is comprised of a cylindrical side wall 276 and a bottom wall 278. A sauce to be dispensed on top of the pizza is contained within an internal chamber 280 of container 274. Chamber 280 is in fluid communication with a pumping chamber 282 via a poppet-type inlet valve 284. As illustrated in FIGS. 20 and 21, pumping housing 296 is fluidly connected to container 274 by a threaded connection. A plurality of through-holes 298 disposed within pump housing 296 permit the sauce disposed within container 274 to be in fluid communication with the internal chamber of pump housing 296. An outlet valve 286 is fluidly connected to pump housing 296 in a known manner. Outlet valve 286 is normally biased in the closed position. A reciprocating piston 290 is mounted within a cylindrical tube 292. The internal portion of tube 292 that is disposed on a first side of piston 290 (to the left of piston 290 as illustrated in FIG. 20) is in fluid communication with pumping chamber 282. Upon the forward or pumping stroke of piston 290 (i.e., a stroke towards pumping chamber 282), inlet valve 284 is closed and outlet valve 286 is biased by the fluid pressure within chamber 282 into the open position so sauce is dispensed from chamber 282 past outlet valve 286 and out through nozzle 294 onto the pizza crust 144 which is disposed below nozzle 294 on top of one of the plates 222, 224, 226. At the end of the pumping stroke, piston 290 is preferably retracted away from the pumping chamber 282 by a first predetermined distance. Simultaneously, inlet valve 284 is maintained in the closed position as shown in solid lines in FIG. 20. Therefore, any fluid remaining within nozzle 294 and outlet valve housing 288 will be withdrawn back into the pumping chamber 282.

To actuate the next pumping cycle, the inlet valve is moved to the open position as shown in phantom in FIG. 20. Thereafter, pump piston 290 is retracted by a second and larger predetermined stroke distance to create a vacuum in chamber 282 that draws sauce into the chamber. Piston 290 is then actuated in the pumping direction to dispense a predetermined amount of sauce on the next pizza crust disposed below the outlet nozzle 294. As the sauce is dispensed onto the pizza crust, the pizza crust, which is resting on the upper surface of plate 220, 224, 226 is moved from the radial innermost position to the radial outermost position. At the beginning of the stroke, nozzle 294 is preferably disposed above the crust at position 302 (see FIG. 22). As the plate 222 is moved radially outwardly, it rotates about its own axis by the mechanism described above. The sauce is thus dispensed in a spiral pattern onto the crust as illustrated by the dashed path 304 in FIG. 22. Therefore, the sauce is applied to the top of the pizza crust in a manner similar to how sauce is applied, by hand, to the top of fresh pizza dough crust. At the beginning of the dispensing cycle, nozzle 294 is preferably disposed just above the portion of the pizza crust 144 that is disposed furthest from the center axis of the rotary index table 20. When the plate is in the radial outermost position, nozzle 294 is disposed substantially above the center of the crust 144. Alternatively, the nozzle could initially be disposed above the center of the pizza and, at the end of the radially outward movement of the plate, the nozzle would then be disposed above the portion of the pizza crust 144 that is disposed closest to the center axis of the rotary index table 20. Chamber 280 may include a separate stirrer (not shown) to occasionally, at predetermined time intervals, stir the sauce contained in the container 272, thereby maintaining the sauce at a uniform consistency.

Figure 66:
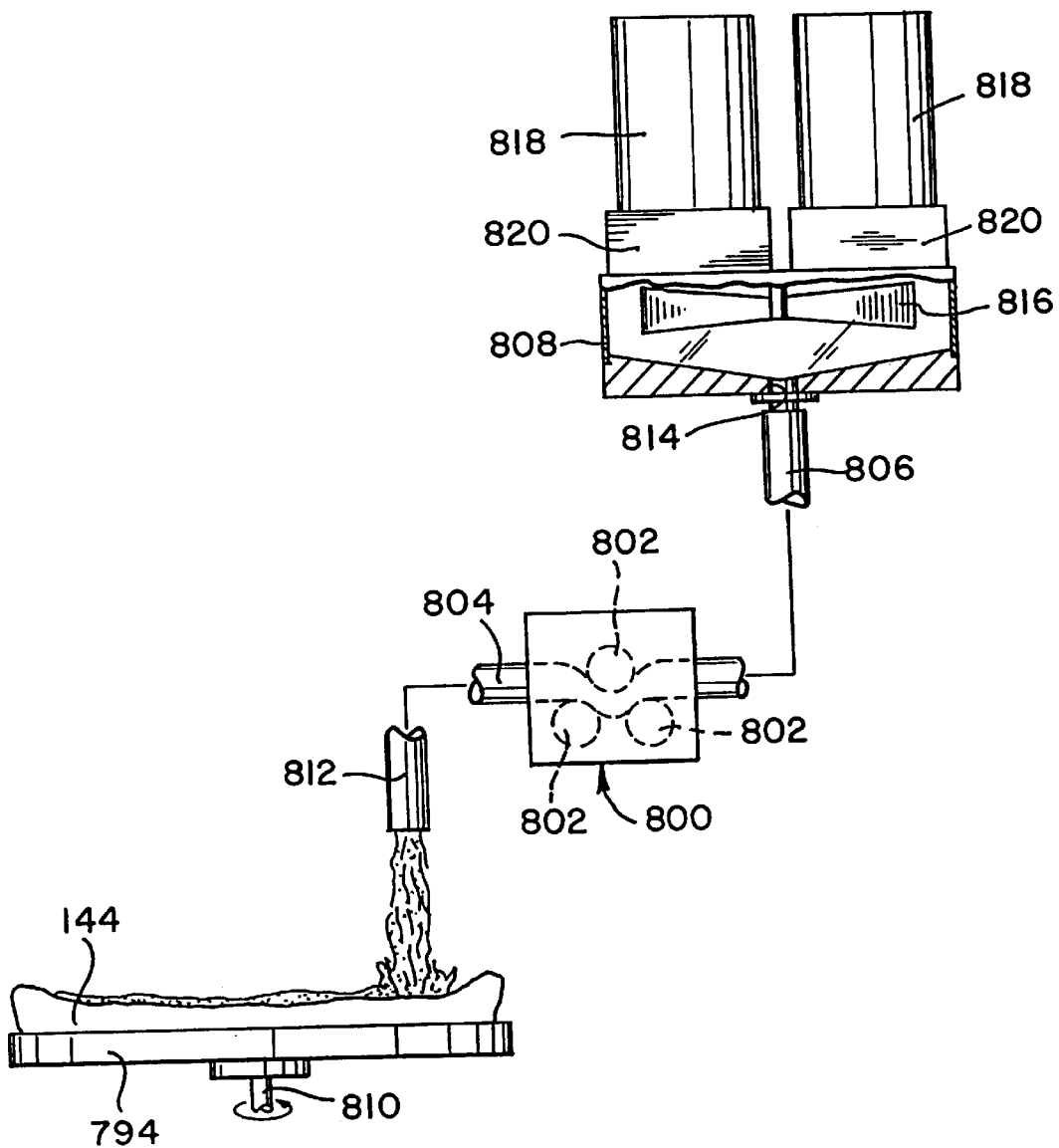
FIG. 66 is an exploded view of the sauce dispenser.
Figure 67B:
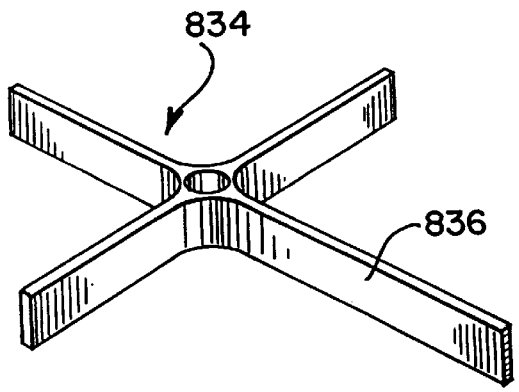
FIG. 67B is a perspective view of the stirrer arm used in the mushroom dispenser.

Referring now to FIG. 66, a second embodiment of the sauce dispenser is illustrated. This embodiment uses a conventional peristaltic pump 800 to provide sauce to the top of a partially cooked crust 144'. The peristaltic pump 800 is illustrated schematically and any conventional peristaltic pump may be used. The pump preferably includes rollers that squeeze the tube 804 so that effectively no fluid can pass through the squeezed tube. Upon actuation of the pump, a predetermined amount of sauce is dispensed upon the top of crust 144'.

The peristaltic pump includes a plurality of rollers 802 that repeatedly squeeze and release a flexible tube 804. A first end 806 of tube 804 is fluidly connected to the exit of the sauce reservoir 808.

The plate 794 holding the crust 144' is rotating about its own axis 810 and is moving linearly (i.e., in the radial outward direction) while the second end 812 of stationary tube 804 is dropping sauce onto the pie. Thus, a spiral of sauce is created on top of crust 144. Of course, if desired, the sauce can be dispensed when plate 794 is moving radially inwardly, or during movement in both directions. This type of dispensing system greatly improves the even distribution of sauce and substantially eliminates any clumping of sauce.

Reservoir 808, which holds the sauce, is preferably funnel-shaped at the bottom, thereby aiding the sauce to slide down towards exit hole 814 and into the first inlet end 806 of tube 804. A stirrer 816 is disposed inside of reservoir 808 to help keep the sauce uniform and consistent. Atop reservoir 808 are a plurality of sauce containers 818, each of which has a container adapter 820 to connect to reservoir 808. Reservoir 808 is, thus, separate from the sauce containers 818. Therefore, the dispenser may include one or more sauce containers 818. Containers 818 adapt to the reservoir 808, and once empty, only the container 818 need be removed and it may then be replaced with a new filled container 818, thereby improving the ease of loading the dispenser and maintaining the system clean and efficient.

Figure 23:
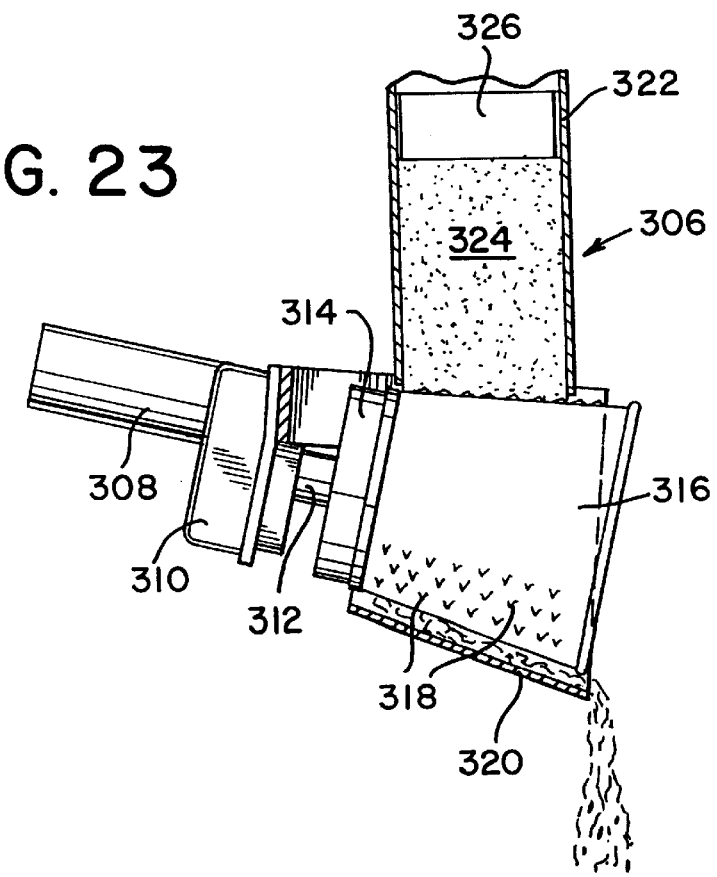
FIG. 23 is a partial cross sectional view of the cheese grater mechanism.
Figure 24:
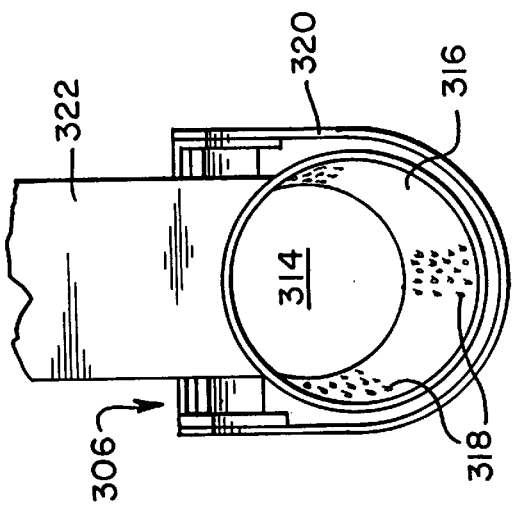
FIG. 24 is a front plan view of the cheese grater mechanism.

Referring now to FIGS. 1, 23 and 24, a cheese grater 306, disposed in station no. III, is illustrated. The cheese grater includes a fixed motor 308 that is connected through a gear reduction unit 310 to a rotatable output shaft 312. Shaft 312 is fixedly connected to a disk 314. A conically shaped hollow grater 316 is fixedly connected to disk 314. Grater 316 has, on its outer surface, a plurality of raised projections 318 that are similar in shape to the outer projections on a conventional cheese grater. A shroud or U-shaped sleeve 320 is disposed about the lower portion and sides of grater 316. A fixed magazine 322 is disposed above grater 316. Magazine 322 is disposed between the distal leg portions of sleeve 320. A rectangular sleeve of cheese 324 is disposed within magazine 322. The cheese may be, for example, mozzarella, romano, parmesan, etc. depending on the user's taste. In addition, a weight 326 may be disposed above the sleeve of cheese 324 so as to ensure that the cheese is applied against the grater with a predetermined minimum pressure.

Figure 22:
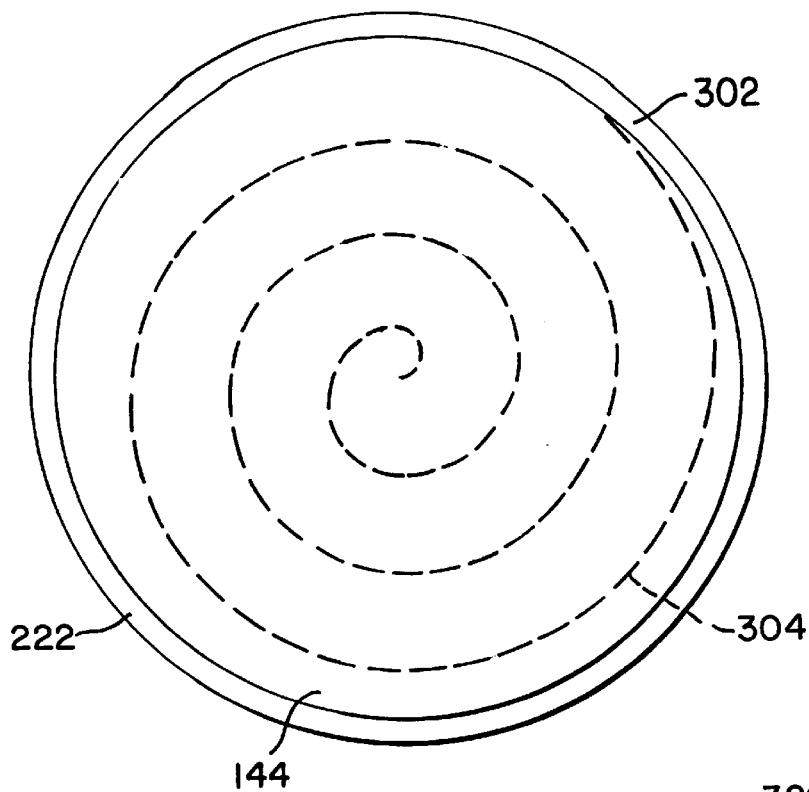
FIG. 22 is a schematic top plan view of a partially cooked pizza crust with a preferred path for the toppings which are placed on top of the pizza crust.

To dispense a predetermined amount of cheese upon the pizza crust, which is disposed below the outlet of the shroud 320 of the cheese grater, the motor 308 is actuated thereby causing grater 316 to rotate. Weight 326 applies pressure to the cheese 324 and causes the cheese to be in contact with the rotating grater 316. The cheese is thus freshly grated and applied to the top of the pizza crust in a spiral manner as illustrated in FIG. 22. If desired, the cheese can also be applied to the pizza as the crust 144 retracts from the extended radial outermost position to the retracted radial innermost position. Therefore, an extra dosage of cheese can be applied to the pizza crust. Similarly, an extra dose of any one of the toppings, including sauce, can be applied to the pizza crust by applying the topping on both the radial outward stroke and the radial inward stroke.

The rotary index table is then actuated to move the pizza crust to the next dispensing station. As illustrated in FIG. 1, if desired, two dispensing carousels 330, 332 can be disposed at each dispensing station. For example, the outlet nozzle of dispensing carousel 330 is disposed above the center of the pizza crust when one of plates 222, 224, 226 is in the radial innermost position; whereas dispensing carousel 332 is disposed above radial outermost point of the pizza crust when one of plates 222, 224, 226 is in the radial innermost position. Thus, the dispensers 330, 332 can simultaneously dispense toppings on top of the pizza as the plate is moving from the radial innermost position to the radial outermost position. In addition, each dispenser 330, 332 may have a plurality of topping canisters disposed in each station. As illustrated in FIG. 1, each dispenser 330, 332 has four dispensing magazines. The canisters may all be rotated about a center axis 334, 336, of each dispenser carousel, respectively. Thus, additional quantities of toppings can be applied. Alternatively, the magazines may have different toppings, e.g. different kinds of cheese, and can be controlled to apply only a selected one or more types on the pizza.

Figure 68:
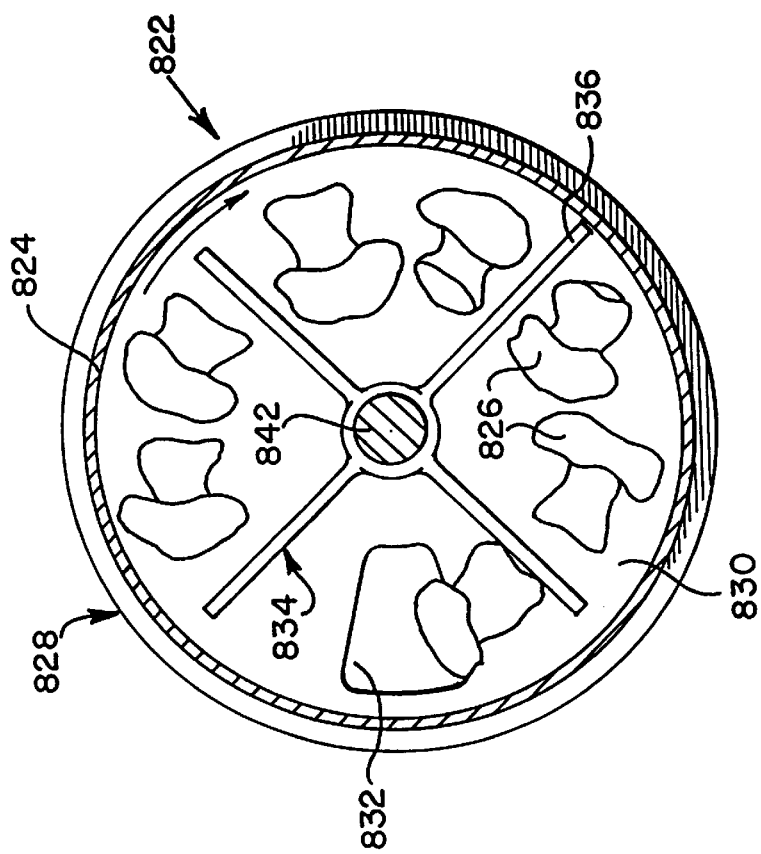
FIG. 68 is a sectional view of the mushroom dispenser.
Figure 67:
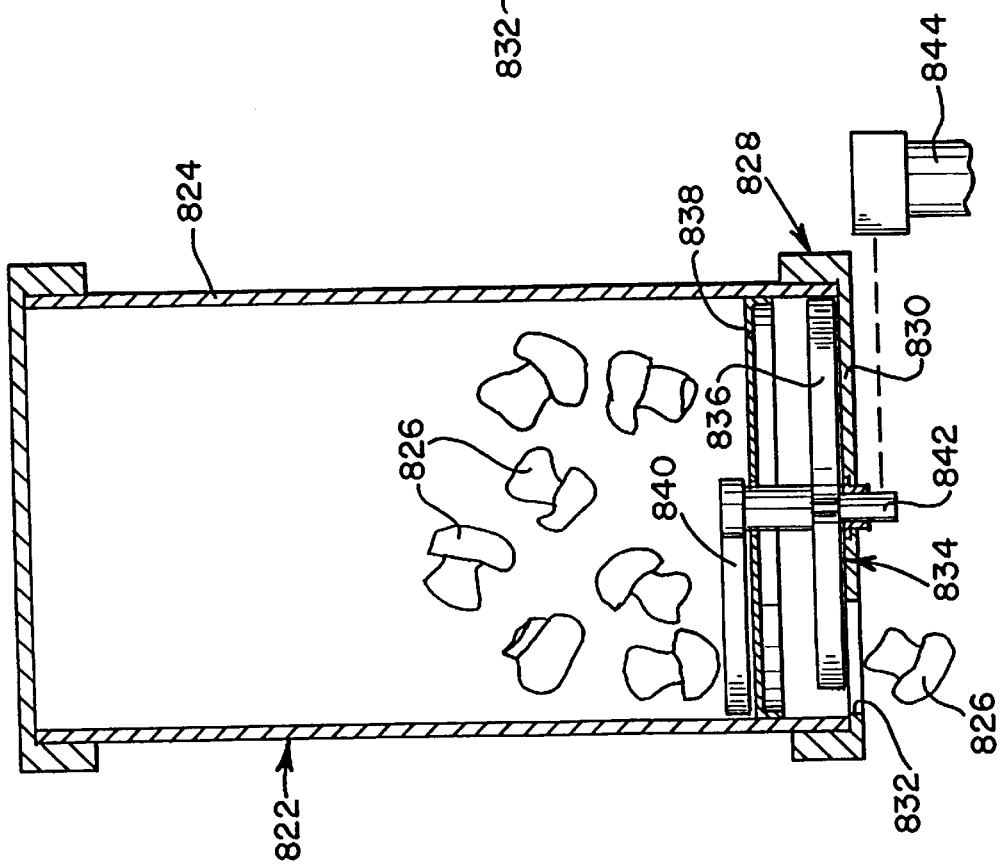
FIG. 67 is a side view of the mushroom dispenser.
Figure 69:
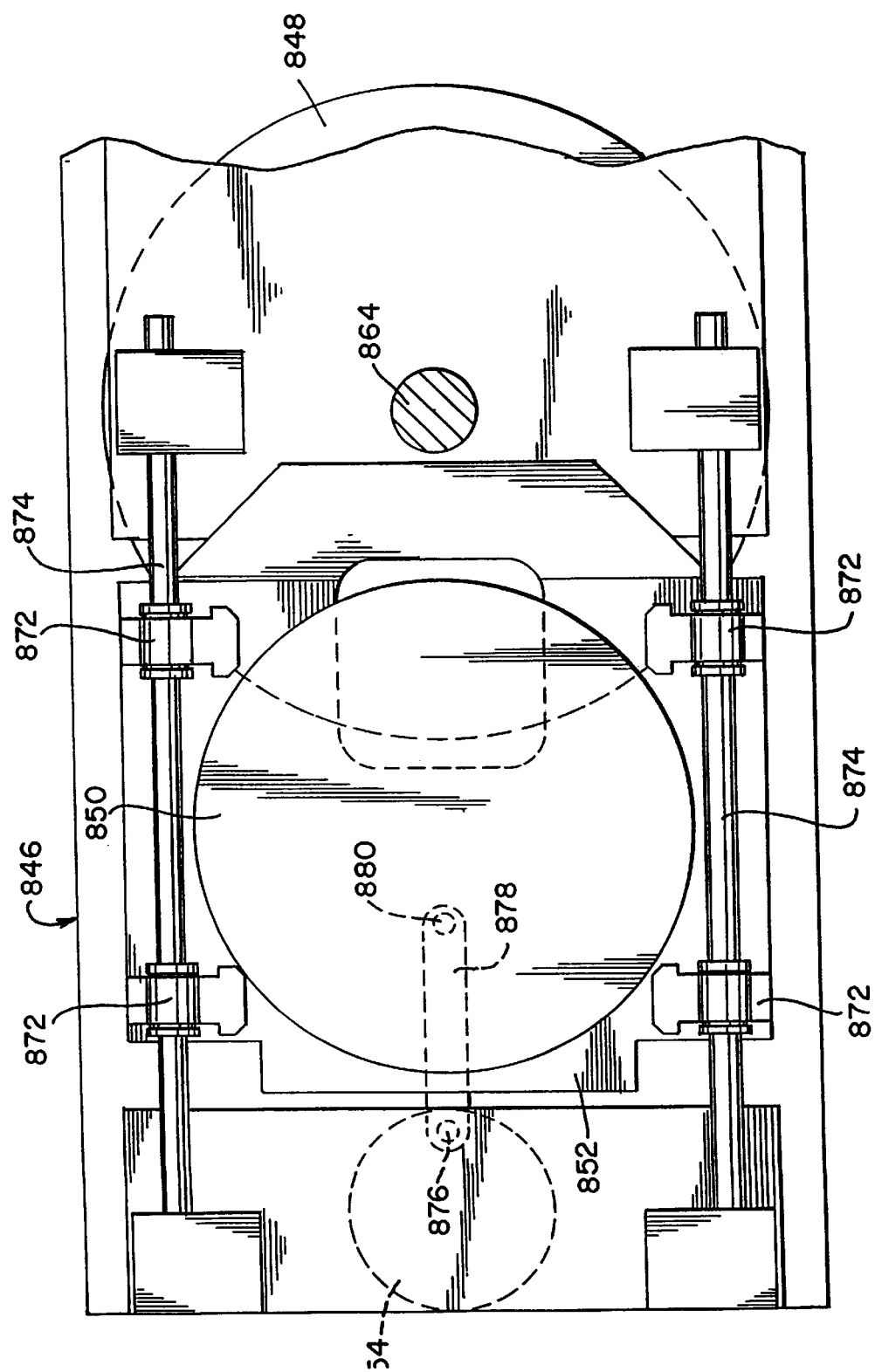
FIG. 69 is a top view of the pepperoni dispenser.
Figure 70:
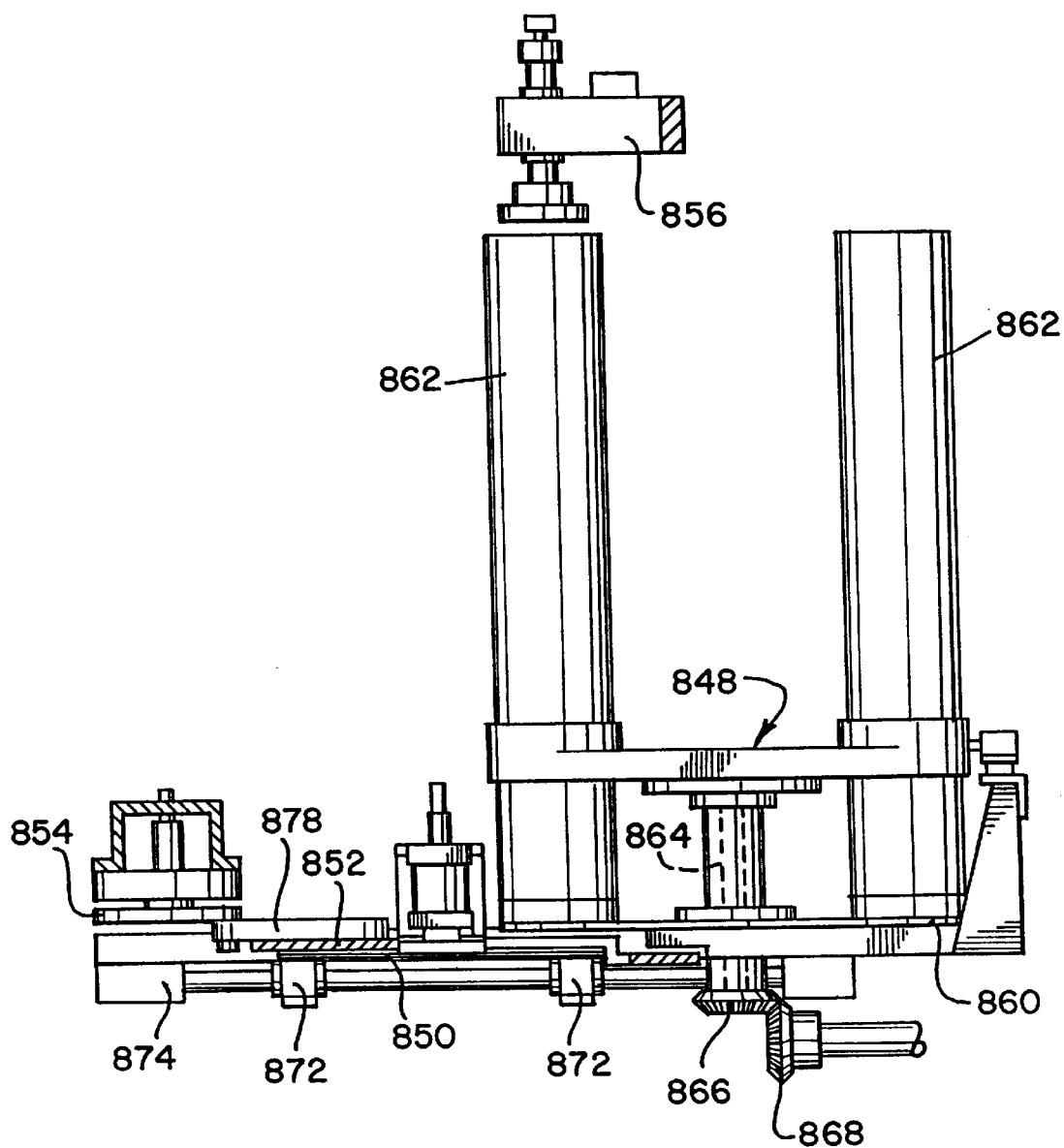
FIG. 70 is a front view of the pepperoni dispenser.

Referring now to FIGS. 67 and 68, a mushroom dispenser 822 is illustrated. Mushroom dispenser 822 includes a reservoir 824, which is filled with mushrooms 826, and a bottom housing 828. Reservoir 824 and housing 828 are separable. The reservoir is preferably the mushroom container, so that when a new batch of mushrooms is required, the old reservoir can be removed and replaced with a new one.

Bottom housing 828 includes a main housing plate 830 with a cutout 832 to let the mushrooms fall from the dispenser. A stirrer arm which preferably rotates at a constant velocity, pushes the mushrooms 826 out through the cutout opening 832. The stirrer arm 834 preferably includes four arms, one arm 836 is longer than the other three to help sweep the mushrooms off the inner cylindrical wall of reservoir 824. Additionally, if needed, a second set of arms can be disposed on top of the first set to help in the agitation of mushrooms at a higher level within the reservoir.

A roof 838 is disposed above the stirrer arm 834. Roof 838 is a thin strip that covers the cutout hole 832 beneath it. When stirrer 834 arm is rotating, the mushrooms tend to be pushed to the wall of reservoir 824 due to centrifugal forces. A sweeper 840 is disposed above roof 838. Sweeper 840 literally sweeps the mushrooms above the roof. Both the stirrer arm 834 and sweeper 840 are coupled to the same selectively rotatable shaft 842, which is coupled to a drive motor 844. A door (not shown) is disposed beneath cutout 832. This door will open when the dispenser is functional and will shut when the dispenser is non-operational. This door may be solenoid activated or linked to the index plate beneath it by a manner known to those skilled in the art. Of course, depending on the size of the mushrooms, the cutout hole may take on any size.

The reservoir surface is preferably made or coated with a non-stick material because the mushrooms, which are sticky in nature, must not bond to the walls, but rather fall down easily. If necessary, the sweeper arm that covers the whole height of the canister may be used to ensure that the mushrooms are liberated from the wall.

In accordance with a second embodiment of the present invention, the cheese dispenser unit is identical to the mushroom dispenser. This cheese dispenser preferably utilizes granular cheese. Each cheese granule is cube-shaped and is approximately ⅛ by ⅛ by ⅛ of an inch in size. Each granule is individually quick frozen. Granular cheese, as opposed to freshly grated cheese, is much cleaner to work with. The granules are guided straight down towards the pie, whereas grated cheese can periodically fall over the sides of the crust or may even fall down in clumps. Additionally, no periodic cleaning of a cheese grating wheel is required when using granular cheese.

Another advantage of granular cheese is that the distribution or spread is much more consistent. A pie can now be covered evenly, without over dispensing. Since the stirrer arm requires only one motor, the cheese pusher motor from the previous cheese grater dispenser can be eliminated. Additionally, building two identical dispensers is much more economical in terms of manufacturing cost, as opposed to building two unique dispensers. The overall size of this second embodiment dispenser is smaller than the previous one, which in the end, gives greater flexibility when assembling the machine. Of course, the mushroom dispenser 822 can also be used to dispense other products, such as, vegetables (e.g., peppers, broccoli, etc.).

Pepperoni Dispenser

Referring now to FIGS. 69–75, a pepperoni dispenser 846 is illustrated. The pepperoni dispenser 846 vertically stores a predetermined amount of pepperoni sticks, cut slices from the stick, and drops the slices properly on crust 144, which is disposed below the pepperoni dispenser 846. Dispenser 846 includes a pepperoni stick indexer 848, a cutting blade 850, a blade housing 852, an eccentric drive disk 854, a pepperoni stick pusher 856 and a pepperoni dropper 858.

Pepperoni stick indexer 848 includes a tubeholder plate 860 that has a predetermined amount of circular cutouts, one for each pepperoni tube holder 862. Tubeholder plate 860 revolves about a center shaft 864 which is pinned to a bevel gear 866. Bevel gear 866 meshes with a mating bevel gear 868, which is coupled to a motor (not shown).

Initially, all tubes are preferably filled with sticks of pepperoni 870. At the cutting station, each stick will be cut one slice at a time until the stick has almost reached its end. At this point, a sensor (not shown) will signal the indexer 848 to index once (i.e., rotate by a predetermined angle) so that a fresh, new stick will now be positioned at the cutting station. Tubeholders 862 act as guides for the pepperoni sticks 870 both during indexing and cutting.

Blade 850 and blade housing 852 can best be seen in FIGS. 70, 71, 72, 75 and 75. Blade 850 is preferably of the circular smooth type and has no teeth. Blade 850 preferably has an angled ground finish, which makes it very sharp to the touch. Blade 850 rotates about its center axis and advances towards the stationary pepperoni stick 870, makes the cut, and then retracts to complete the cycle.

The blade assembly is connected to blade housing 852, which as an assembly, rides on four linear bearings 872 along fixed guide rods 874. Blade 850 is located beneath housing 852 and, at the other end, the pepperoni stick 870 sits atop the blade housing 852. Due to the blade housing's geometry, when the blade 850 and housing 852 advance towards the pepperoni stick 870, the stick 870 rides on the housing, until the blade 850 makes contact with stick 870 and cuts into the stick. At this point, blade 850 is actually supporting stick 870. The reciprocating motion of the blade and housing is so fast that the pepperoni stick 870 is unaffected by the slight height change during this transition. Because of this structural arrangement, each slice of pepperoni is cut to a constant thickness.

Figure 71:
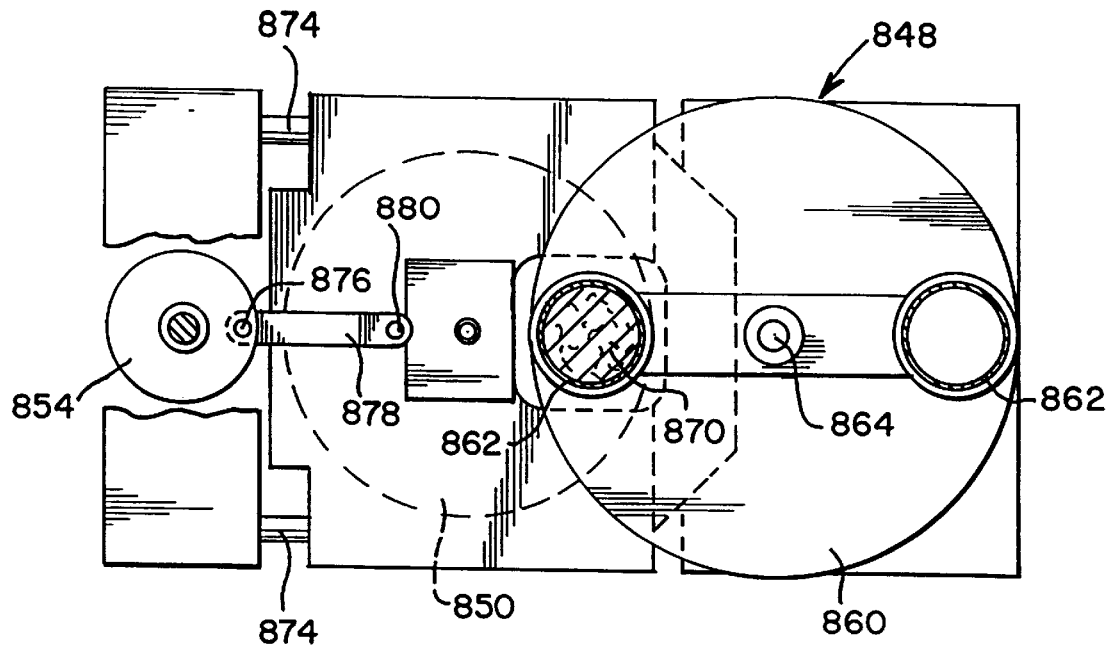
FIG. 71 is a top view of the pepperoni dispenser in an extended position.
Figure 72:
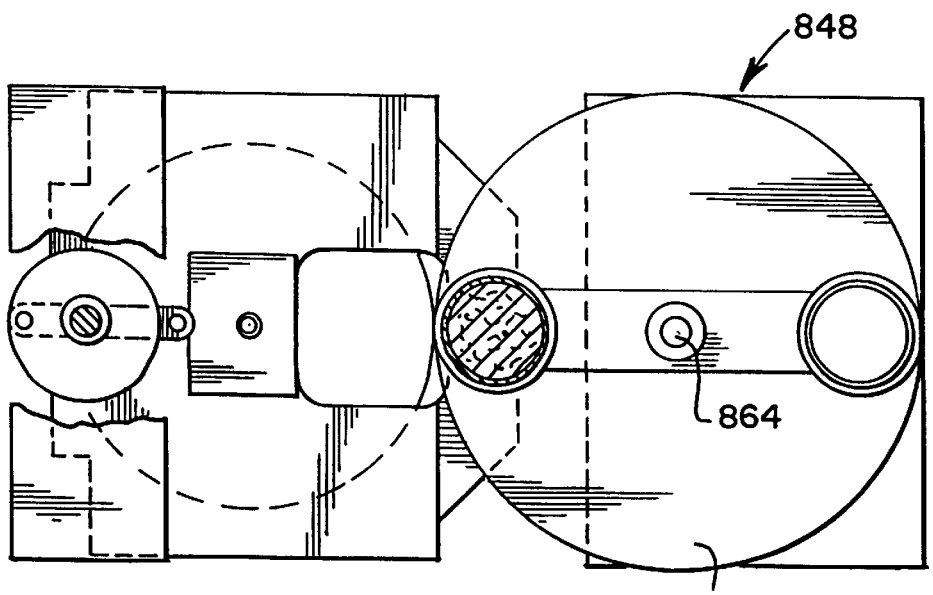
FIG. 72 is a top view of the pepperoni dispenser in a retracted position.

Eccentric disk 854 causes the blade and blade housing 852 to reciprocate with respect to the pepperoni stick 870. Referring now to FIGS. 71 and 72, disk 854 has an offset hole 876 pinned to a connecting rod 878, which in turn at its opposite end 880 is pinned to the blade housing 852. The rotation of disk 854 about it natural center converts the rotary motion of the disk to a reciprocating motion of the blade housing 852. The linear bearings 872 and guide rods 874 ensure that the blade housing 852 moves linearly. Of course, the eccentricity of disk 854 determines the cutting stroke of blade 850 to cut the pepperoni stick.

Figure 73:
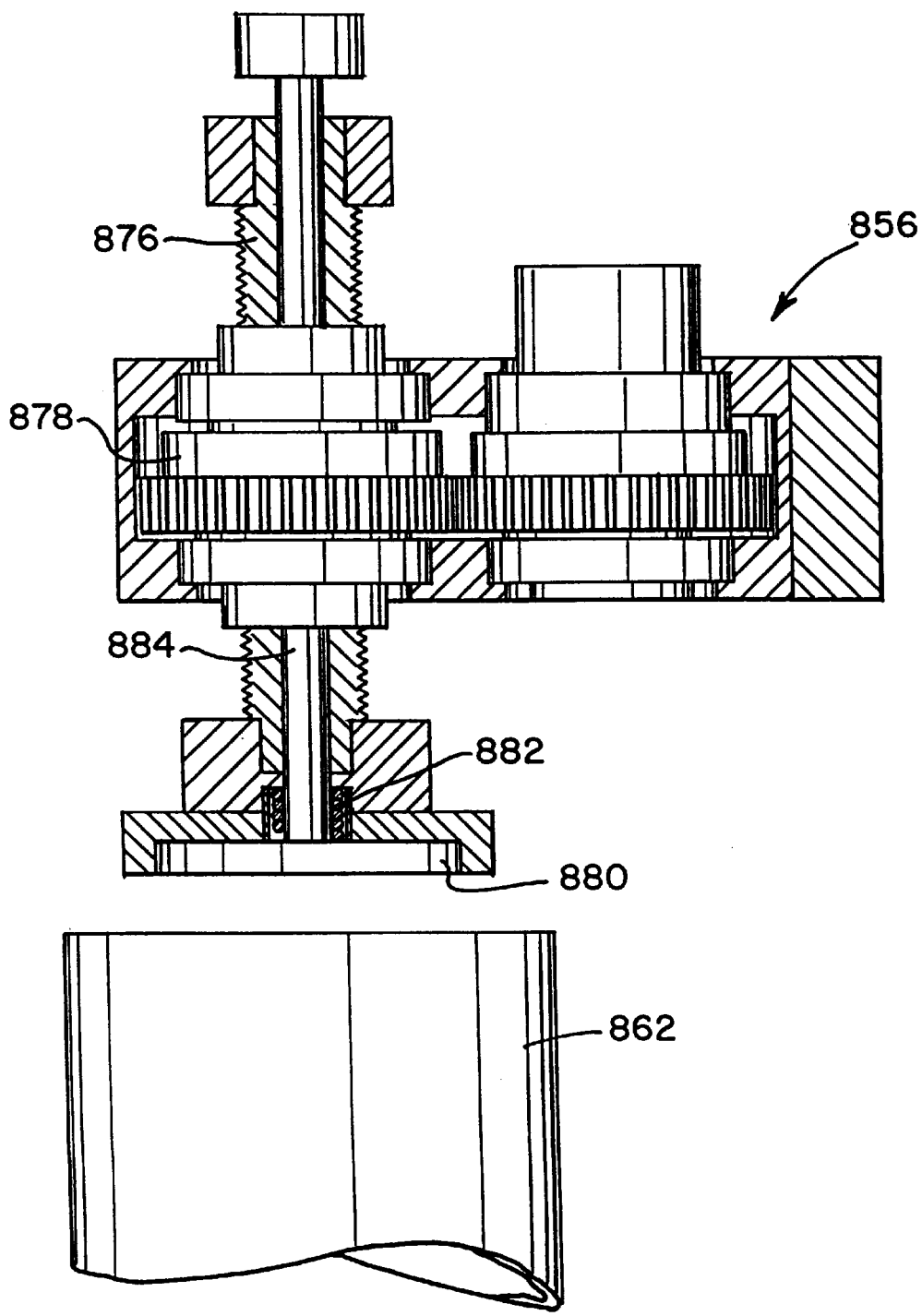
FIG. 73 is an enlarged front view of the pepperoni pusher plate.
Figure 74:
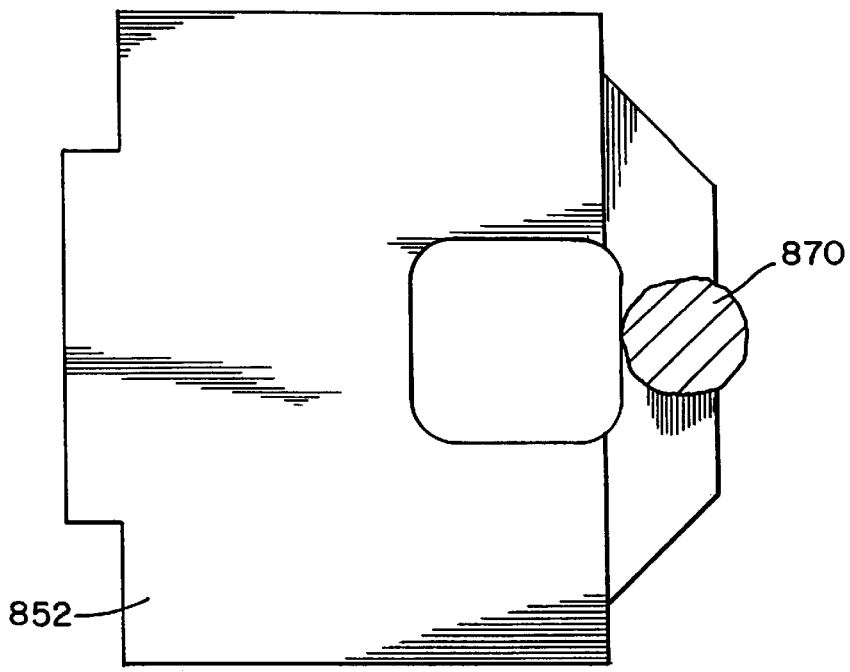
FIG. 74 is a top view of the blade housing.
Figure 75:
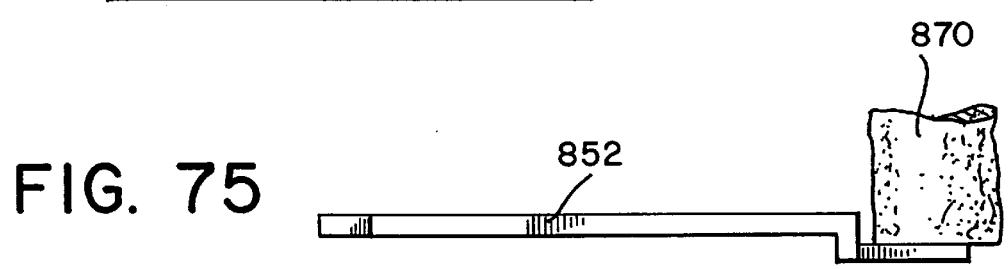
FIG. 75 is a side view of the blade housing.

Because the reciprocating motion of blade 850 is quite fast (i.e., fast enough to cut, approximately, one slice per second), a pepperoni stick pusher 856 is required to assure that the pepperoni stick 870 is resting on the blade housing 852 surface before being sliced by blade 850. Referring now to FIG. 73, a threaded rod 876 is illustrated as being driven by a mating rotating threaded nut 878, thereby causing a rod 876 to extend and retract in a linear manner. At the lower end of the threaded rod 876, a spring-loaded pusher plate 880 contacts the pepperoni stick 870. Spring 882 is required to maintain a certain force between the plate 852 and pepperoni stick 870, and to signal to the drive system when to stop pushing.

A plunger rod 884 is connected to the pusher plate 880. Spring 882 pushes the plate downwards and, once contact is made, the plate 880 begins moving upwards as the threaded rod continues downward. The threaded rod 876 will stop advancing when the plunger rod 884, which is connected to the pusher plate 880 that is in contact with the pepperoni stick 870, rises and trips a switch (not shown) to signal the threaded rod drive to stop.

When a slice of pepperoni is cut from the stick 870, it is preferably that it falls flat on the crust 144. Since the slice is round and thin in shape, it tends to flip or even fall vertically and bounce off the crust. Thus, a pepperoni dropper mechanism 858 is needed to ensure that the slice falls flat on the pie.

Figure 76:
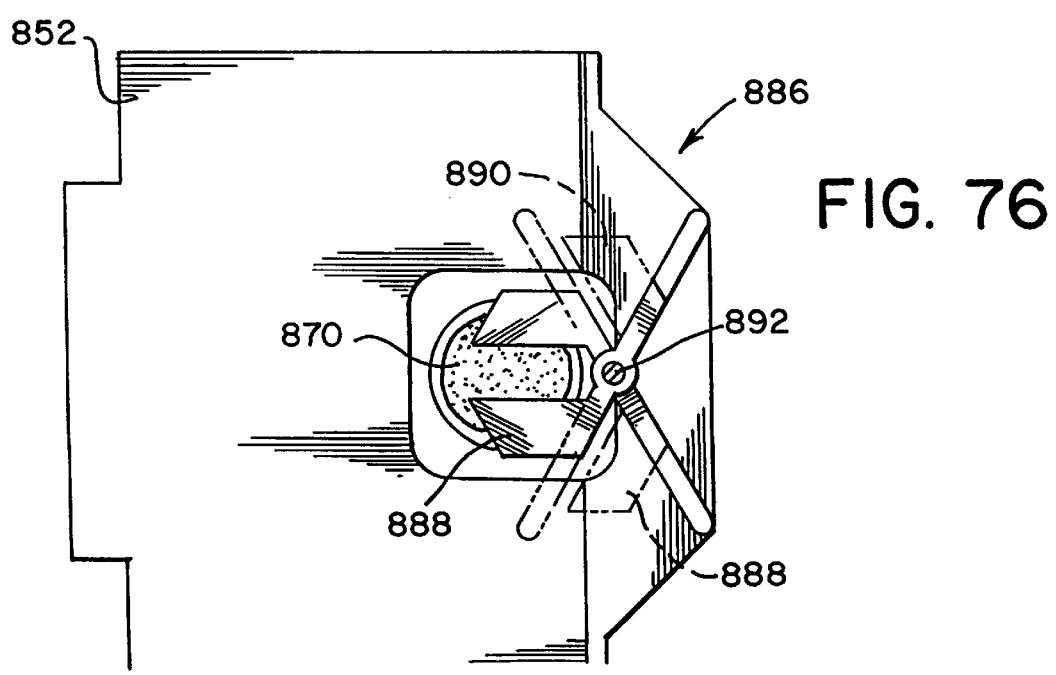
FIG. 76 is a top view of the pepperoni dropper mechanism.

The pepperoni dropper 858 is best illustrated in FIG. 76. Pepperoni dropper 858 is located just beneath the cutting blade 850 so it will catch the cut slice. Dropper 858 includes two arms 888, 890 that pivot about a center point 892. The ends of the arms are pinned to the blade housing plate 852, so that when the blade housing plate 852 reciprocates back and forth, the arms swing or pivot about center 892. The arm's end are enlarged into a paddle shape so as to catch the cut slice of pepperoni during the cutting stroke (the arms are shown in solid lines in the catching position and in phantom in the retracted position). On the retract stroke, the arms swing away from each other and, thus, slowly release the cut slice of pepperoni so that it may gently fall flat on the crust 144.

After all of the toppings have been placed on top of the pizza crust, the rotary index table station rotates the pizza crust to station no. VI. In this station, the pizza is ready to be transferred from the rotary index table station 20 to the elevator station 22. The elevator 22 conveys the pizza from the rotary index table to an oven disposed below.

Figure 25:
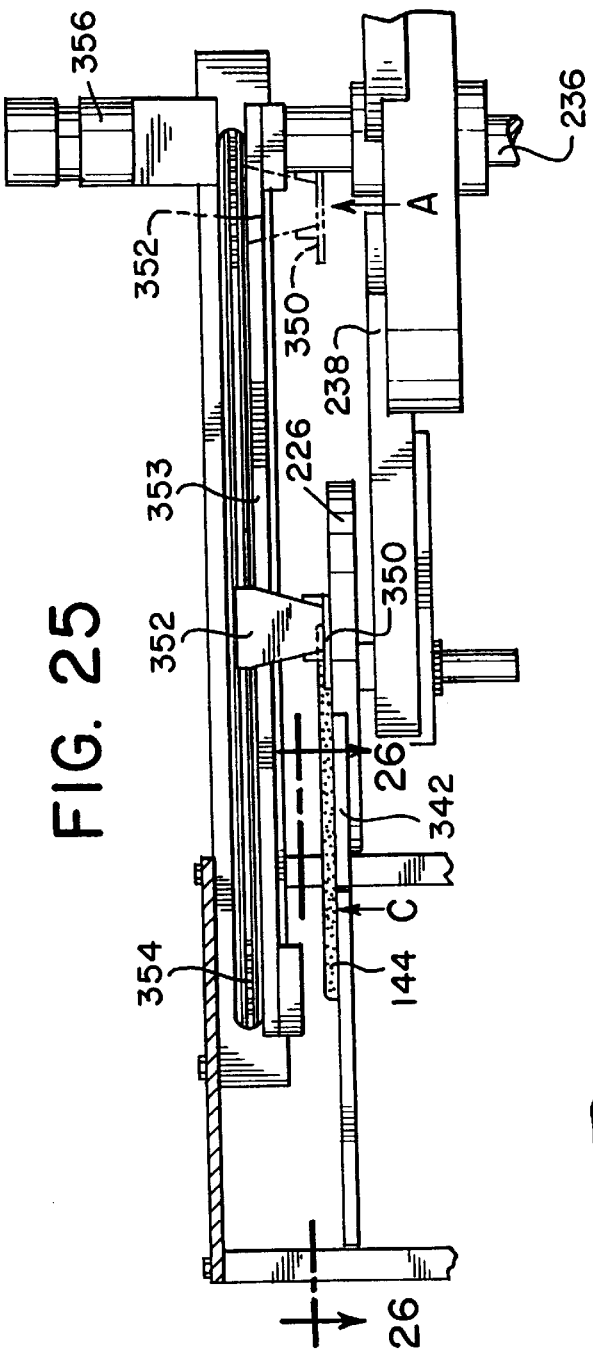
FIG. 25 is a rear side elevational view of the mechanism for transferring the partially cooked pizza crust from the rotary index table station to the elevator station.

The uncooked pizza crust 144 is transferred to station number VI in the radially innermost position. Thereafter, the rotating plate 222, 224, 226 is moved to the radial outermost position, as illustrated in FIG. 25 and in dashed lines in FIG. 4. The frame 200 includes a pair of crescent shaped pieces 342, 344. Each piece 342, 344 has an internal circumferential surface 346, 348 which is shaped to mate with the outer circumference of any one of plates 222, 224, 226 when the plate is disposed in station no. VI and is in the radial outermost position. A crescent shaped plate 350 is fixedly connected to an arm 352. Arm 352 is fixedly connected to a chain 354 which drives the arm 352 and the crescent shaped plate 350 from a first retracted position to a second extended position. The retracted position is shown in FIG. 1 and at position A in FIG. 25. The fully extended position is illustrated substantially at position C in FIG. 25. Chain 354 is driven by a reversible motor 356 which rotates in a first direction to move arm 352 and crescent shaped plate 350 from position A to position C and then reverses direction to move the arm and plate back from position C to position A. The front surface portion 358 of crescent shaped plate 350 is in the shape of an arc to mate with the outer circumferential surface of the pizza crust 144. Therefore, as the crescent shaped plate 350 is moved from position A to position C, surface 358 engages a portion of the outer circumferential surface of pizza crust 144 and moves the pizza from plates 222, 224, 226 to an elevator plate 360 disposed in the elevator station 22. As illustrated in FIG. 25, the arm 352 and plate 350 have partially transmitted the uncooked pizza 144 to the elevator plate 360.

Figure 34B:
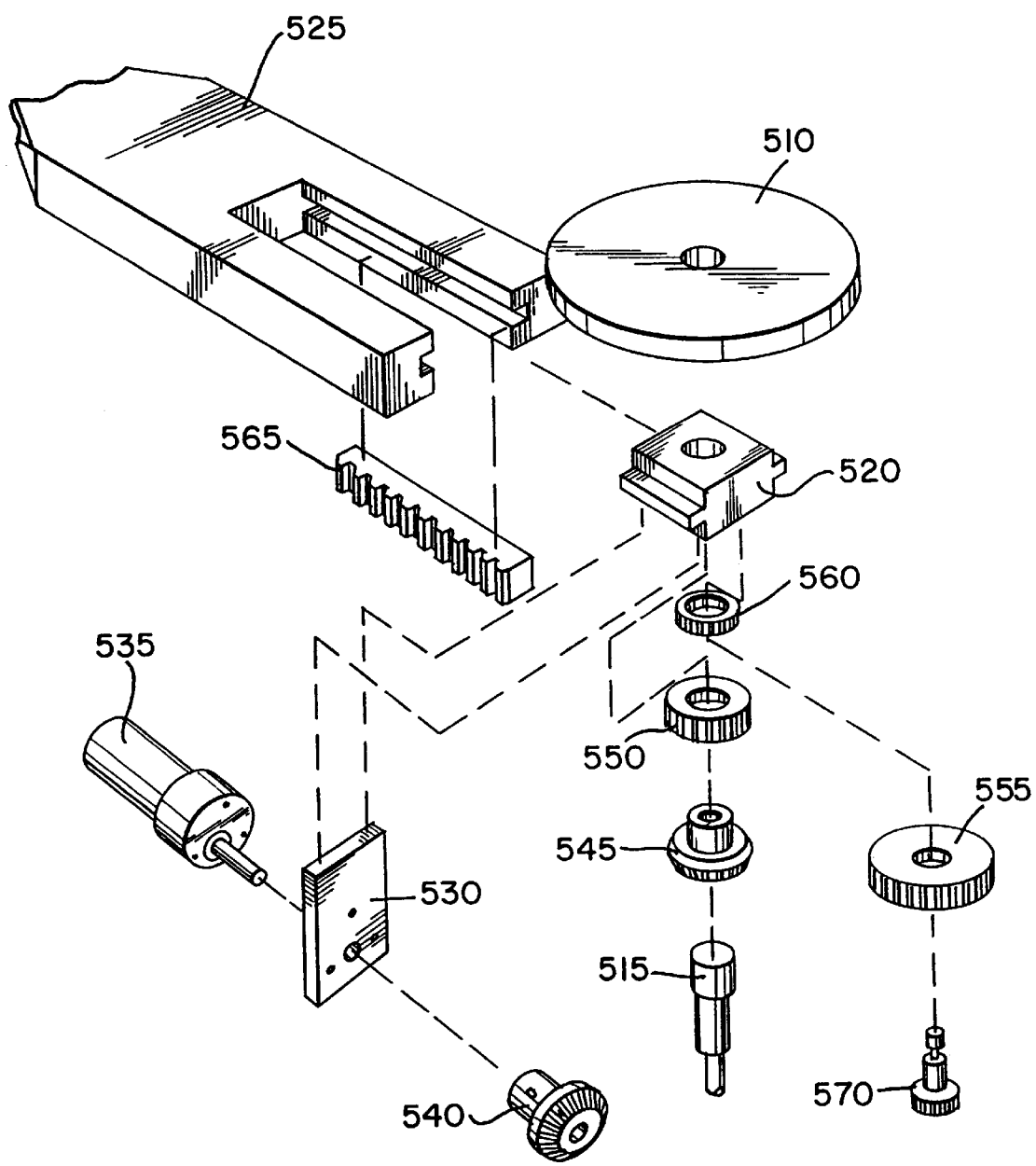
FIG. 34B is an exploded perspective view of the rotary index table station illustrated in FIG. 34A.

Referring now to FIGS. 34A, 34B and 35A, an alternate embodiment of the index plate station is illustrated. For the sake of brevity, only those portions of the index station that are different will be described. In this embodiment, only two plates 510 are utilized. Plates 510 are preferably disposed 180 degrees apart from each other. In addition, each plate 510 is rotatable about a central axis of the rotary index table station. In addition, each plate 510 is moveable between an innermost radial position and an outermost radial position. Each plate 510 has a central axis and is rotatable about its respective central axis as it is being moved between the innermost radial position and the outermost radial position.

In this embodiment, a plate shaft 515 is press fit to plate 510. A guide block 520, gear 550 and a miter gear 545 are disposed on shaft 515, as illustrated in FIGS. 34A and 34B. Guide block 520 is slidably received within an arm 525. A rack 565 is fixedly connected to the lower portion of arm 525.

Motor 535 is mounted to a motor bracket 530, which is mounted to guide block 520. Miter gear 540 is bolted to the shaft of motor 535. Miter gear 540 mates with miter gear 545, which is fixedly connected to plate shaft 515. Thus, plate 510 rotates at the same speed that motor 535 rotates.

Gear 550 is pinned to plate shaft 515 and mates with gear 555. Gear 560 is directly pinned to gear 555. Because both gears 555, 560 are connected, via a shoulder screw 570 to guide block 520, gears 555, 560 rotate at the same speed. Gear 560 mates with rack 565, thereby allowing the whole assembly (i.e., plate 510, shaft 515, guide block 520, motor bracket 530, motor 535, miter gear 540, miter gear 545, gear 550, gear 555, gear 560 and should screw 570) to move linearly between the radial innermost position and the radial outermost position.

Therefore, upon receiving a signal from the control system, motor 535 causes shaft 515 to rotate through miter gears 540 and 545. This in turn causes gear 550 to rotate, which rotates gears 555 and 560 simultaneously. Gear 560 causes the whole assembly to move linearly by meshing along rack 565. The remaining portions of the rotary index station are identical to the embodiment described above.

Referring now to FIG. 36A, a slip ring 239 is illustrated disposed about rotatable center shaft 236. Slip ring 239 permits voltage to be received by the two index plate motors 237, 535, without the motor's wires wrapping around the index table when the table is rotating. In a preferred embodiment, slip ring 239 has six wires, namely two power wires and four signal wires. One power wire is connected to each motor and the four signal wires are connected to the motor's circuit boards.

Elevator Station

Figure 26:
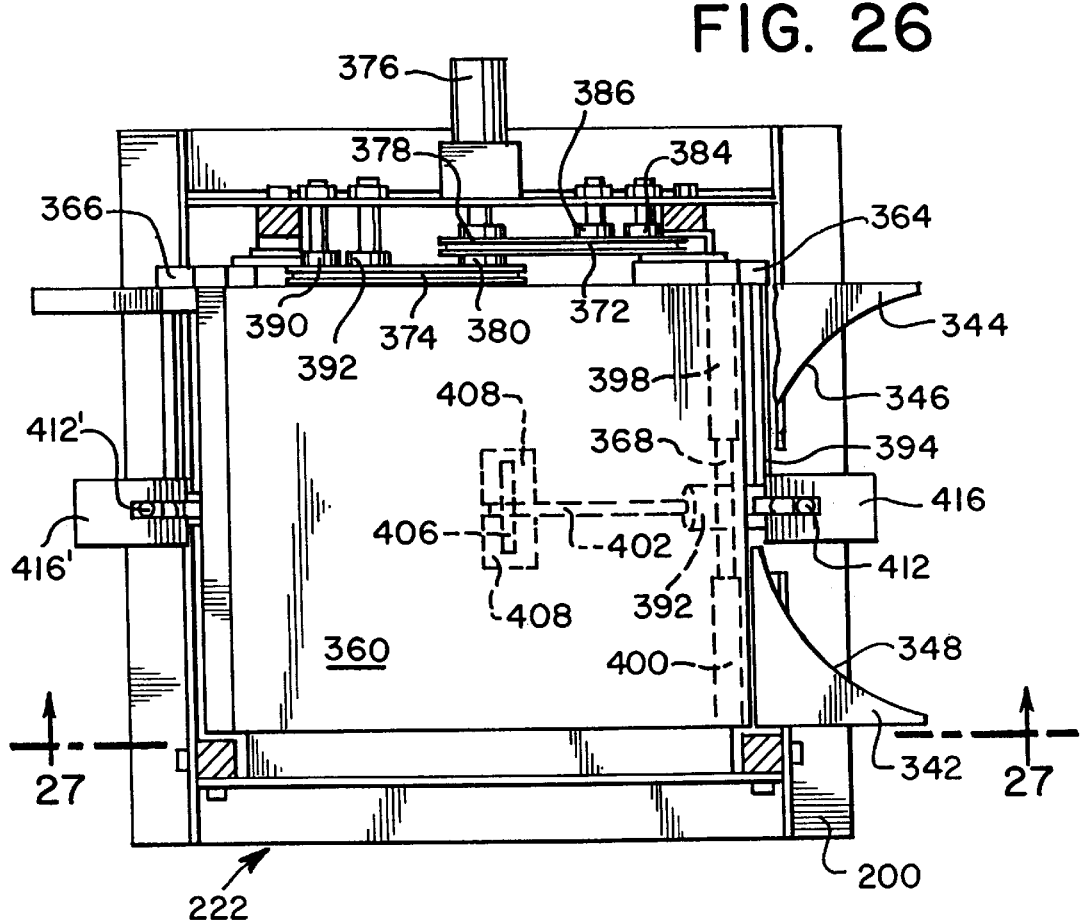
FIG. 26 is a cross sectional view taken along line 26—26 of FIG. 25 and looking in the direction of the arrows.
Figure 27A:
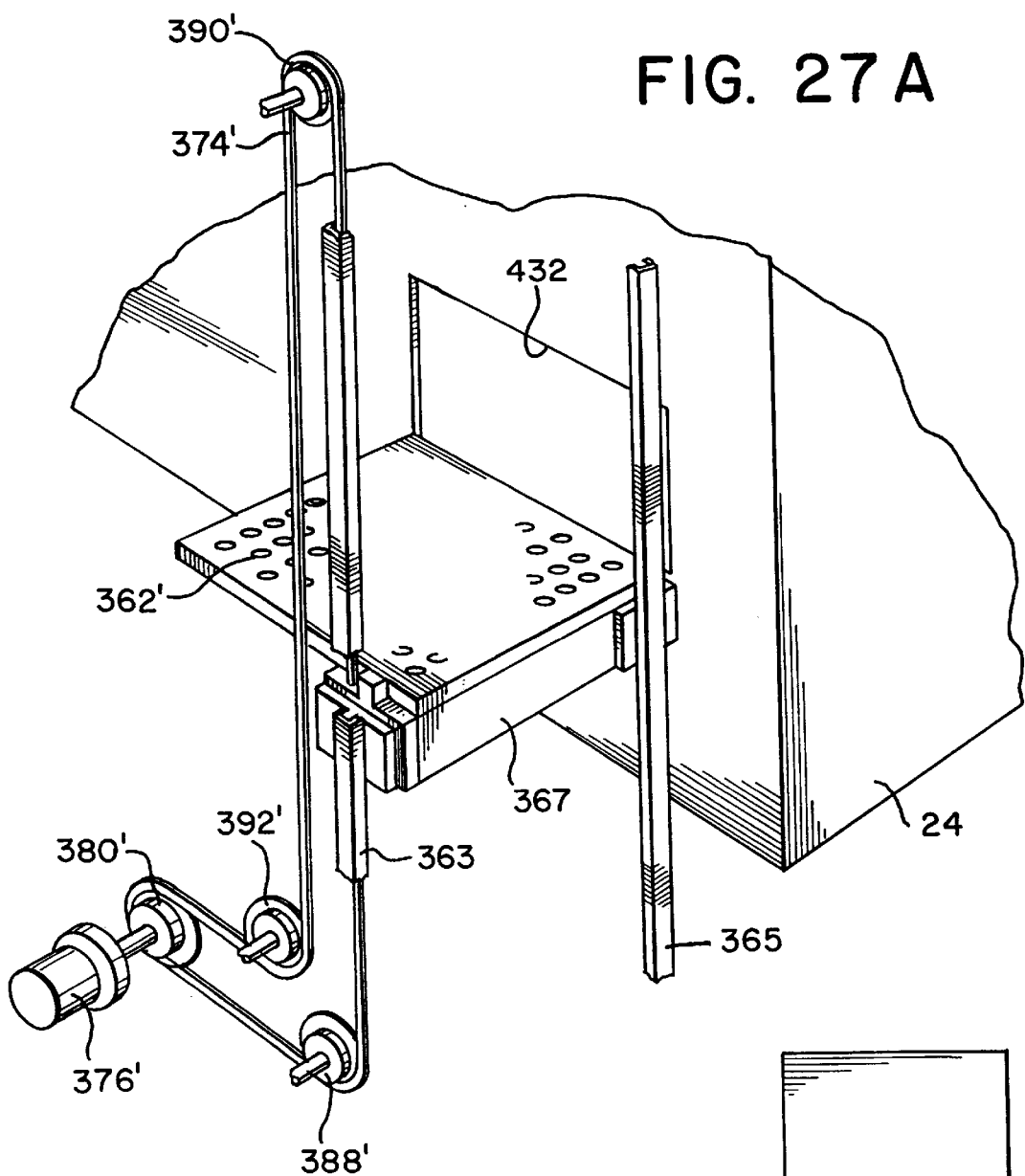
FIG. 27A is a perspective view of an alternate embodiment of the elevator station.
Figure 27:
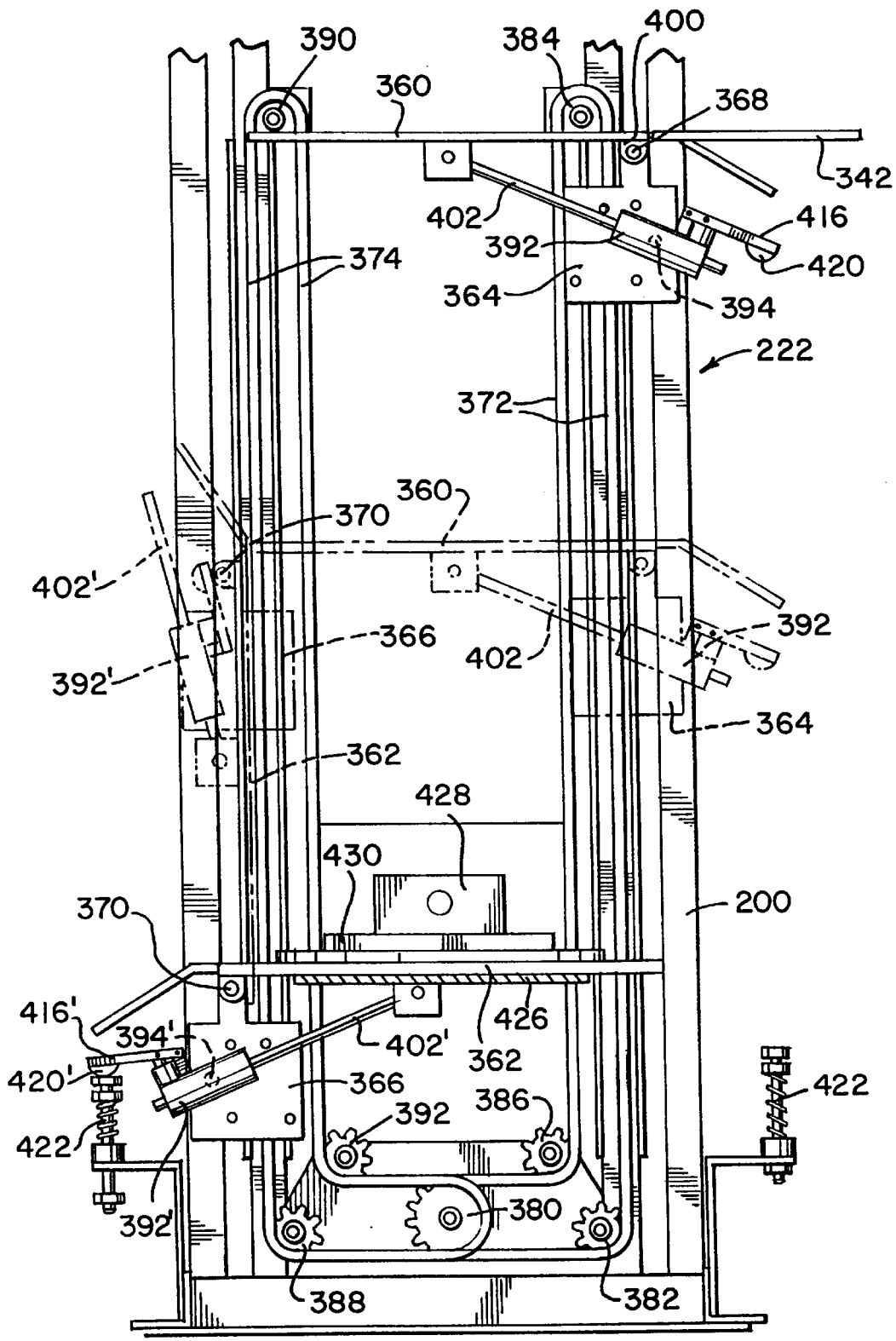
FIG. 27 is a cross sectional view taken along line 27—27 of FIG. 26 and looking in the direction of the arrows.

Referring now to FIGS. 1, 4 and 26–30, the elevator station 22 will now be described. As illustrated in FIG. 27, the elevator station includes a first plate 360 and a second plate 362. Each plate 360, 362 is pivotably attached to a vertically reciprocating mounting plate 364, 366 about pivot pin 368, 370, respectively.

When describing the structural elements associated with each plate 360, 362, a like element for plate 362 will be described with the same reference number followed by a prime. For example, rod 402 is associated with plate 360, whereas rod 402' is associated with plate 362.

Each mounting plate 364, 366 is fixedly mounted to a chain 372, 374, respectively. Each chain 372, 374 is driven by a reversible motor 376 via a first drive pulley 378 and a second drive pulley 380, respectively (see FIG. 26). Three idler pulleys 382, 384, 386 guide the movement of chain 372. Likewise, three idler pulleys 388, 390, 392 guide the movement of chain 374.

As illustrated in FIGS. 26 and 27, mounting plate 364 is fixedly mounted to an L-shaped bracket 392 by a shaft 394. L-shaped bracket 392 is rotatably mounted about a pivot pin 368, which is fixed to mounting plate 364. A pair of sleeves 398, 400 are fixedly mounted to the underside of plate 360. Sleeves 398, 400 are rotatably mounted about pivot pin 368. A rod 402 is slidably received within a throughbore 404 in L-shaped bracket 392 (See FIG. 28). The first end of rod 402 is pivotably connected to plate 360 via a pivot pin 406. Pin 406 is mounted to plate 360 via a pair of downwardly depending brackets 408 that are fixedly connected to the underneath surface of plate 362.

Figure 28:
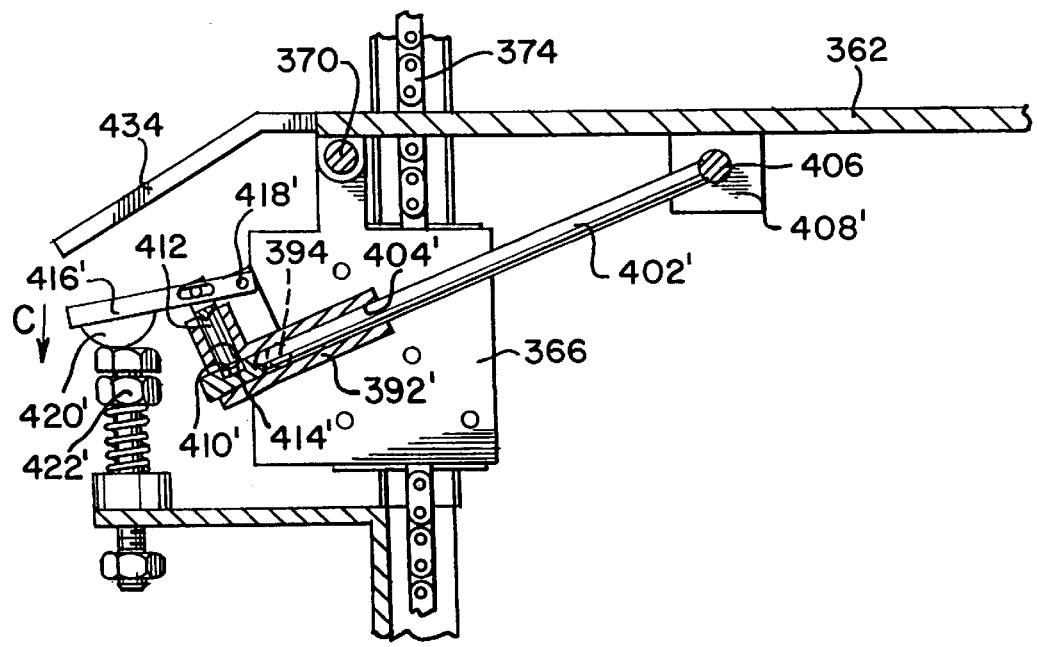
FIG. 28 is a partial cross sectional view of one of the elevator plates in the lower limit position.

Referring now to FIG. 28, the connection to plate 362 is shown. Rod 402' is connected via bracket 408' to plate 362. The other end of rode 402' is received in bore 404 of L-shaped bracket 392', which is mounted by pivot 394 to plate 366. Rod 402' includes a U-shaped notch 410' adjacent to its second end. Notch 410' is sized to selectively receive pin 412', which slides in a second bore 414' within the L-shaped bracket 392'. Bores 404' and 414' are preferably disposed at a 90° angle with respect to each other. A first end of pin 412' selectively engages within the U-shaped notch 410'. The opposite end of pin 412' is pivotably connected to a lever 416'. Lever 416' is pivotably connected to the L-shaped bracket via a pivot pin 418'. A weight 420' is disposed on a distal end of lever 416'. Weight 420' normally biases lever 416 in the direction indicated by arrow C in FIG. 28. When locking pin 412' is received within the U-shaped notch 410', plate 362 is locked in a horizontal position.

Referring now to FIG. 27, plate 360 is shown in the uppermost position and plate 362 is shown in the lowermost position. Plate 360 is ready to receive an uncooked pizza and to be lowered to the lowermost position so that the uncooked pizza can then be transferred into the oven. In the lowermost position, weight 420' of plate 362 has engaged a stop bolt 422' which lifts locking pin 412' free from the U-shaped notch 410' in rod 402' (FIG. 28). Therefore, rod 402' is now free to slide with respect to L-shaped bracket 392'. However, the distal end 424 of plate 362 (see FIG. 3) is now engaged and supported in the horizontal position by an inwardly protruding L-shaped bracket 426, which is fixed to the oven of the apparatus. Therefore, shelf 362 is prevented from pivoting about pin 396'.

Plates 360, 362 are maintained in a stationary position in the uppermost and lowermost positions, respectively. (i.e., motor 376 is not actuated). A pusher mechanism 428, which is actuated by an actuating mechanism 92', is disposed adjacent to the plates in the lowermost position (see FIGS. 3 and 27). Pusher mechanism 428 has a front concave surface 430 which is shaped to match the outer circular contour of the uncooked pizza 140'. Upon being actuated by mechanism 92', pusher mechanism 428 moves in the direction indicated by arrow D in FIG. 3 from a retracted position to an extended position to push the uncooked pizza from tray 362 (which is in the lowermost position) through an opening 432 in the oven 24. After the pizza has been transferred into the oven, and another uncooked pizza has been placed upon shelf 360, which is disposed in the uppermost position, motor 376 is then actuated in a first direction (i.e., clockwise as illustrated in FIG. 27) to cause chains 372, 374 to move, which in turn cause mounting plate 366 to move upwards and mounting plate 364 to move downwards. After a predetermined amount of upward movement of mounting plate 366, plate 362 will clear the end of L-shaped bracket 426' so that plate 362 is now free to pivot downward about pin 370'. Plate 362 falls to the position illustrated in phantom in FIG. 27 thereby allowing the downwardly moving substantially horizontally-locked plate 360 to move from the upper limit position to the lower limit position.

Figure 29:
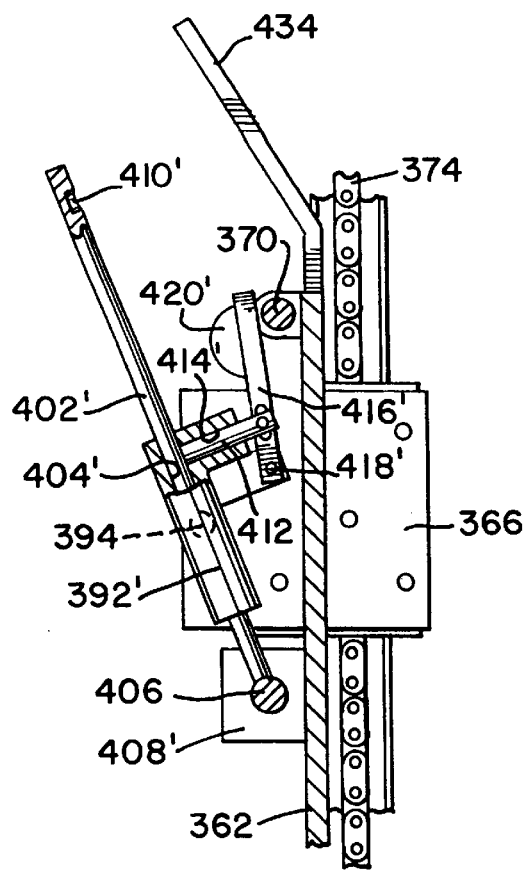
FIG. 29 is an enlarged cross sectional view of the mechanism for supporting one of the plates in the elevator station, when in the retracted position.
Figure 30:
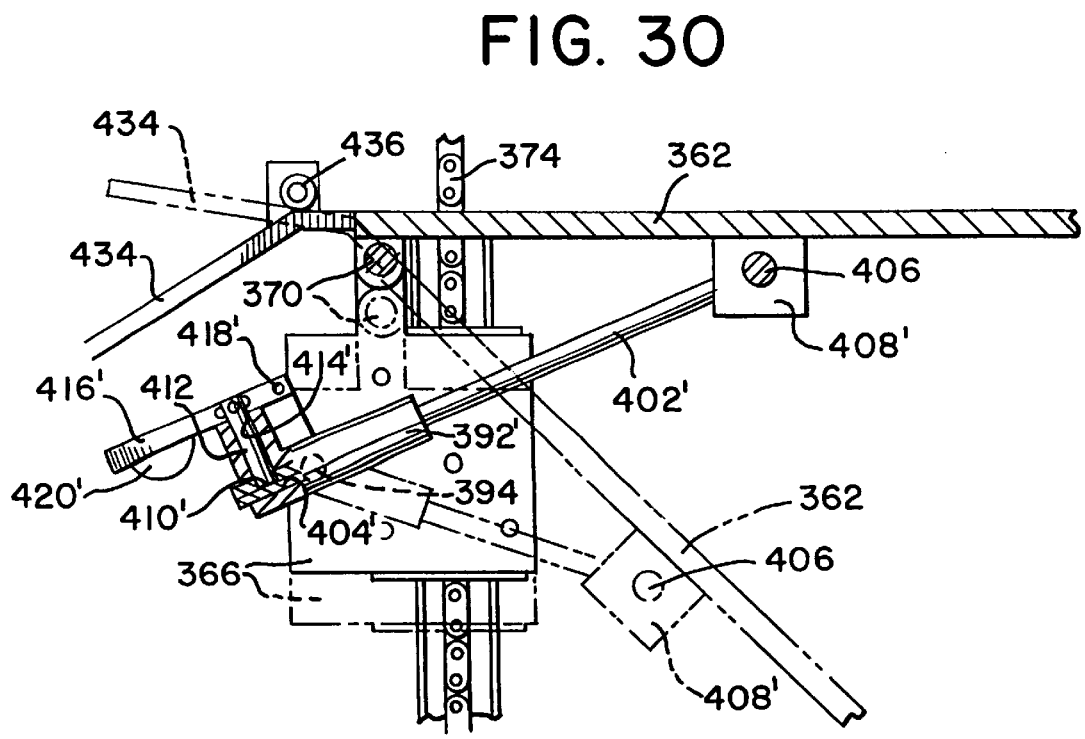
FIG. 30 is an enlarged partial sectional view of the locking mechanism for one of the plates in various positions as it approaches the upper limit position.

FIG. 29 shows the mounting plate 366 and plate 362 when in an intermediate position between the lower limit position and the upper limit position and when travelling upwardly. As plate 362 approaches the uppermost position, a cam follower surface 434, which is fixedly connected to the underneath surface of plate 362, engages a fixed cam roller 436. As illustrated in FIG. 30, as mounting plate 366 continues to move upwardly, the engagement between the fixed cam roller 436 and cam follower surface 434 causes plate 362' to move from the position illustrated in phantom in FIG. 30 to the position illustrated in solid in FIG. 30. During this movement, rod 402' slides with respect to the L-shaped housing 392' until locking pin 412' engages in the U-shaped notch 410' within rod 402' thereby locking plate 362' in substantially horizontal position. Motor 376 is stopped and plate 362' is now in the uppermost position and is ready to receive the next uncooked pizza from station number VI in the rotary index table station 20. Plate 360 is now in the lowermost position and is ready to permit pusher mechanism 428 to be actuated to permit the uncooked pizza 144 disposed thereon to be transferred into the oven. When the next uncooked pizza is placed on plate 362', motor 376 is actuated in the opposite direction (i.e., the counterclockwise direction as illustrated in FIG. 27) to cause plate 362' to now move from the upper limit position to the lower limit position, while being maintained in the horizontally locked position. Plate 360 now moves from the lower limit position to the upper limit position in a retracted position in a manner that is identical to how plate 362' retracts as described above.

Figure 26A:
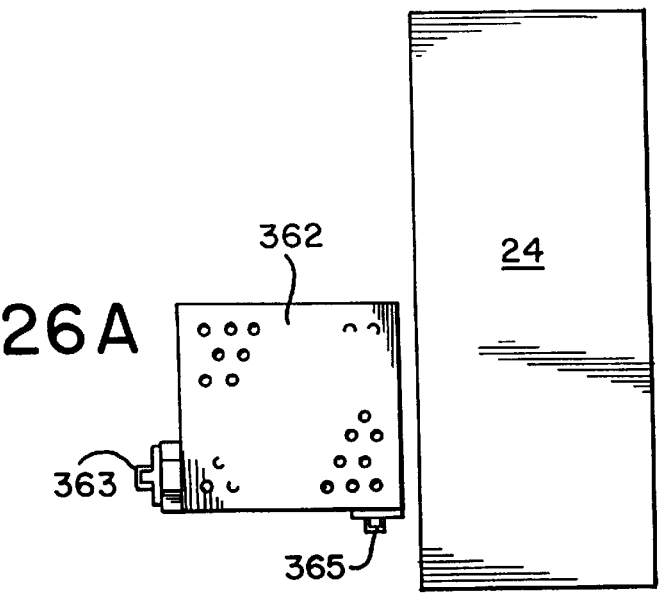
FIG. 26A is a top plan view of the elevator station of FIG. 27A.

Referring now to FIGS. 26A and 27A, an alternate embodiment of the elevator station is illustrated. In this embodiment, only one elevator plate 362' is utilized. Thus, the pivoting mechanism to allow the one plate to fold into the retracting position is not required in this embodiment. In this embodiment, plate 362' is mounted to a pair of rail tracks 363, 365 by an L-shaped bracket 367. Plate 362' is reciprocated between the uppermost position and the lowermost position by a chain drive 374' which is driven by a reversible motor 376' via a first drive pulley 380' and three guide pulleys 388', 390', 392'.

In operation, plate 362' is in the uppermost position and is ready to receive the next uncooked pizza from the rotary index table station 20. When the uncooked pizza is placed on plate 362', motor 376' is actuated in a first direction (i.e., the clockwise direction as illustrated in FIG. 27A) to cause plate 362' to move from the upper limit position to the lower limit position, while being maintained in the horizontal position. When plate 362' reaches the lower limit position, motor 376' is stopped and pusher mechanism 378 may now be used to push the pizza into the oven 24 through entry opening 432. After the pizza has been transferred into the oven and pusher mechanism 378 has retracted, motor 376 is actuated in the opposite direction (i.e., the counterclockwise direction as illustrated in FIG. 27A) to cause plate 362' to move from the lower limit position to the upper limit position so that it is ready to receive the next uncooked pizza from station number VI in the rotary index table station 20.

Oven Station

Figure 31:
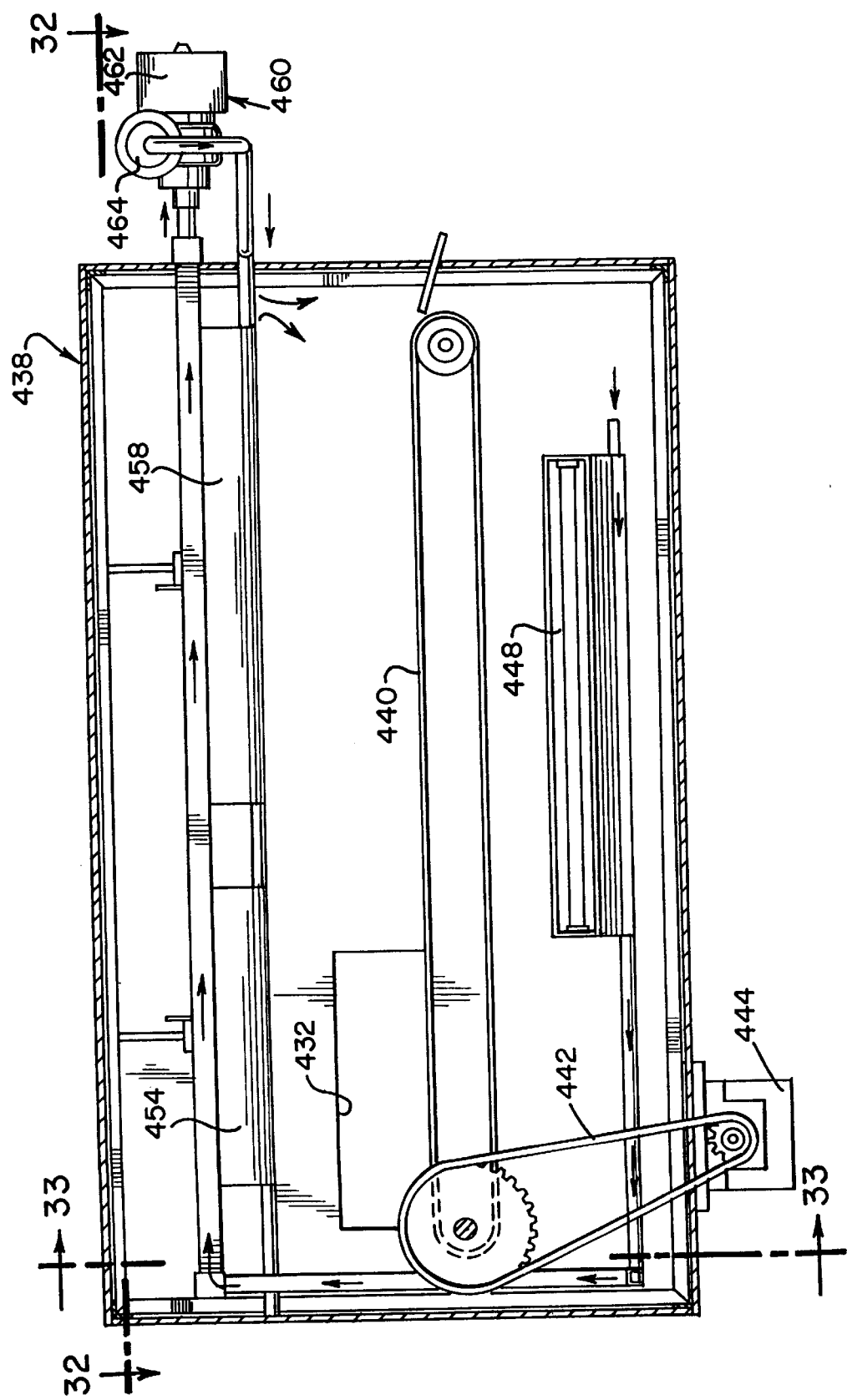
FIG. 31 is a sectional view taken along line 31—31 of FIG. 3 and looking in the direction of the arrows.
Figure 32:
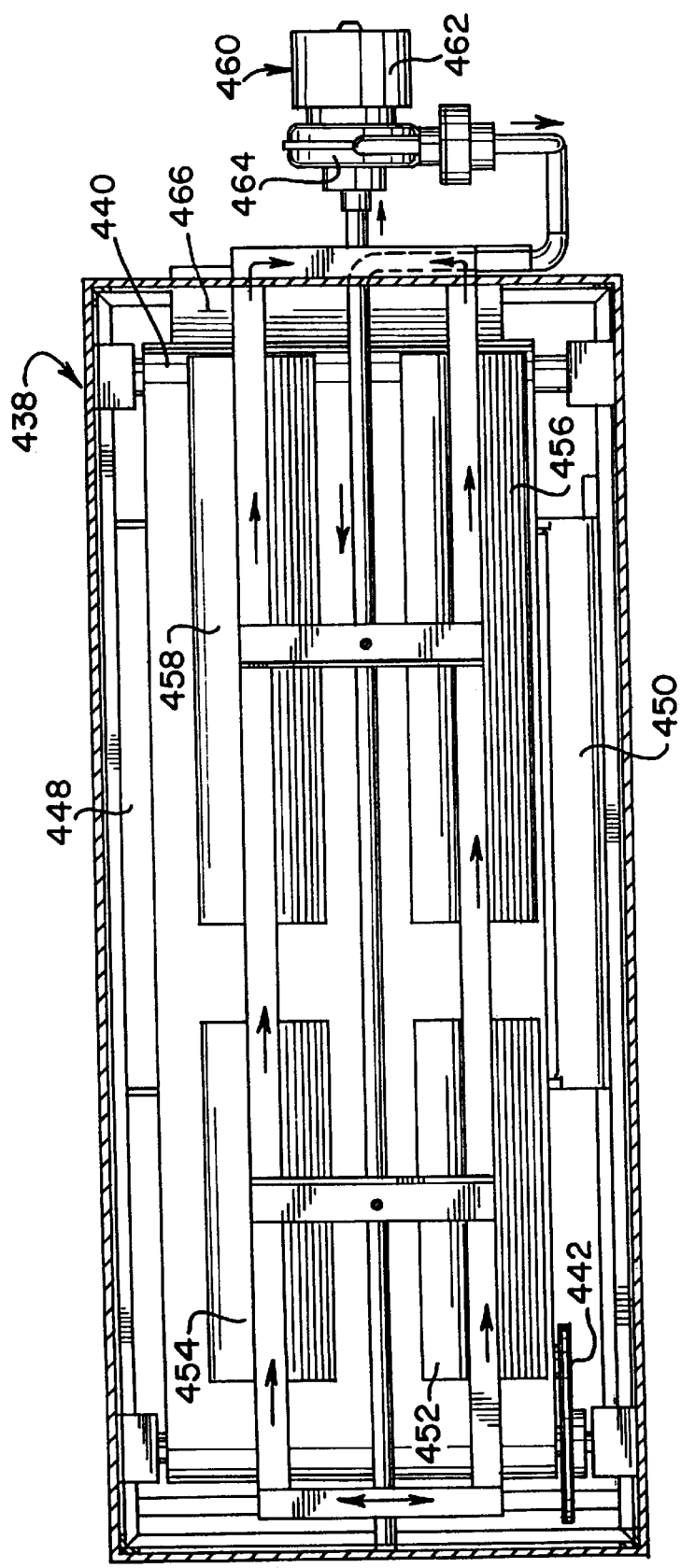
FIG. 32 is a sectional view taken along line 32—32 of FIG. 31 and looking in the direction of the arrows.
Figure 33:
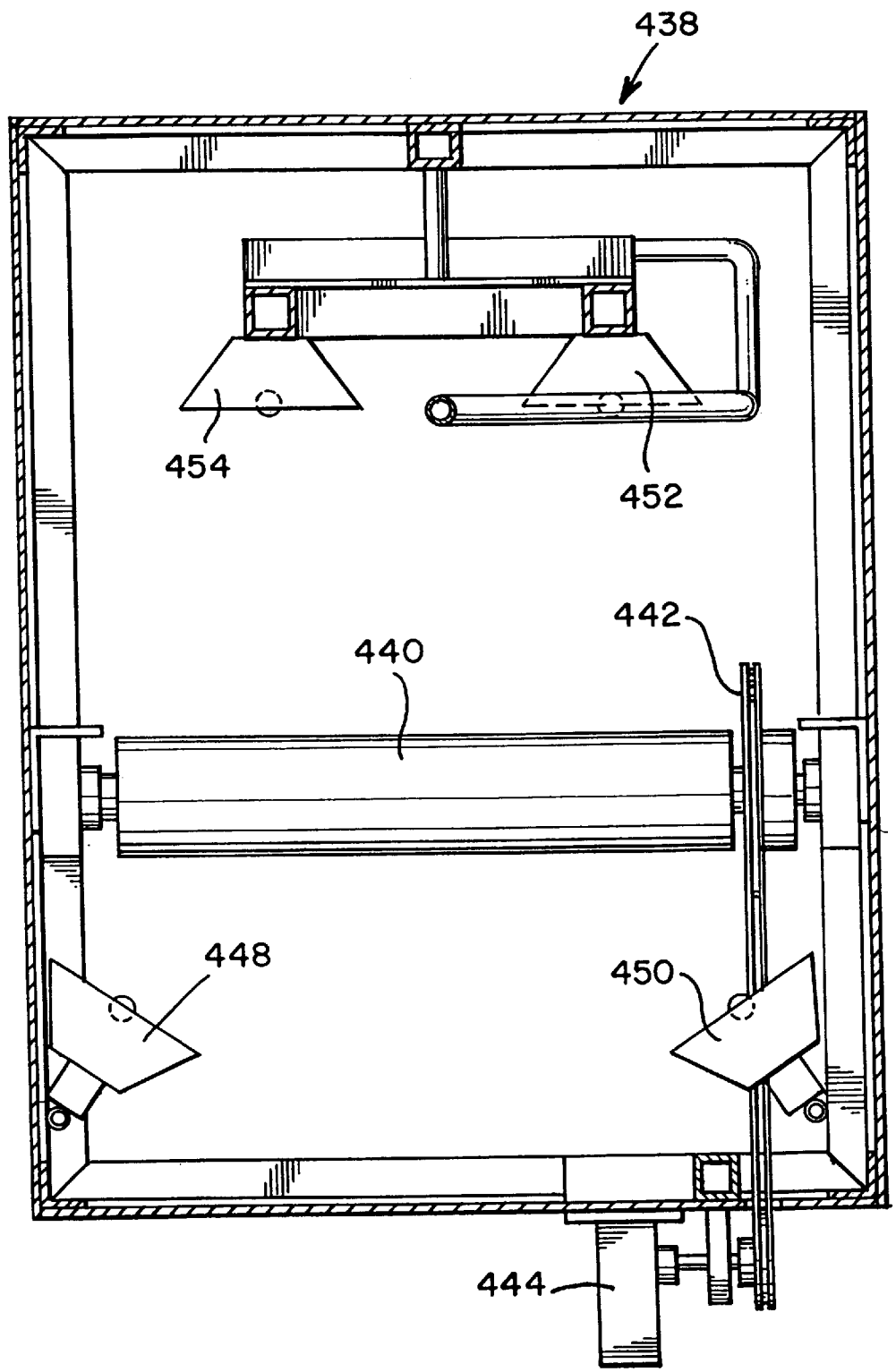
FIG. 33 is a sectional view taken along line 33—33 of FIG. 31 and looking in the direction of the arrows.

Referring now to FIGS. 31–33, the oven station 24 will now be described. Oven 24 includes a conveyor belt 440 that is driven by a belt or chain drive 442. Chain 442 is driven by a motor 444, which is disposed outside of the oven chamber directly beneath the bottom of the oven frame, so that any uncooked pizza which enters the oven through an inlet door 432 is conveyed from the inlet 432 to the outlet 446. The oven includes six banks 448, 450, 452, 454, 456 and 458 of infrared heating lamps. Two of the banks 448, 450 are preferably disposed below the conveyor belt to ensure that the bottom surface of the pizza crust is cooked to a preferably golden brown texture. In addition, four banks of infrared lights 452, 454, 456 and 458 are disposed above the conveyor belt. All of the heating banks 448, 450, 452, 454, 456, 458 may be used if the conveyor belt is substantially filled with uncooked pizzas. However, if only one or two pizzas are passing through the oven, less infrared heating banks may be used. For example, only banks 452, 454 and 458, 450 may be used if the oven is cooking a relatively few number of pizzas.

Figure 38:
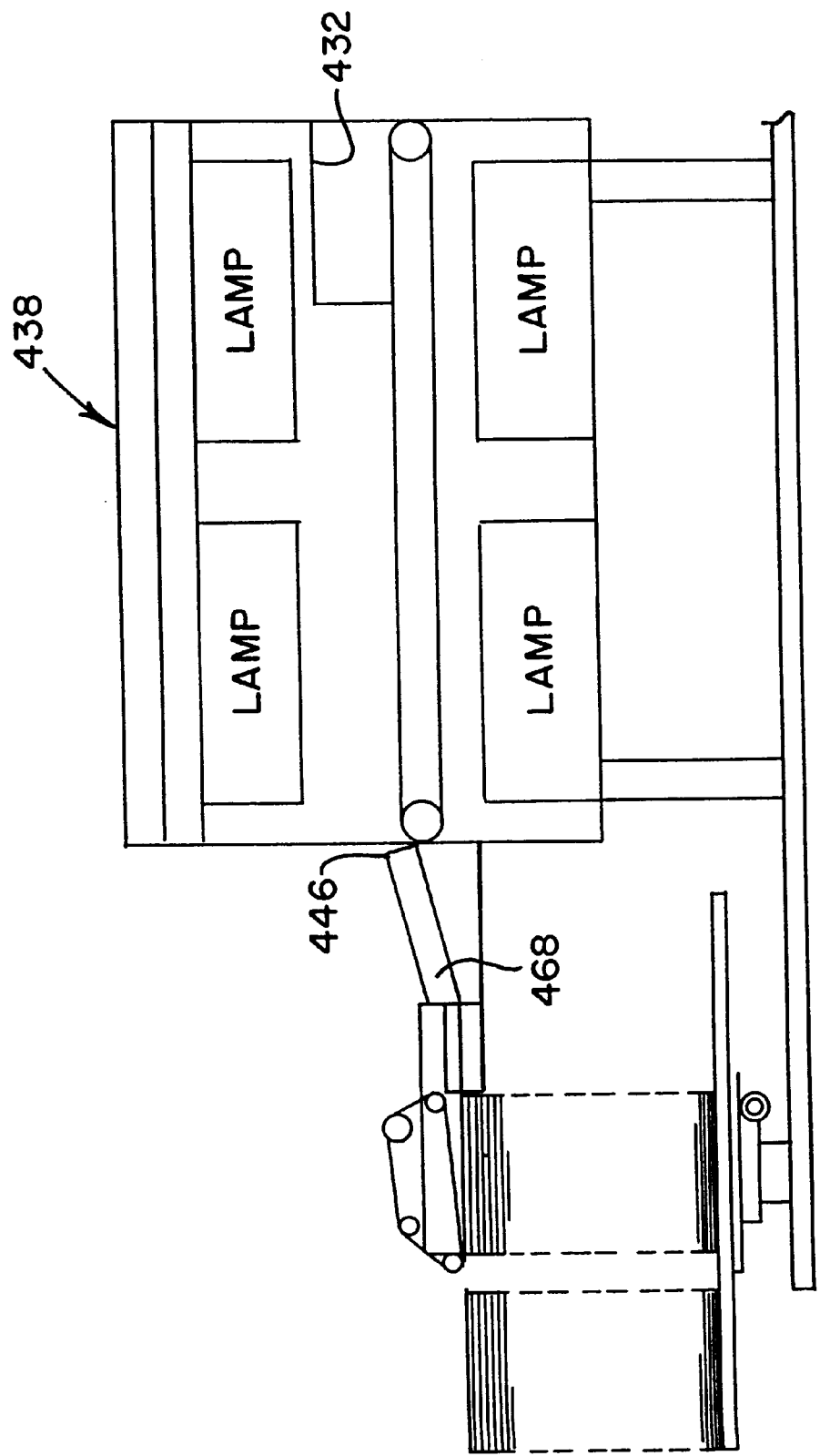
FIG. 38 is a schematic plan view of the packaging mechanism of the packaging station according to the present invention.
Figure 39:
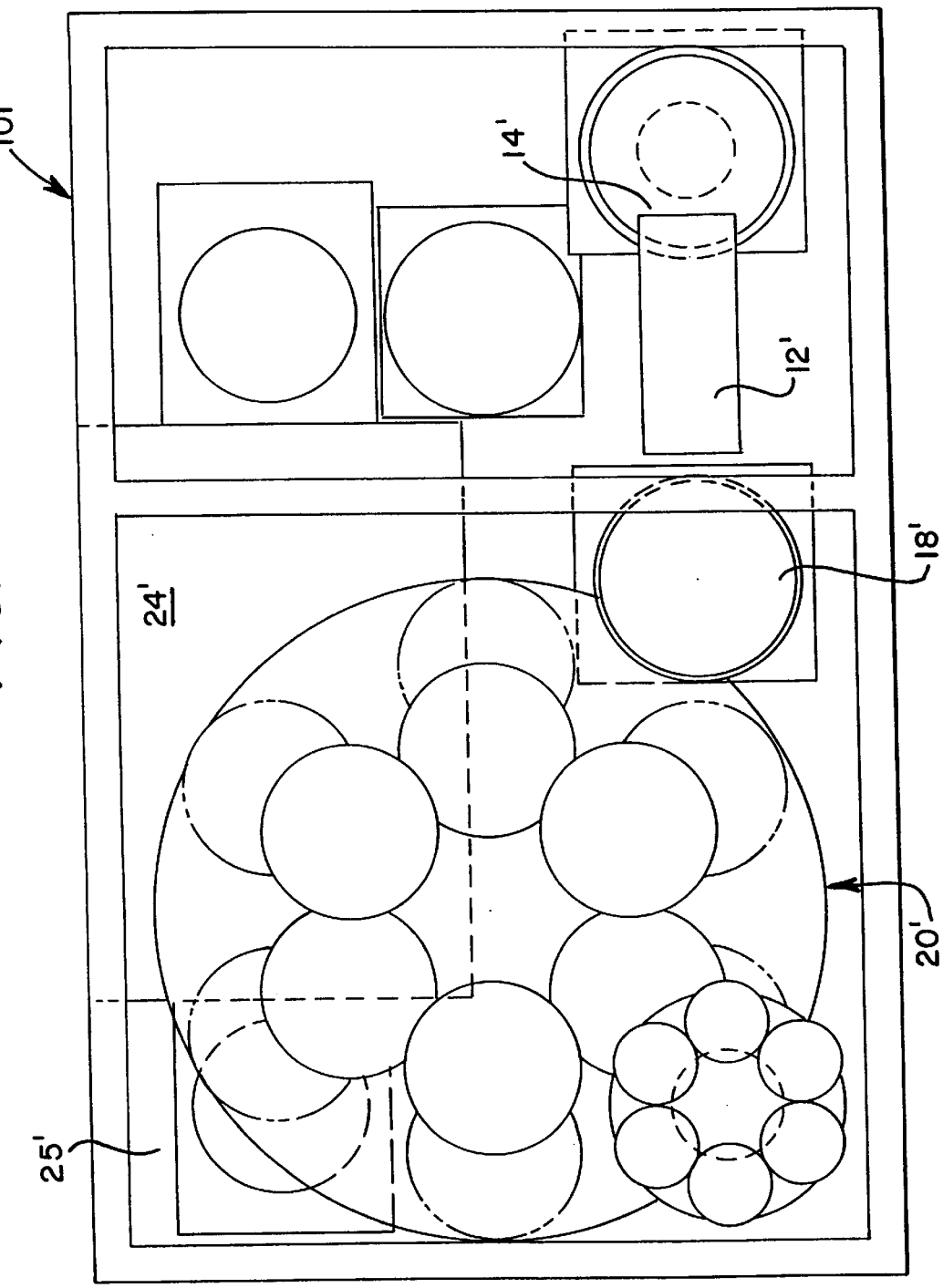
FIG. 39 is a top plan view of a second embodiment of the pizza making apparatus according to the present invention.

The oven also includes an air recirculation system 460, which includes a motor 462 and a centrifugal pump 464 to recirculate the air within the oven so that the temperature within the oven is maintained substantially even. Motor 462 and pump 464 are disposed outside of the oven chamber. The recirculation system includes an inlet and an outlet as indicated by the arrows in FIG. 31 and 32. The now cooked pizza exits the conveyor belt 440 and is transferred onto a chute 466, which directs the cooked pizza into a packaging system disposed at the outlet 446 of the oven. The packaging system includes an open box 468, which receives the cooked pizza exiting from the oven 438 (see FIG. 38). The cooked pizza is now ready to be picked up and eaten by the consumer.

In accordance with the second embodiment of the present invention, the lamp or heating banks have a modified configuration. The short-wave infrared lamp heaters are perpendicular with respect to the oven conveyor travel direction (See FIGS. 77–79). Additionally, the entrance and exit to the oven conveyor are both disposed outside the oven's cooking cavity. A pie pusher 894 transfers the pie from the elevator plate to the oven conveyor 896. Oven conveyor 896 may move at a constant or variable speed to increase or decrease cooking times.

Figure 78:
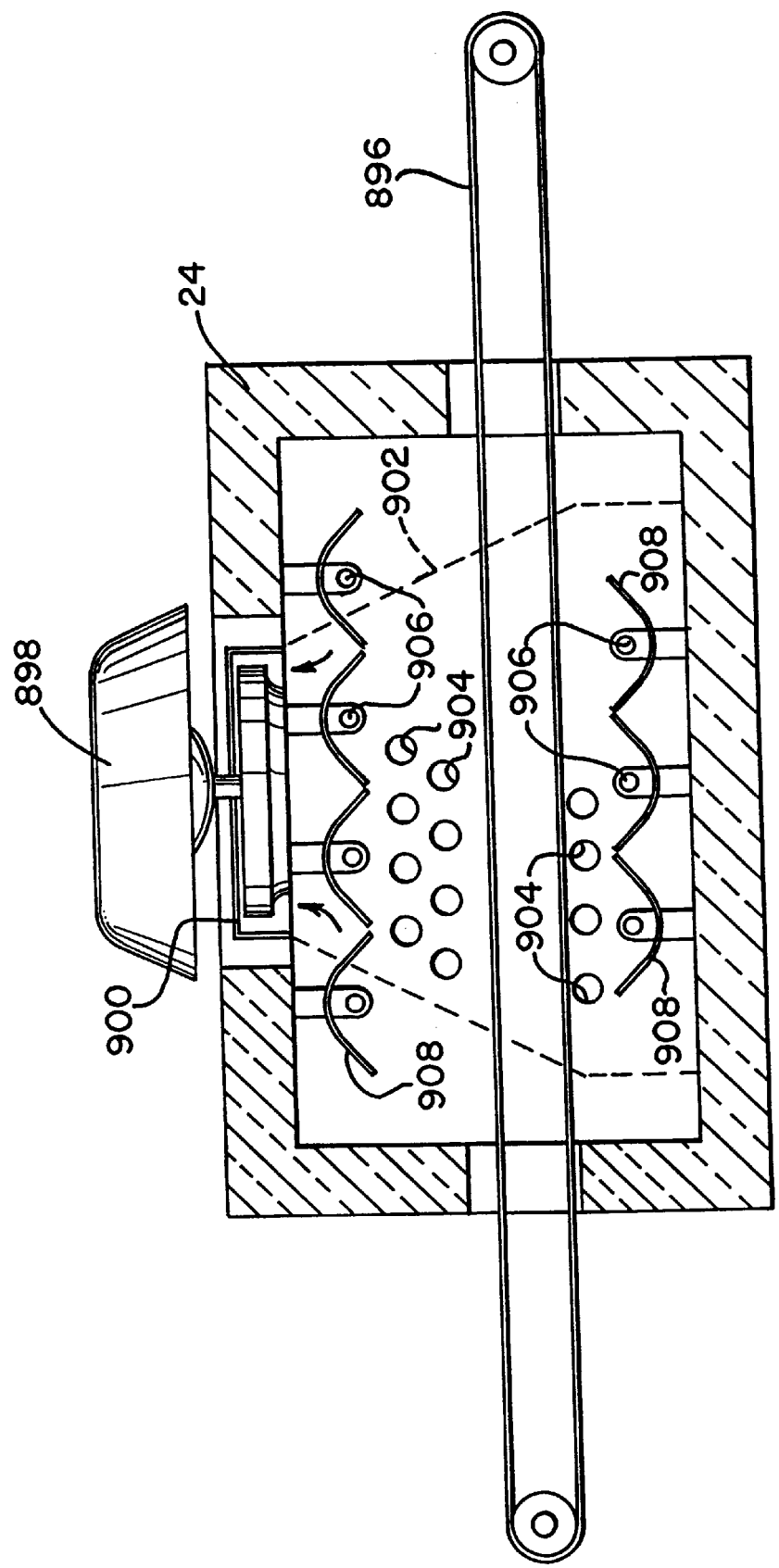
FIG. 78 is a cross sectional view of the oven.
Figure 79:
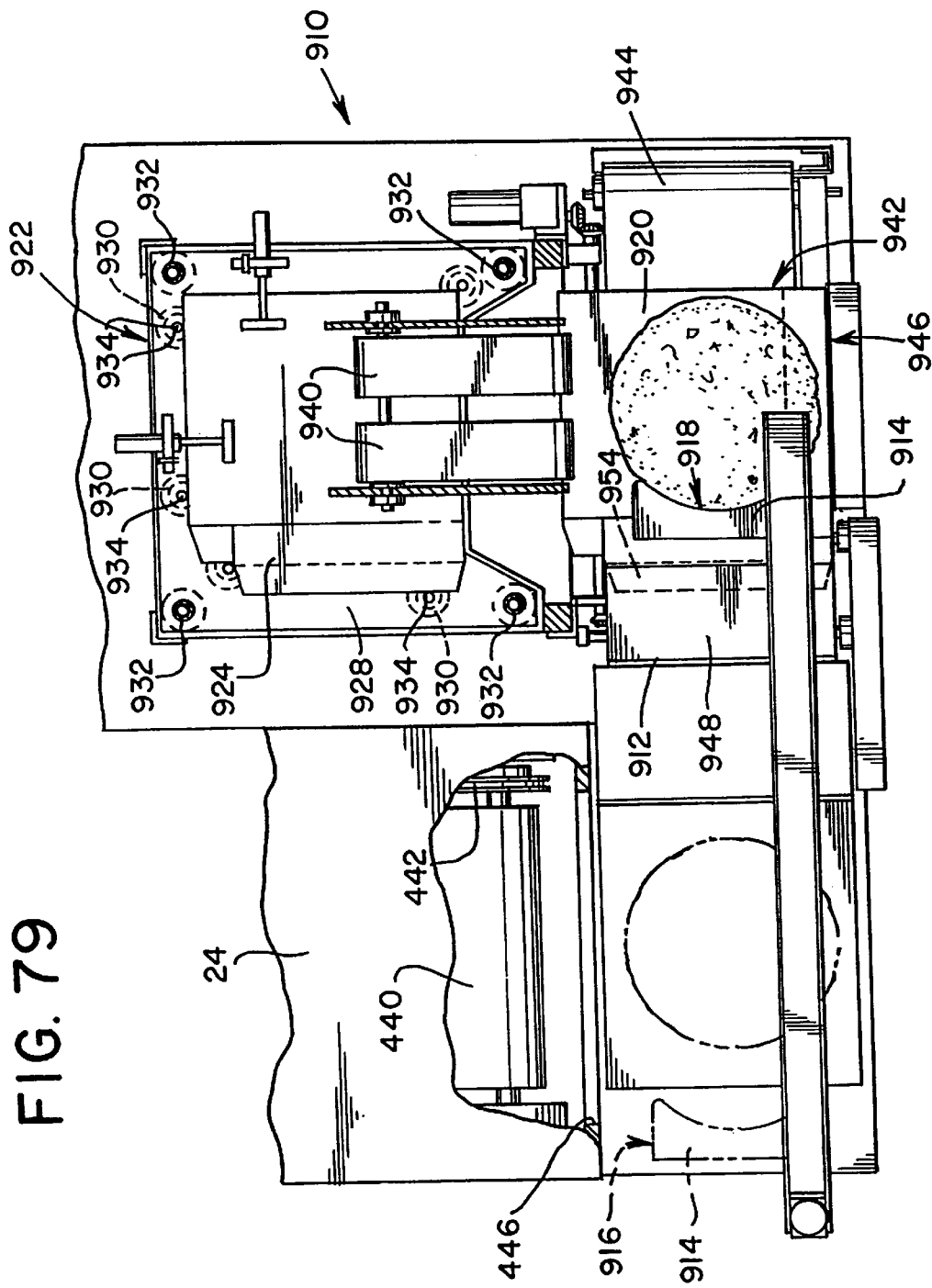
FIG. 79 is a top view of the box bending mechanism.

A stronger fan 898 is disposed above the oven cavity (See FIG. 78). Suction is created in the center of the oven cavity, and hot air is forced up to the fan. The blade arrangement of the fan then forces the hot air radially out, where two ducts 900, 902, one per side of the oven cavity, each have orifices 904 to redirect the air back inside the oven cavity, thereby creating a forced convection-type cooking oven. Ducts 900, 902 and the oven cavity are preferably covered with insulation, and the outer shell of the oven is preferably rectangular.

In a currently preferred embodiment, seven infrared lamps 906, with reflectors 908 are used. Four of the lamps are located on top of conveyor 896 and three are located below. The lamps voltages preferably varies so that a strong deep cook is achieved at the beginning, followed by a lighter intensity cook for the remainder of the cooking cycle. The lamp arrangement is preferably staggered as shown in FIG. 78. At the exit of the oven another transfer arm is used as part of the packaging system (described below).

Packaging System

Referring now to FIGS. 79–82, the packaging system 910 is illustrated. Packaging system 910 includes a box separator, a box bender 912, a pie transfer arm 914 and a box exit conveyor 916.

Pie transfer arm 914 is similar to the elevator transfer arm 428, which is described above. Transfer pusher arm 914 is connected to a tracking system, which is preferably chain driven. Transfer arm 914 moves between two positions; namely, a home position 916 at the oven conveyor exit end and an extended position 918 at the box exit conveyor end (See FIG. 79).

Transfer arm 914 awaits in the home position 916 for a cooked pie to exit the oven 24. Upon exiting, the transfer arm receives a signal to start advancing and pushing the pie forward towards the open end of a box 920. Once the cooked pie has been placed inside the box, transfer arm 914 returns to the home position.

Before the transfer arm places the cooked pie inside a box, a box must be assembled (i.e., opened) to receive a pie. A box separator mechanism 922 separates a box 920 from a stack of boxes 924 and places the top box 920 in a bending station 926.

Initially, folded pie boxes 924 are loaded and stacked on top of a box support plate 928. This plate has linear bearings 930 and spring housings 932 mounted beneath plate 928. Linear bearings 930 ride on a guide rods 934, to ensure that the box support plate 928 is aligned when moving up and down. Each spring housing 932 holds one end of a spring 936, while the other end of the spring is hooked to a fixed top plate 938. The springs help maintain a tension so that box support plate 928 will rise and constantly and apply pressure between the top box of stack 924 and a box separator belt 940.

As needed, one by one, each top box is separated from the stack. Box support plate 928 rises due to the spring tension. A sensor (not shown) will indicate that the box support plate has reached a certain height so that more boxes may be loaded in stack 924.

At the start of every new order made by the consumer, a new box is formed. Thus, box separator first removes the top box from the stack. The box separator belts 940 are preferably made of rubber belting material so that the belt easily grips onto the top carton pie box. Belts 940 grab onto the top box and slide it off the stack and transfers the top box to a box bending station 942, where the top box rests on the box exit conveyor 944.

A box bending mechanism 946 receives a folded pie box from the box separator station and bends the box open so that it may receive a cooked pizza pie. The box bending mechanism is a two-part mechanism, which can best be seen in FIGS. 80–82, and includes a box flap plate 948 and a box bending angle 950.

Both the flap plate 948 and the box bending angle 950 move in tandem because they are connected by a pair of mating bevel gears. In FIG. 82, the two parts are shown in solid lines in the box bent position (i.e., a folded box was unfolded and opened). The phantom lines represent the position of the two parts when the box bending station is ready to receive the folded top box.

Box flap plate 948 has a two-fold purpose: 1) to hold down the flap 954 of the pie box so it does not interfere with the pie entering the box (See FIG. 81); and 2) to act as a sliding surface when the pie is being advanced by the pie transfer arm 914 towards and into the opened box 920.

Figure 80:
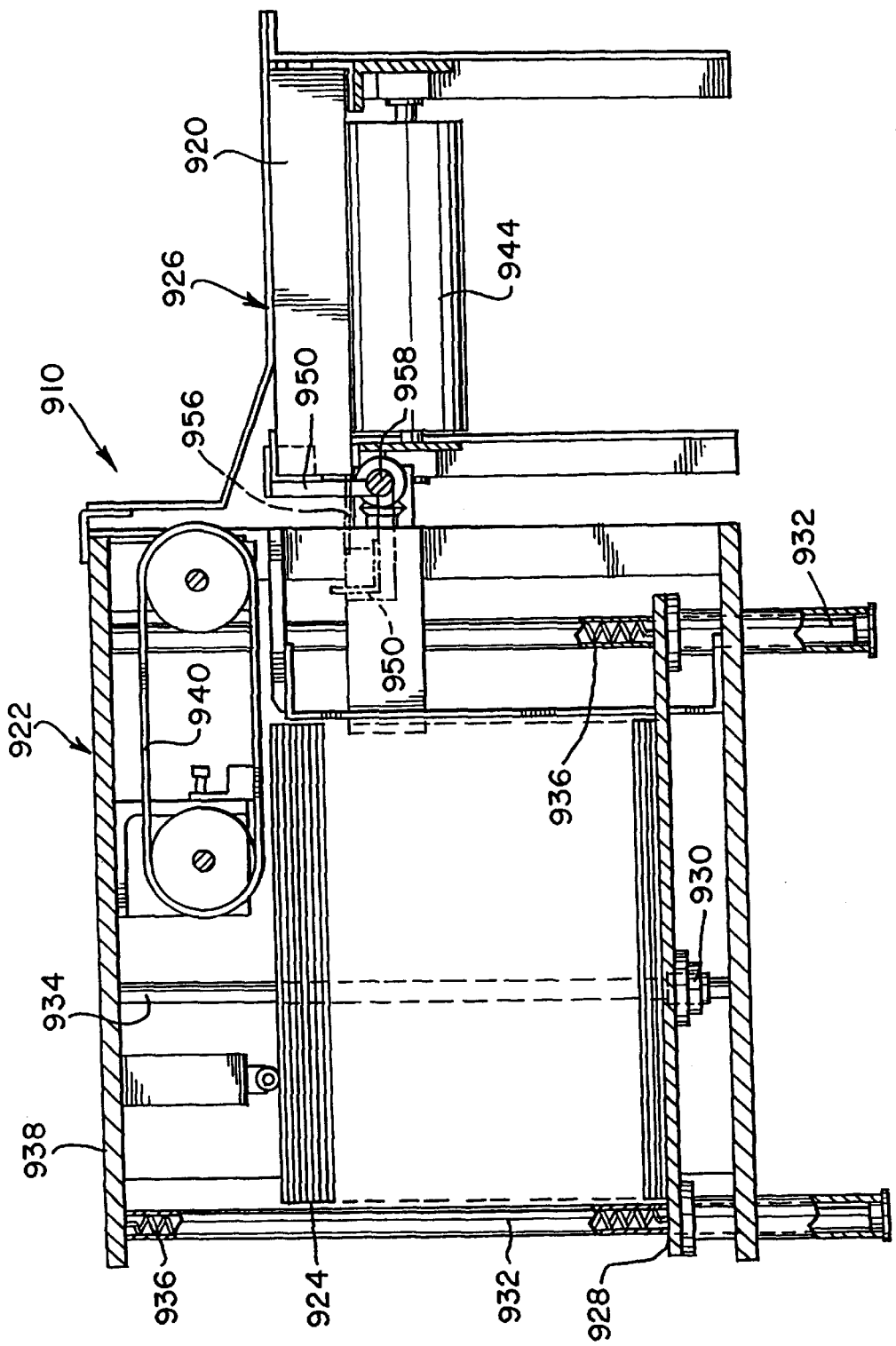
FIG. 80 is an enlarged rear view of the box bending mechanism.
Figure 81:
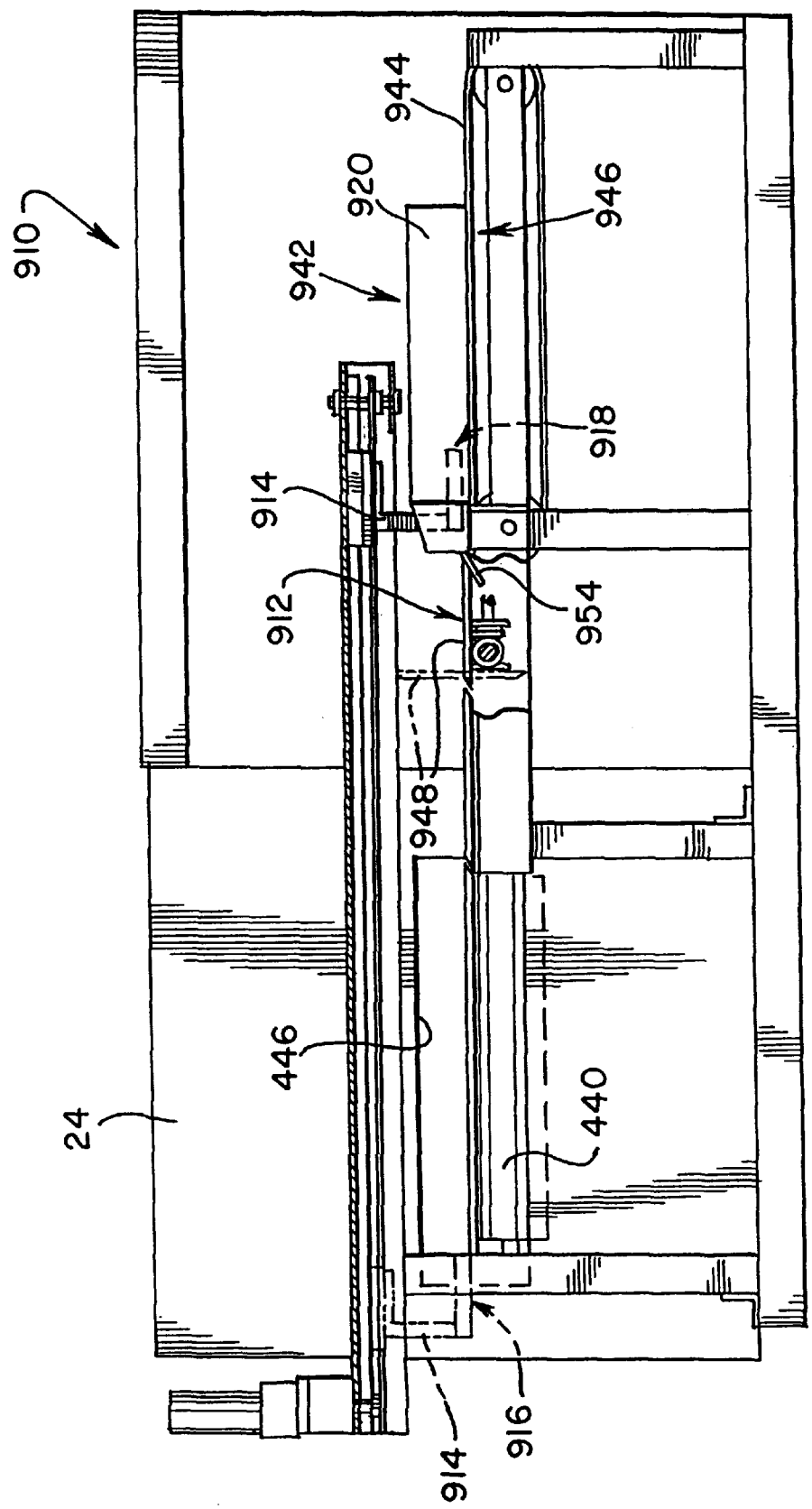
FIG. 81 is an enlarged front view of the box bending mechanism.

Box bending angle 950, due to its angular geometry, corners a side 956 of the folded box, and as the angle is pivoting on its axis 958, the box is forced to unfold and fill the angle geometry (See FIG. 80). The portion of the box opposite to angle 950 is supported by a fixed housing wall to prevent the box from moving as it is being opened by angle 950. As the pivoting of angle 950 is complete, the box is fully opened. Simultaneously, box flap plate 948 presses down on the box flap 954. The pie transfer arm 914 can now begin pushing the pie into the opened box 920.

Once the pie has been pushed into the opened box 920, the transfer arm retracts 914, and both the box flap plate 948 and the box bending angle 950 return to their respective home positions. A fresh hot pizza pie is now placed in the opened box and is sitting on the box exit conveyor 944. The box exit conveyor 944 conveys the boxed pizza pie to the consumer. Conveyor 944 is a simple rubber belt type conveyor that transports the boxed pie to the machine opening where it is ready to be picked up and eaten by the hungry consumer.

Having described the presently preferred exemplary embodiment of an apparatus and method for making pizza in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. A method for making pizza comprising the steps of:
   storing a plurality of canisters in a housing, said plurality of canisters containing fresh dough;
   cutting a slice of dough from one of said plurality of canisters;
   preheating said slice of dough;
   providing a rotary index table which includes a plurality of plates;
   positioning said preheated slice of dough on one of said plates;
   rotating each of said plates about a central axis of said rotary index table; and
   moving each of said plates between an innermost radial position and an outermost radial position while adding toppings.

2. The method according to claim 1, further comprising the step of:
   simultaneously rotating each of said plates about a central axis of said plates as they are moved between said innermost and outermost radial positions; and dispensing at least one of said topping onto said plate when said plate moves between said innermost radial position and said outermost radial position so that said toppings are dispensed in a substantially spiral pattern.

3. A method for making pizza in a housing that includes a rotary index table which includes a plurality of plates, said method comprising the steps of:

rotating each of said plates about a central axis of said rotary index table while holding pizza crust; and moving each of said plates between an innermost radial position and an outermost radial position while simultaneously rotating each of said plates about a central axis of said plates while dispensing toppings on said pizza crust.

4. The method according to claim 3, further comprising the step of dispensing at least one topping onto said plate when said plate moves between said innermost radial position and said outermost radial position so that said toppings are dispensed in a substantially spiral pattern.

* * * * *

UNITED STATES PATENT AND TRADEMARK OFFICE
CERTIFICATE OF CORRECTION

PATENT NO. : 6,086,934
DATED : July 11, 2000
INVENTOR(S) : Puzant KHATCHADOURIAN et al.

It is certified that error appears in the above-indentified patent and that said Letters Patent is hereby corrected as shown below:

On the title page:

Address of Inventor Puzant Khatchadourian should be corrected to read:

- -Puzant Khatchadourian,100 United Nations Plaza, 327 East 48th Street, Apt. 38A New York, New York 10017. - -

Address of Assignee Puzant Khatchadourian should be corrected to read:

- -Puzant Khatchadourian,100 United Nations Plaza, 327 East 48th Street, Apt. 38A New York, New York 10017. - -

Signed and Sealed this

Seventeenth Day of April, 2001

Attest:

NICHOLAS P. GODICI

*Attesting Officer*  *Acting Director of the United States Patent and Trademark Office*